(12) United States Patent
Tanaka et al.

(10) Patent No.: US 7,144,163 B2
(45) Date of Patent: Dec. 5, 2006

(54) OPTICAL CONNECTOR WITH SHUTTER, SHUTTER UNIT, AND INNER PIECE

(75) Inventors: Yuwa Tanaka, Sakura (JP); Kunihiko Fujiwara, Sakura (JP); Takaaki Ishikawa, Sakura (JP)

(73) Assignee: Fujikura Ltd., Tokyo (JP)

( * ) Notice: Subject to any disclaimer, the term of this patent is extended or adjusted under 35 U.S.C. 154(b) by 28 days.

(21) Appl. No.: 10/764,999

(22) Filed: Jan. 26, 2004

(65) Prior Publication Data

US 2004/0223701 A1 Nov. 11, 2004

Related U.S. Application Data

(60) Provisional application No. 60/442,874, filed on Jan. 27, 2003.

(51) Int. Cl.
*G02B 6/38* (2006.01)

(52) U.S. Cl. .......................... 385/75; 385/55; 385/56; 385/58; 385/60; 385/70; 385/72

(58) Field of Classification Search .................. 385/75
See application file for complete search history.

(56) References Cited

U.S. PATENT DOCUMENTS

| | | | | |
|---|---|---|---|---|
| 4,673,242 A | * | 6/1987 | Logan et al. | 385/84 |
| 5,104,242 A | * | 4/1992 | Ishikawa | 385/53 |
| 5,142,597 A | * | 8/1992 | Mulholland et al. | 385/56 |
| 5,317,663 A | * | 5/1994 | Beard et al. | 385/70 |
| 5,329,604 A | * | 7/1994 | Baldwin et al. | 385/92 |
| 5,348,487 A | * | 9/1994 | Marazzi et al. | 439/138 |
| 5,363,460 A | * | 11/1994 | Marazzi et al. | 385/70 |
| 5,570,445 A | * | 10/1996 | Chou et al. | 385/92 |
| 5,708,745 A | * | 1/1998 | Yamaji et al. | 385/92 |
| 5,716,224 A | * | 2/1998 | Masuda et al. | 439/138 |
| 5,802,229 A | * | 9/1998 | Evans et al. | 385/88 |
| 5,845,036 A | * | 12/1998 | De Marchi | 385/139 |
| 5,883,995 A | * | 3/1999 | Lu | 385/60 |
| 5,915,058 A | * | 6/1999 | Clairardin et al. | 385/77 |
| 6,004,043 A | * | 12/1999 | Abendschein et al. | 385/76 |
| 6,076,975 A | * | 6/2000 | Roth | 385/76 |

(Continued)

FOREIGN PATENT DOCUMENTS

| | | |
|---|---|---|
| JP | 6-201953 | 7/1994 |
| JP | 2002-243978 | 8/2002 |

*Primary Examiner*—Frank G. Font
*Assistant Examiner*—Ryan Lepisto
(74) *Attorney, Agent, or Firm*—Hoffmann & Baron, LLP

(57) ABSTRACT

The present invention relates to a technique for intercepting light which is emitted from a connection reception side optical connector which is housed inside a connector hole of a connector housing of a device such as an optical connector adapter or the like using a shutter, and more particularly relates to a development of this technology which makes it possible to arrange the shutter without exerting the negative effect of increasing the size of the connector housing. With the present invention such light interception is implemented, without increasing the size of the connector housing 14, by providing a structure in which a shutter unit is fitted within a connector hole 14a of a connector housing 14, with this shutter unit comprising two shutter leaves 53A and 53B for light interception supported upon shafts in a main section 51 of the assembly. Furthermore it is possible to guarantee the dust interception characteristic of the connector hole, since the plurality of shutter leaves 53A and 53B mutually overlap with one another so as to close off the connector hole 14a when they are in their light interception positions.

18 Claims, 55 Drawing Sheets

U.S. PATENT DOCUMENTS

| | | | |
|---|---|---|---|
| 6,081,647 A * | 6/2000 | Roth et al. .................. 385/139 |
| 6,108,482 A * | 8/2000 | Roth ........................ 385/139 |
| 6,206,577 B1 * | 3/2001 | Hall et al. |
| 6,264,374 B1 * | 7/2001 | Selfridge et al. ............. 385/78 |
| 6,302,592 B1 * | 10/2001 | Zullig ........................ 385/60 |
| 6,331,079 B1 * | 12/2001 | Grois et al. ................... 385/53 |
| 6,340,246 B1 * | 1/2002 | Yoshida et al. ............... 385/73 |
| 6,352,375 B1 * | 3/2002 | Shimoji et al. ............... 385/92 |
| 6,361,218 B1 * | 3/2002 | Matasek et al. ............... 385/60 |
| 6,371,657 B1 * | 4/2002 | Chen et al. .................. 385/58 |
| 6,406,192 B1 * | 6/2002 | Chen et al. .................. 385/56 |
| 6,425,692 B1 * | 7/2002 | Fujiwara et al. .............. 385/56 |
| 6,461,054 B1 * | 10/2002 | Iwase ........................ 385/73 |
| 6,471,412 B1 * | 10/2002 | Belenkiy et al. .............. 385/53 |
| 6,481,902 B1 * | 11/2002 | Takaoka et al. ............... 385/92 |
| 6,554,482 B1 * | 4/2003 | Matasek et al. ............... 385/55 |
| 6,595,696 B1 * | 7/2003 | Zellak ........................ 385/72 |
| 6,685,362 B1 * | 2/2004 | Burkholder et al. ........... 385/78 |
| 6,688,780 B1 * | 2/2004 | Duran ........................ 385/76 |
| 6,715,930 B1 * | 4/2004 | McBride ..................... 385/73 |
| 6,755,574 B1 * | 6/2004 | Fujiwara et al. .............. 385/56 |
| 6,764,222 B1 * | 7/2004 | Szilagyi et al. ............... 385/55 |
| 6,796,719 B1 * | 9/2004 | Zhu et al. .................... 385/76 |
| 6,845,210 B1 * | 1/2005 | Ohbayashi et al. ......... 385/139 |
| 6,866,424 B1 * | 3/2005 | Tanaka et al. ................ 385/55 |
| 2001/0048790 A1 * | 12/2001 | Burkholder et al. .......... 385/78 |
| 2004/0052473 A1 * | 3/2004 | Seo et al. .................... 385/73 |

* cited by examiner

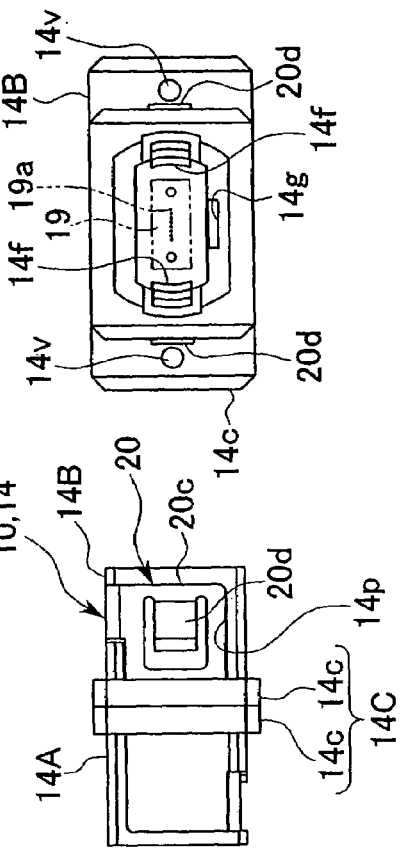
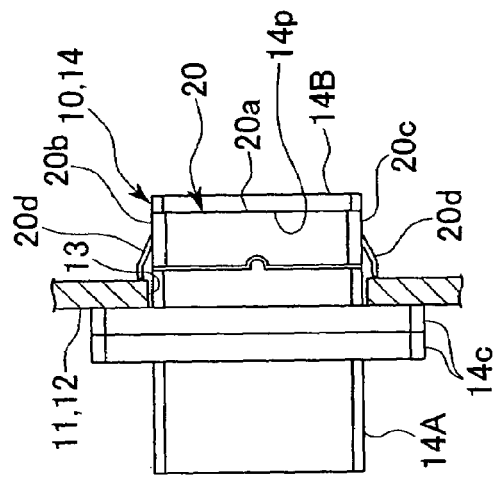
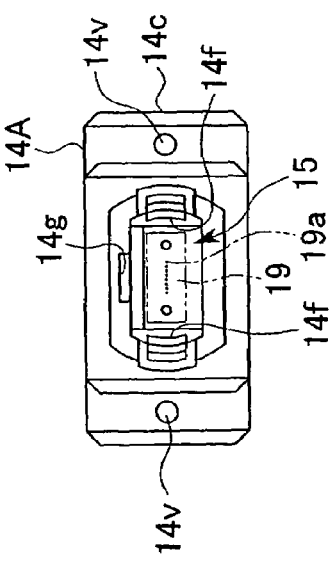

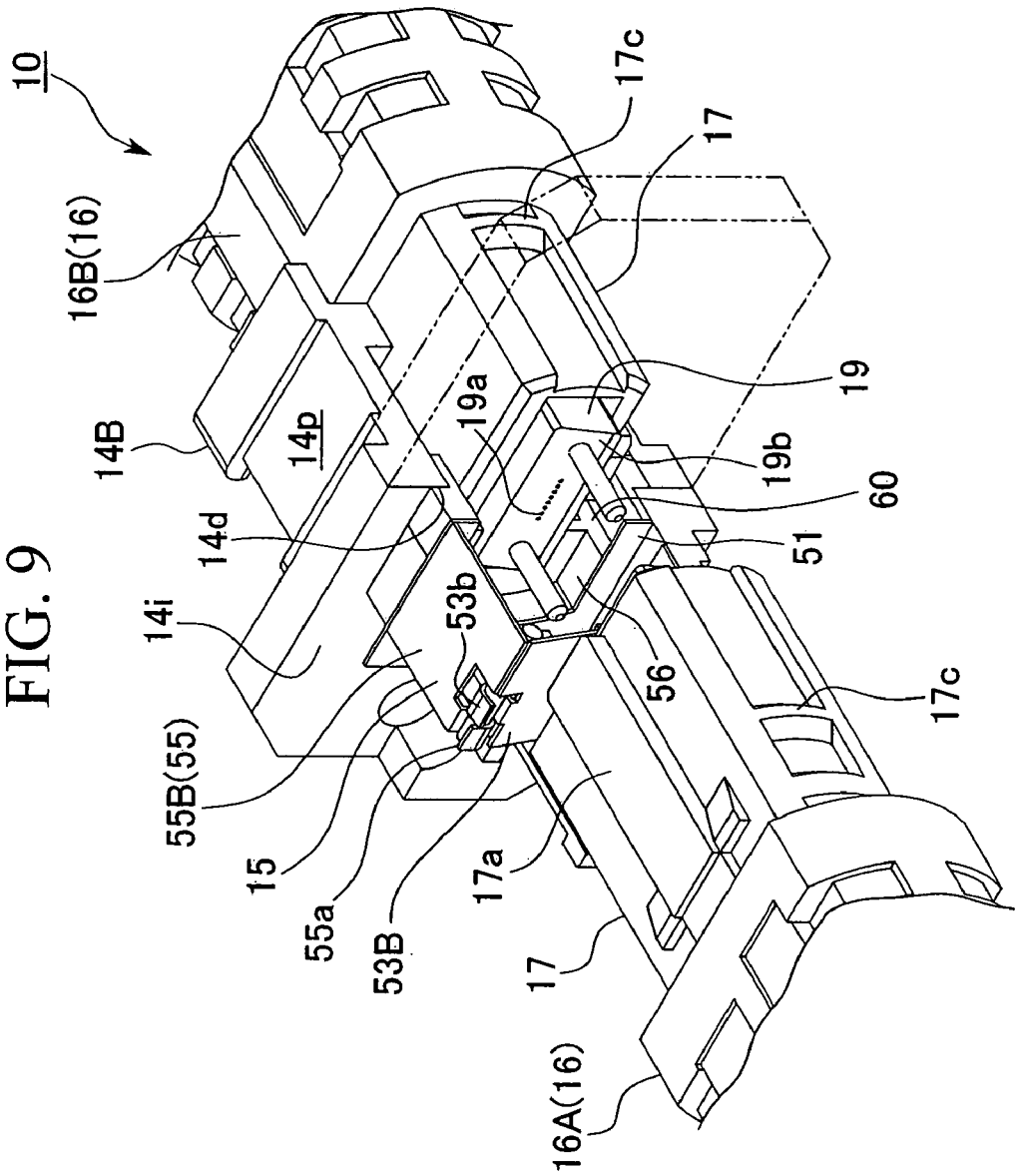

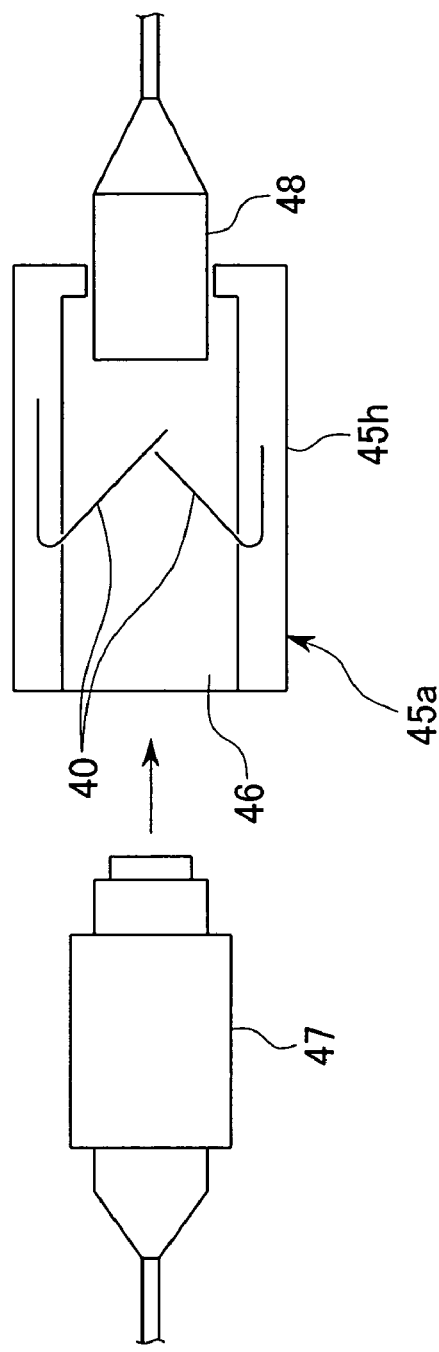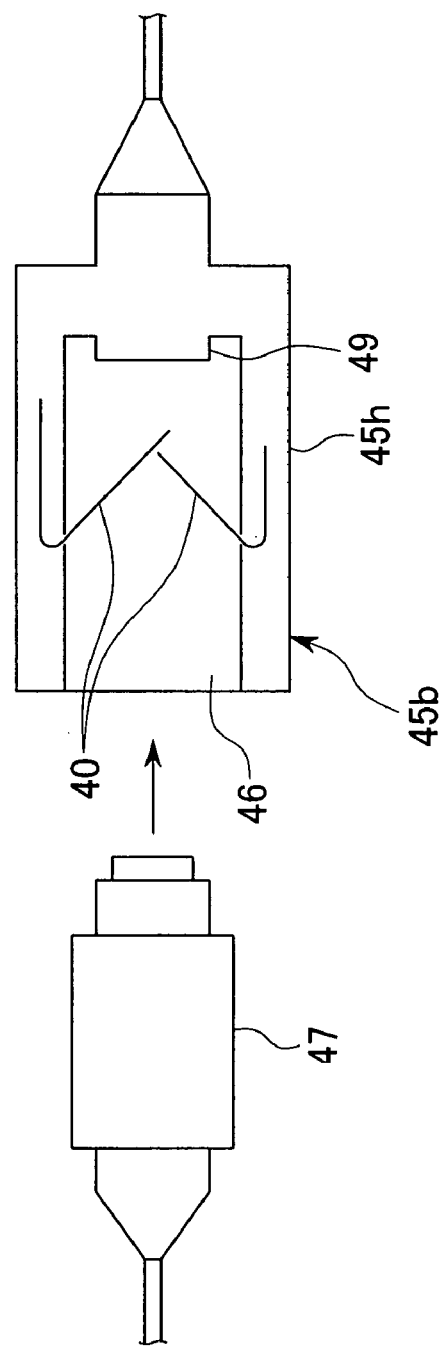
FIG. 17A
FIG. 17B

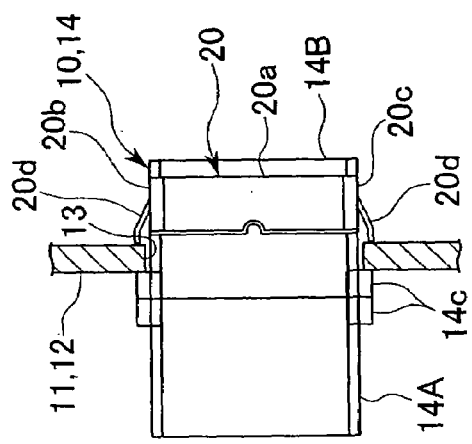
FIG. 22A
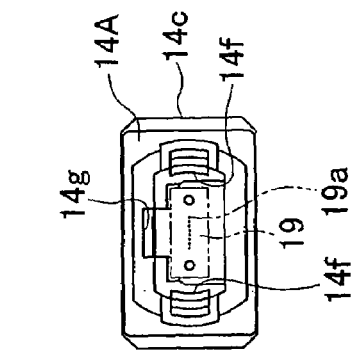
FIG. 22C
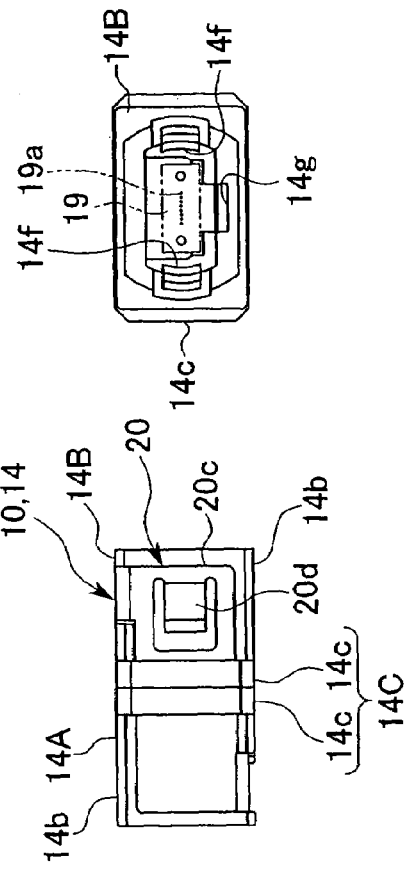
FIG. 22D
FIG. 22B

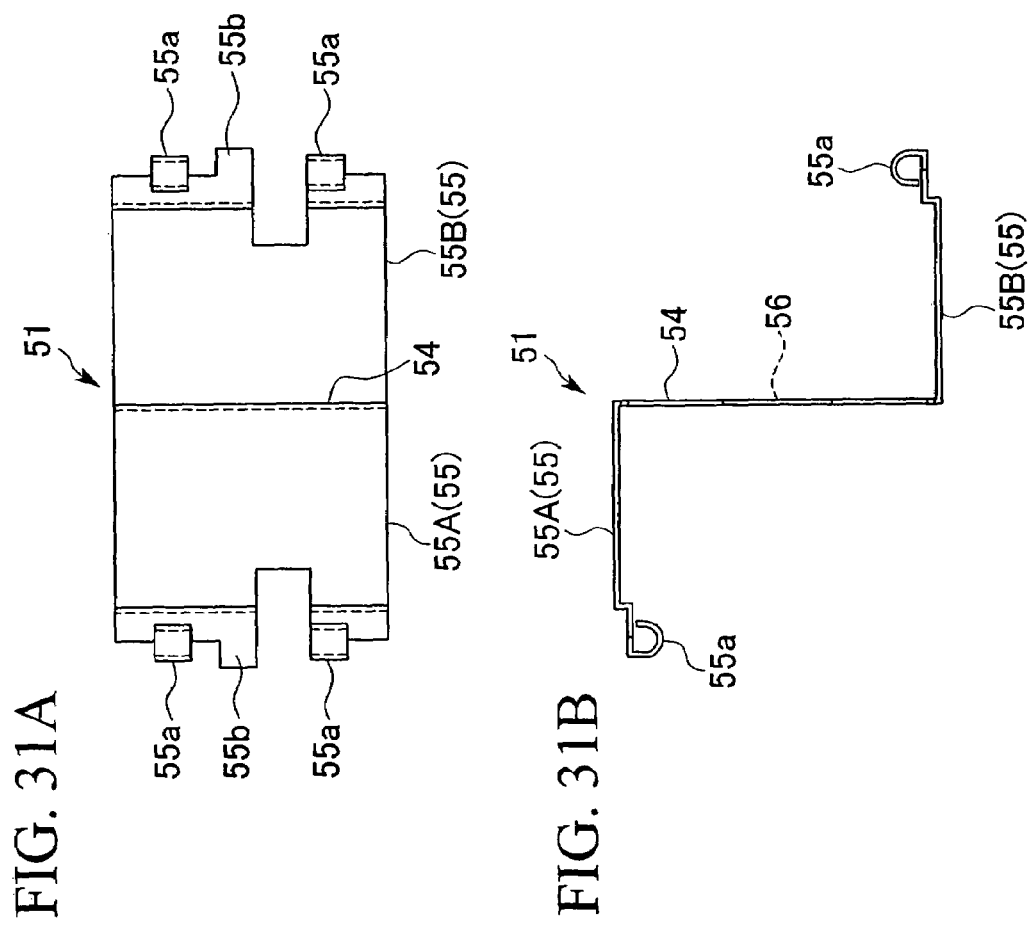

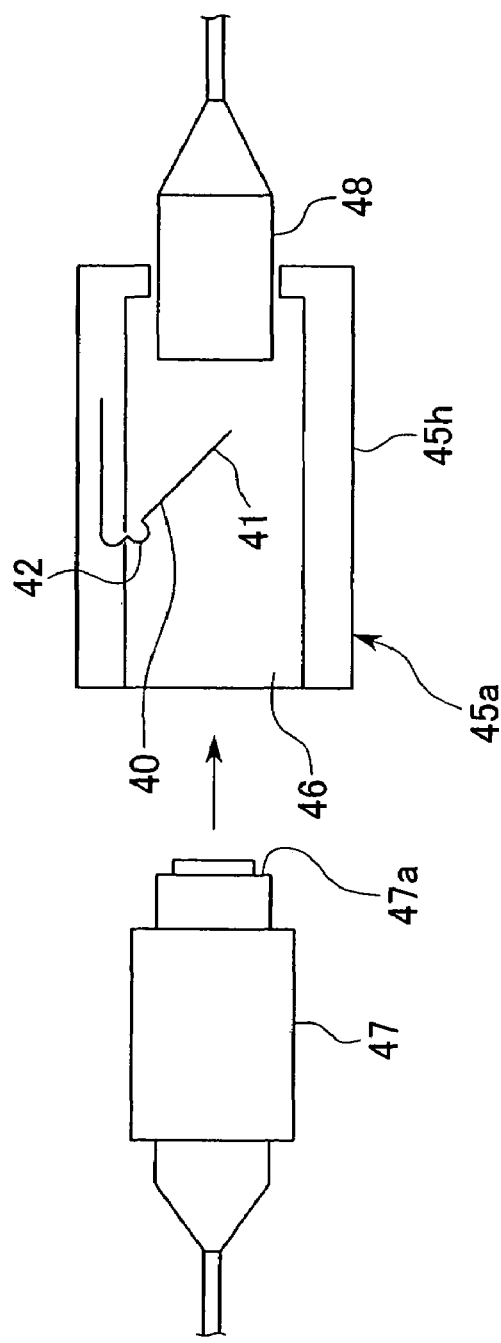
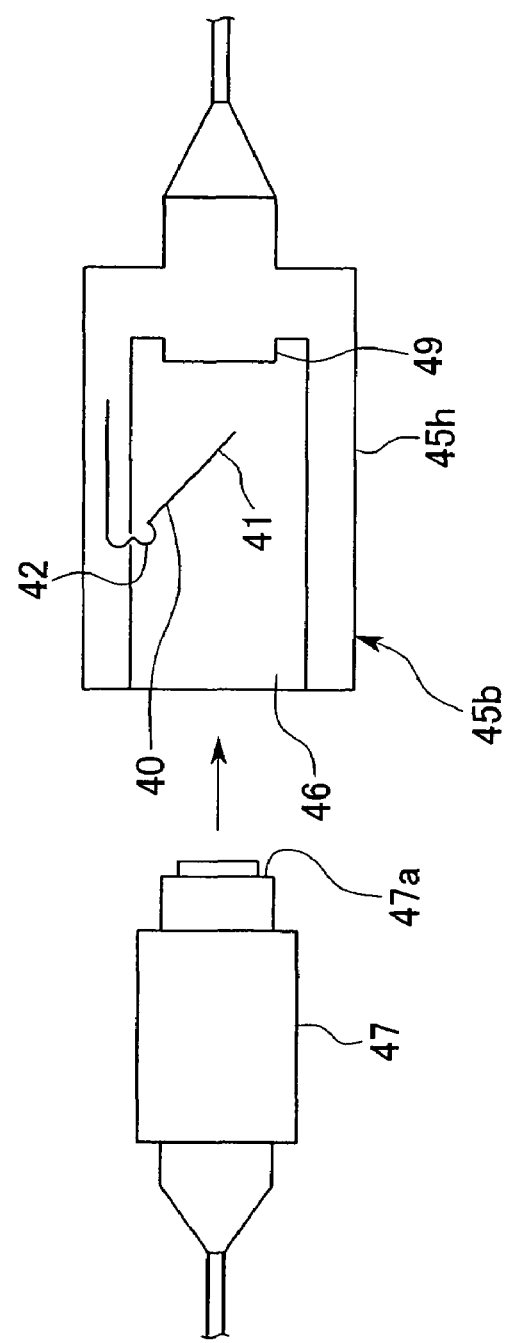
FIG. 45A
FIG. 45B

FIG. 51
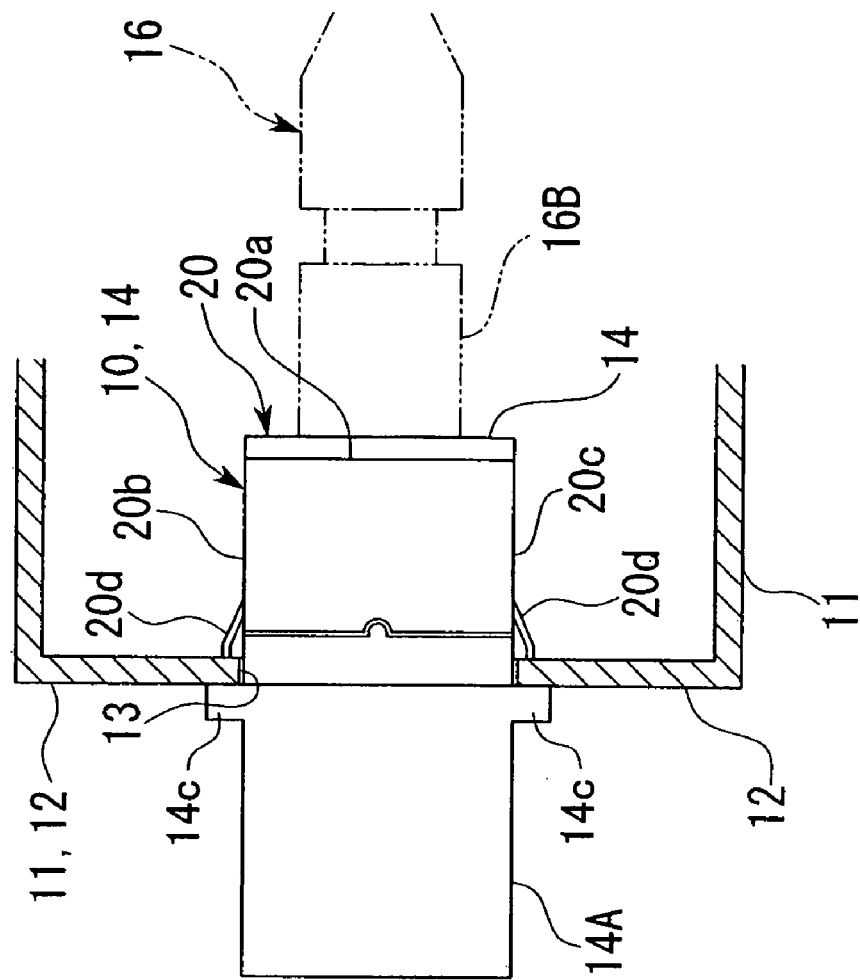
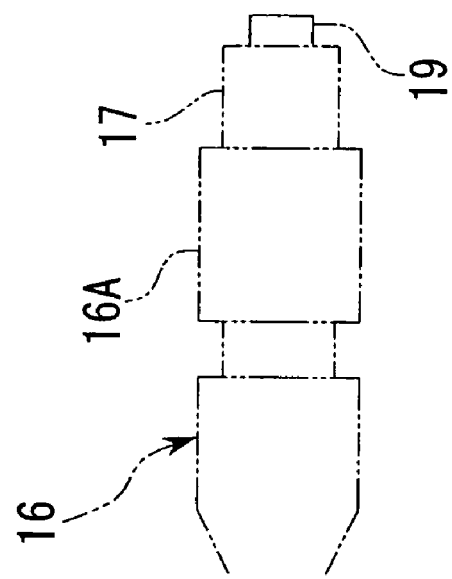

OPTICAL CONNECTOR WITH SHUTTER, SHUTTER UNIT, AND INNER PIECE

This application claims the benefit U.S. Provisional Application No. 60/442,874, filed Jan. 27, 2004, which is incorporated herein by reference.

BACKGROUND OF THE INVENTION

1. Field of the Invention

The present invention is related to an optical connector, and more particularly relates to an optical connector equipped with a shutter, to which a shutter is provided which intercepts light which is emitted from the connection portion of the optical connector, when the optical connector is inserted into and is connected to a connector housing; and to a shutter unit which is used in this shutter equipped connector. Furthermore, the present invention relates to an inner piece which is assembled into a connector housing of an optical connector adapter or the like.

2. Description of the Prior Art

As shown in FIG. 18, when inserting an optical connector for example, when inserting an optical connector 3 (an optical connector plug) into a connector hole 2 of an optical connector adapter 1, and connecting the optical connector plug to an optical connector 4 (this optical connector plug will sometimes hereinafter be termed the "adapter side optical connector") which is inserted and connected from the opposite side into the optical connector adapter 1, there is a requirement to exercise protective action so that light H which has been emitted from the tip end of the adapter side optical connector 4 should not enter into the eye of the operator who is operating the optical connector 3 on the insertion side. The same requirement exists when inserting and connecting an optical connector to various types of connector housing such as, for example, an optical connector receptacle or the like.

In view of the above described requirement, for example, several proposals have been made in the prior art to intercept light which has escaped from the adapter side optical connector 4 by providing a lid which opens and closes the connector hole 2 in the vicinity of the aperture portion of the optical connector adapter 1; for example, reference should be made to Japanese Patent Application, First Publication, Nos. Hei 6-201953 and 2002-243978.

However, there have been the following kind of problems with such interception of light using the above described type of lid. (1) With many suggested structures, it has been necessary to perform the release actuation manually when inserting the optical connector, and the labor required for this operation is burdensome. (2) The structure suggested for assembly to the optical connector adapter for free opening and closing has been complicated, and has involved a large number of component parts, so that the cost has been high. In this case, it has also been difficult to make the structure compact, so that it has been necessary to change the basic structure of the optical connector adapter to a considerable extent, and to make it larger. (3) Since making the structure more compact has been difficult according to the reasons given in (2) above, it has been difficult or impossible to respond to current demands for increasing the number of lines dealt with by the optical connector adapter, for increasing the density of the connector fitting holes, and for improvement of compactness.

Furthermore, in recent years, the requirements for electromagnetic radiation shielding capability which have been imposed upon items of electrical and electronic equipment have become more severe, and although, in order to exercise protection so that no influence due to electromagnetic radiation from the exterior is experienced by any electronic components internal to the chassis, to prevent radiation of electromagnetic radiation from the subject item of equipment in question, and to ensure than no influence due to electromagnetic radiation is exerted upon other items of electrical or electronic equipment which are exterior to the subject item, it is per se conventional to utilize a chassis which is made of a metallic material or the like so that it is endowed with electrical conductivity and accordingly exhibits an electromagnetic radiation shielding capacity, there has been the problem that, as shown by way of example in FIGS. 19 through 21, in order to fit such an optical connector adapter 1 to a fitting wall 6 of a chassis 5, it has been necessary to form a connector fitting hole 7 in the fitting wall 6 of the chassis 5 which is of a size large enough for it to be possible to insert the optical connector adapter 1 into the hole. Furthermore, it has been widely practiced to use a component which is made from plastic as the optical connector adapter 1, but, if this type of optical connector adapter 1 is inserted into the connector fitting hole 7 and is fitted to the fitting wall 6, it is not possible to ensure a satisfactory electromagnetic radiation shielding capacity for the connector fitting hole 7, even if the chassis 5 itself is endowed with a good electromagnetic radiation shielding capacity. In view of the above problem, it has been contemplated to attach an electrically conductive cover over the outside of the optical connector adapter 1.

However since, for example, it is a practical impossibility to provide such an electrically conductive cover over the connector hole 2 in the vicinity of the aperture portion of the connector adapter 1, from the point of view of ensuring the workability of the action of establishment of the connection of the optical connector 3 to the optical connector adapter, as a result, it is not possible to guarantee the electromagnetic radiation shielding capability of the connector fitting hole 2. Due to this, a demand has arisen for a technique which is able effectively to implement electromagnetic radiation shielding of a connector fitting hole which has been pierced through a fitting wall of a chassis of an item of equipment or the like. It should be understood that this problem of electromagnetic radiation shielding is not limited to the case of an optical connector adapter; for example, a similar problem also arises in the case of various types of optical connector which are made for an optical connector plug to be inserted and connected into them, such as the case when a connector fitting hole is formed in a fitting wall for fitting an optical connector receptacle, or the like.

The present invention has been conceived in the light of the above described problems, and its objective is to provide an optical connector equipped with a shutter which can easily make a shutter for light interception more compact and of lower cost; which can guarantee fitting positional accuracy and stability, which can implement improvement in the compactness of the connector housing and increase in its density (i.e., increase in the density of the connector fitting hole); which can easily and securely implement an electromagnetic radiation shielding capability for a connector fitting hole by determining its position and fitting it to a connector fitting hole which has been formed in a fitting wall of a chassis of an item of equipment or the like; and which moreover can ensure anti dust protection for the interior of the connector housing.

Furthermore, as shown in FIG. 46, for example, when inserting an optical connector 3 (an optical connector plug) into a connector hole 2 of an optical connector adapter 1, and connecting the optical connector plug to an optical connector 4 (this optical connector plug will sometimes hereinafter be termed the "adapter side optical connector") which is inserted and connected from the opposite side into the optical connector adapter 1, there is a requirement to exercise protective action so that light H which has been emitted from the tip end of the adapter side optical connector 4 should not enter into the eye of the operator who is operating the optical connector 3 on the insertion side. The same requirement exists when inserting and connecting an optical connector to various types of connector housing such as, for example, an optical connector receptacle or the like.

In view of the above described requirement, for example, several proposals have been made in the prior art to intercept light which has escaped from the adapter side optical connector 4 by providing a lid which opens and closes the connector hole 2 in the vicinity of the aperture portion of the optical connector adapter 1; for example, reference should be made to Japanese Patent Application, First Publication, Nos. Hei 6-201953 and 2002-243978.

However, there have been the following kind of problems with such interception of light using the above described type of lid. (1) With many suggested structures, it has been necessary to perform the release actuation manually when inserting the optical connector, and the labor required for this operation is burdensome. (2) The structure suggested for assembly to the optical connector adapter for free opening and closing has been complicated, and has involved a large number of component parts, so that the cost has been high. In this case, it has also been difficult to make the structure compact, so that it has been necessary to change the basic structure of the optical connector adapter to a considerable extent, and to make it larger. (3) Since making the structure more compact has been difficult according to the reasons given in (2) above, it has been difficult or impossible to respond to current demands for increasing the number of lines dealt with by the optical connector adapter, for increasing the density of the connector fitting holes, and for improvement of compactness.

Furthermore, in recent years, the requirements for electromagnetic radiation shielding capability which have been imposed upon items of electrical and electronic equipment have become more severe, and, in order to exercise protection so that no influence due to electromagnetic radiation from the exterior is experienced by any electronic components internal to the chassis, to prevent radiation of electromagnetic radiation from the subject item of equipment in question, and to ensure than no influence due to electromagnetic radiation is exerted upon other items of electrical or electronic equipment which are exterior to the subject item, it is per se conventional to utilize a chassis which is made of a metallic material or the like so that it is endowed with electrical conductivity and accordingly exhibits an electromagnetic radiation shielding capacity.

However, there has been the problem that, as shown by way of example in FIGS. 47 through 49, in order to fit such an optical connector adapter 1 to a fitting wall 6 of a chassis 5, it has been necessary to form a connector fitting hole 7 in the fitting wall 6 of the chassis 5 which is of a size large enough for it to be possible to insert the optical connector adapter 1 into the hole. For this, it has been widely practiced to use a component which is made from plastic as the optical connector adapter 1. However, if this type of optical connector adapter 1 is inserted into the connector fitting hole 7 and is fitted to the fitting wall 6, it is not possible to ensure a satisfactory electromagnetic radiation shielding capacity for the connector fitting hole 7, even if the chassis 5 itself is endowed with a good electromagnetic radiation shielding capacity. In view of these facts, it has been contemplated to attach an electrically conductive cover over the outside of the optical connector adapter 1.

However since, for example, it is a practical impossibility to provide such an electrically conductive cover over the connector hole 2 in the vicinity of the aperture portion of the connector adapter 1, from the point of view of ensuring the workability of the action of establishment of the connection of the optical connector 3 to the optical connector adapter, as a result, it is not possible to guarantee the electromagnetic radiation shielding capability of the connector fitting hole 2. Due to this, a demand has arisen for a technique which is able effectively to implement electromagnetic radiation shielding of a connector fitting hole which has been pierced through a fitting wall of a chassis of an item of equipment or the like. It should be understood that this problem of electromagnetic radiation shielding is not limited to the case of an optical connector adapter; for example, a similar problem also arises in the case of various types of optical connector which are made for an optical connector plug to be inserted and connected into them, such as the case when a connector fitting hole is formed in a fitting wall for fitting an optical connector receptacle, or the like.

The present invention has been conceived in the light of the above described problems, and its objective is to provide an optical connector equipped with a shutter which can easily make a shutter for light interception more compact and of lower cost; which can guarantee fitting positional accuracy and stability, which can implement improvement in the compactness of the connector housing and increase in its density (i.e., increase in the density of the connector fitting hole); which can easily and securely implement an electromagnetic radiation shielding capability for a connector fitting hole by determining its position and fitting it to a connector fitting hole which has been formed in a fitting wall of a chassis of an item of equipment or the like; and which moreover can ensure anti dust protection for the interior of the connector housing.

Furthermore, as shown in FIG. 61, for example, when inserting an optical connector 3 (an optical connector plug) into a connector hole 2 of an optical connector adapter 1, and connecting the optical connector plug to an optical connector 4 (this optical connector plug will sometimes hereinafter be termed the "adapter side optical connector") which is inserted and connected from the opposite side into the optical connector adapter 1, there is a requirement to exercise protective action so that light H which has been emitted from the tip end of the adapter side optical connector 4 should not enter into the eye of the operator who is operating the optical connector 3 on the insertion side. The same requirement exists when inserting and connecting an optical connector to various types of connector housing such as, for example, an optical connector receptacle or the like.

In view of the above described requirement, for example, several proposals have been made in the prior art to intercept light which has escaped from the adapter side optical connector 4 by providing a lid which opens and closes the connector hole 2 in the vicinity of the aperture portion of the optical connector adapter 1; for example, reference should be made to Japanese Patent Application, First Publication, Nos. Hei 6-201953 and 2002-243978.

However, there have been the following kind of problems with such interception of light using the above described type of lid. (1) With many suggested structures, it has been necessary to perform the release actuation manually when inserting the optical connector, and the labor required for this operation is burdensome. (2) The structure suggested for assembly to the optical connector adapter for free opening and closing has been complicated, and has involved a large number of component parts, so that the cost has been high. In this case, it has also been difficult to make the structure compact, so that it has been necessary to change the basic structure of the optical connector adapter to a considerable extent, and to make it larger. (3) Since making the structure more compact has been difficult according to the reasons given in (2) above, it has been difficult or impossible to respond to current demands for increasing the number of lines dealt with by the optical connector adapter, for increasing the density of the connector fitting holes, and for improvement of compactness.

Furthermore, in recent years, the requirements for electromagnetic radiation shielding capability which have been imposed upon items of electrical and electronic equipment have become more severe, and, in order to exercise protection so that no influence due to electromagnetic radiation from the exterior is experienced by any electronic components internal to the chassis, to prevent radiation of electromagnetic radiation from the subject item of equipment in question, and to ensure than no influence due to electromagnetic radiation is exerted upon other items of electrical or electronic equipment which are exterior to the subject item, it is per se conventional to utilize a chassis which is made of a metallic material or the like so that it is endowed with electrical conductivity and accordingly exhibits an electromagnetic radiation shielding capacity; but there has been the problem that, as shown by way of example in FIGS. 62 through 64, in order to fit such an optical connector adapter 1 to a fitting wall 6 of a chassis 5, it has been necessary to form a connector fitting hole 7 in the fitting wall 6 of the chassis 5 which is of a size large enough for it to be possible to insert the optical connector adapter 1 into the hole. For this, it has been widely practiced to use a component which is made from plastic as the optical connector adapter 1; but however, if this type of optical connector adapter 1 is inserted into the connector fitting hole 7 and is fitted to the fitting wall 6, it is not possible to ensure a satisfactory electromagnetic radiation shielding capacity for the connector fitting hole 7, even if the chassis 5 itself is endowed with a good electromagnetic radiation shielding capacity.

In view of the above problem, it has been contemplated to attach an electrically conductive cover over the outside of the optical connector adapter 1; but since, for example, it is a practical impossibility to provide such an electrically conductive cover over the connector hole 2 in the vicinity of the aperture portion of the connector adapter 1, from the point of view of ensuring the workability of the action of establishment of the connection of the optical connector 3 to the optical connector adapter 1, as a result, it is not possible to guarantee the electromagnetic radiation shielding capability of the connector fitting hole 2. Due to this, a demand has arisen for a technique which is able effectively to implement electromagnetic radiation shielding of a connector fitting hole which has been pierced through a fitting wall of a chassis of an item of equipment or the like.

It should be understood that this problem of electromagnetic radiation shielding is not limited to the case of an optical connector adapter; for example, a similar problem also arises in the case of various types of optical connector which are made for an optical connector plug to be inserted and connected into them, such as the case when a connector fitting hole is formed in a fitting wall for fitting an optical connector receptacle, or the like.

The present invention has been conceived in the light of the above described problems, and its objective is to provide an optical connector equipped with a shutter, a shutter unit, and an inner piece which is assembled within a connector housing of an optical connector adapter or the like, which can easily make a shutter for light interception more compact and of lower cost; which can guarantee fitting positional accuracy and stability, which can implement improvement in the compactness of the connector housing and increase in its density (i.e., increase in the density of the connector fitting hole); which can easily and securely implement an electromagnetic radiation shielding capability for a connector fitting hole by determining its position and fitting it to a connector fitting hole which has been formed in a fitting wall of a chassis of an item of equipment or the like; and which moreover can ensure anti dust protection for the interior of the connector housing.

SUMMARY OF THE INVENTION

The following means are proposed by the present invention in order to solve the above described problems.

According to its one aspect which relates to an optical connector, the present invention proposes an optical connector equipped with a shutter, comprising a connector housing which is formed with a connector hole into which an optical connector is inserted and connected and within which said optical connector and a connection reception side optical connector are connected together, and within which a shutter unit is assembled; wherein: said shutter unit comprises a main section which is fitted to said connector housing and a plurality of tongue leaf shaped shutter leaves which are linked to said main section in the vicinity of the interior surface of said connector hole, and which, by being arranged so as to project from said main section into said connector hole, intercept light which is emitted from an optical fiber which is exposed at the tip end of said connection reception side optical connector; said shutter leaves are provided in said connector housing as linked to said main section so as to be changeable over by rotational displacement with respect to said main section about linking sections as axes between light interception positions in which they project from said linking sections into said connector hole, and retracted positions in which, by said optical connector being inserted into said connector hole, they are pressed down so as to reduce the amounts by which they project into said connector hole, so as to allow connection of said optical connector to said connection reception side optical connector; and moreover, when said shutter leaves are in said light interception position, said shutter leaves are mutually overlapped over one another so as to close said connector hole.

Further, according to another of its aspects which relates to a shutter unit, the present invention proposes a shutter unit (hereinafter, sometimes this shutter unit will be termed a simultaneously assembled type shutter unit) which comprises a main section which is assembled to a connector housing which is formed with a connector hole into which an optical connector is inserted and connected and within which said optical connector and a connection reception side optical connector are connected together, and a plurality of tongue leaf shaped shutter leaves which are arranged so as to project from said main section into said connector hole of said connector housing; wherein: said main section comprises a main plate portion which is formed with a window into which said optical connector and/or said connection reception side optical connector can be inserted and which is provided within said connector housing and orientated to cut across said connector hole with said window communicating said connector hole, and a pair of extended portions which are extended so as to rise up towards one side of said main plate portion from both opposite edges of said main plate portion; and said shutter leaves are linked to said extended portions so as to be changeable over by rotational displacement with respect to said extended portions about linking sections as axes between light interception positions in which they project from said linking sections into a space between said pair of extended portions, and retracted positions in which, by being pressed down, they are positioned so as to extend from said linking sections towards the side of said main plate portion; and moreover resilient members which are provided by said linking sections themselves, or alternatively which are provided separately from said linking sections, are arranged to function, when said shutter leaves have been rotationally displaced from their said light interception positions, as pressing and returning biasing members for pressing and returning said shutter leaves back to their said light interception positions, and, when both said shutter leaves are in their said light interception positions, said shutter leaves are mutually overlapped over one another so as to close said connector hole.

It should be understood that the shutter unit which is incorporated in this optical connector equipped with a shutter according to the present invention is not limited to being a shutter unit of the above described simultaneously assembled type; for example, as shown in the figures, it would also be possible to utilize a shutter unit which is made by linking only one single shutter leaf to a main section (a bracket) which is fitted to the connector housing (hereinafter, sometimes this type of shutter unit will be referred to as a separately assembled shutter unit). If such a separately assembled shutter unit is to be utilized, several of them are assembled within the connector hole so that they overlap with one another, whereby an assembly of shutter leaves is built up which can close up the connector hole.

The connector housing of this optical connector equipped with a shutter according to the present invention is one for an optical connector which has a connector hole into which an optical connector plug is inserted and connected: for example, one which is made, like an optical connector adapter, so that optical connector plugs which have been inserted and connected from both opposite ends thereof are mutually connected together within it, or an optical connector receptacle or the like which, by an optical connector plug being inserted into its connector hole, houses that optical connector plug and an optical connector (an optical connector ferrule and the like) which is optically connected thereto.

The shutter leaves are elements which have the property of being able to intercept light which is emitted from the connection reception side optical connector, and they are arranged within the connector hole so as to be able thus to intercept light which is emitted from the connection reception side optical connector in the connector housing by extending from the main section which is inclined at some angle (including an angle of inclination of 90°) with respect to the axial direction of the connector hole. These shutter leaves are arranged in positions (hereinafter also sometimes termed their light interception positions) which intercept light which has been emitted from the connection reception side optical connector. With the present invention, the demand for light interception is satisfied by at least one from among the plurality of shutter leaves which are disposed within the connector housing being in its light interception position.

By the connection reception side optical connector is meant an optical connector plug which is inserted into the connector hole of the optical connector adapter (the connector housing) in advance, before the optical connector is inserted into said connector hole, and, by the optical connector being inserted into the connector hole, this connection reception side optical connector is connected within this connector hole with the optical connector. As shown for example in FIGS. 17A and 17B, in the optical connector receptacle (the connector housing), the portion to which the optical connector 7 which has been inserted into the connector hole 46 is arranged to be connected, and which is located at the bottommost end of the connector hole 46 (the right end in FIGS. 17A and 17B) which is provided in the housing 45$h$ of the optical connector receptacles 45$a$, 45$b$, is the connection reception side optical connector. Although in the optical connector receptacle 45$a$ of FIG. 17A the optical connector 48 is separate from the housing 45$h$, the present invention should not be considered as being limited to this structure; for example, as with the optical connector receptacle 45$b$ shown in FIG. 17B, it would also be possible for it to be a portion 49 (this portion 48 is the connection reception side optical connector) of the housing 45$h$ which has been formed in the shape of a connector. It should be understood that, in FIGS. 17A and 17B, the main section of the shutter unit has been omitted from the drawing.

With the present invention, the shutter leaves of the shutter unit (designated by the reference symbol 40 in FIGS. 17A and 17B) are disposed so as to oppose the optical fiber which is exposed at the tip end of the connection reception side optical connector. When the optical connector is inserted into the connector hole of the connector housing, the shutter leaves are pressed down by the pressing force due to the optical connector so that the amounts by which they project into the connector hole are reduced, so that no impediment is provided to the task of connecting the optical connector to the connection reception side optical connector.

It should be understood that although, with the present invention, a structure has been utilized in which, when taking out the optical connector from the connector hole, the shutter leaves are returned to their light interception positions, there are various possibilities which can be employed for such a structure (i.e., for the pressing and returning biasing means), such as, for example, utilizing an element which has been made by forming a portion of a member which is incorporated in the shutter unit into a spring shape (such as by forming a portion of the shutter leaf itself, or a linking section itself, into a spring shape, or by forming a projection or the like from the main section of the shutter leaf or from the shutter unit into a spring shape), or providing a resilient member such as a spring or the like which is separate from the shutter proper, or the like. Furthermore, it would also be possible to employ a method of engagement and disengagement with the optical connector by magnetic attraction, or the like.

With the present invention, when either or both of the plurality of shutter leaves which have been provided within the connector housing are in their light interception positions, this causes the entire connector hole to be closed off (i.e., the connector hole is closed off across almost its entire cross sectional extent), so that, along with it being possible effectively to implement interception of the light which has been emitted from the connection reception side optical connector, in particular, the beneficial aspect is obtained of ensuring a good dust interception characteristic for the connector hole. Furthermore, if a structure is utilized in which the connector hole is closed off over almost its entire extent in the cross sectional direction (the direction which is orthogonal to its axial direction) by the plurality of shutter leaves, then it becomes possible to reduce the size of a single shutter leaf. Since the shutter leaves can shift within the connector hole due to pressure from the optical connector (i.e., they can be pressed down, and can subsequently return to their light interception positions), therefore they should be formed in shapes which can avoid interference with projections or the like within the connector hole. If these shutter leaves are of small size, it is possible to shorten their range of movement within the connector hole, so that, since it becomes possible to reduce interference with projections or the like within the connector hole, the beneficial aspect is obtained that it is possible to anticipate enhancement of the dust interception characteristic within the connector hole, because, as a whole, the cross sectional form of the connector hole can be made of such a size as to be more reliably closed off.

Furthermore, with the present invention, it is also possible to utilize a shielding member which is endowed with electrical conductivity, which is housed within the connector hole of the connector housing in the vicinity of the position where said optical connector and said connection reception optical connector are connected together with one another; and it is also possible to utilize a structure in which a window is formed in said shielding member, with this window being able to pass a ferrule which is provided at the tip end of said optical connector and/or a ferrule which is provided at the tip end of said connection reception side optical connector.

It is possible to employ various types of structure for such a shielding member; for example, a main plate portion or the like of a shutter unit of a type which is all assembled at the same time as said shutter unit may be utilized. However, the present invention is not to be considered as being limited to such a structure: alternatively, it would be possible to utilize various other types of structure, such as one in which a plate shaped or wedge shaped structure which was arranged so as to follow along a main plate portion of a shutter unit of a type which is all assembled at the same time, or a plate shaped or wedge shaped structure which is housed within a connector housing to which a shutter unit of a type which is not assembled all at the same time is assembled, or the like. It should be understood that, if a shutter unit of a type which is assembled all at the same time and a shielding plate portion which is separate therefrom are assembled to the connector housing, it is possible to communicate together the optical connector and the connection reception side optical connector within the connector housing by communicating together a window which is formed in the main plate portion of the shutter unit and a window which is formed in the shielding member.

When an optical connector equipped with a shutter of this structure is, for example, positioned in and fitted to a fitting wall of a chassis of an item of electrical equipment, the shielding member functions as an electromagnetic radiation shielding member for ensuring the electromagnetic radiation shielding capability of the connector fitting hole. It is needless to say that, from the point of view of better ensuring a reliable electromagnetic radiation shielding capability, as a shielding member, it is effective to employ an element of dimensions and of a shape which can be located so as to close up the connector fitting hole over as much as possible of its range in width. Furthermore, with this structure, it is desirable to utilize members which are endowed with electrical conductivity for the shutter leaves and so on, indeed for many of the members which make up the shutter unit, so as to make them function as electromagnetic shielding members, from the point of view of ensuring a good electromagnetic radiation shielding capability for the connector fitting hole. The shielding member effectively exhibits an electromagnetic radiation shielding function by itself being electrically connected as a ground, if, for example, members which are provided to the fitting wall are electrically conductive, or if the fitting wall itself is electrically conductive. It is possible to utilize various different materials in various different structures for such a shielding member which is endowed with an electromagnetic radiation shielding capability (i.e. with electrical conductivity): for example, it would be possible to utilize a member which is formed from a metallic plate which is endowed with electrical conductivity, such as for example stainless steel or the like, or a member which is formed from a synthetic resin in which are dispersed minute particles of a material which is endowed with an electromagnetic radiation shielding capability, such as carbon filler or the like; or, alternatively, a member which included a base member such as a plate member or the like upon which was painted a layer of a paint type material which was endowed with electrical conductivity (such as, for example, a paste or the like into which were dispersed magnetic metallic particles which were endowed with a capability of absorbing electromagnetic radiation), or a member in which an electrically conductive cloth layer made from electrically conductive fibers (i.e. metallic fibers or the like) was fixed to a plate member, or the like, might be utilized. It would also be possible to obtain the same type of beneficial effect if such a material which is endowed with an electromagnetic radiation shielding capability is also utilized for the members other than the shielding member, among the members which make up the shutter unit.

The window in the shielding member is for making it possible to connect together the optical connector and the connection reception side optical connector, and, from the point of view of guaranteeing a good electromagnetic radiation shielding capability, it is desirable for this window to be made to be as small as possible. By doing so, it is possible effectively to ensure a good dust interception characteristic and a good electromagnetic radiation shielding capability for the connector fitting hole, since it is possible to dispose the shielding member so as to cut off the greater portion of the connector fitting hole, except for a small portion which corresponds to the window. It will be sufficient if the window which is formed in the shielding member is made to be, at least, of a size which is capable of passing the ferrule at the tip end of said optical connector and/or the ferrule which is at the tip end of said connection reception side optical connector.

It should be understood that, here, apart from the ferrule which projects at the tip end of the housing of various types of optical connector plug such as an MPO type optical connector or an SC type optical connector or the like, the term "ferrule" of the optical connector and of the connection reception side optical connector is meant to include, also, for example, any portion which functions as a ferrule and which is formed at the tip end of the housing of an optical connector plug as a single unit with a housing which is made from a synthetic resin material, or the like.

Furthermore, as a means for solving the above described problem, according to another of its aspects which relates to an optical connector, the present invention proposes an optical connector equipped with a shutter, comprising a connector housing which is formed with a connector hole into which an optical connector is inserted and connected and within which said optical connector and a connection reception side optical connector are connected together, and within which a shutter unit which intercepts light emitted from said connection reception side optical connector is assembled; wherein: said shutter unit comprises a main section which is fitted to said connector housing and a plurality of tongue leaf shaped shutter leaves which, by projecting from said main section into said connector hole, are arranged to be capable of intercepting light which is emitted from an optical fiber which is exposed at the tip end of said connection reception side optical connector; and said shutter leaves comprise light interception plate portions which are assembled to said connector housing and are arranged in positions to oppose a junction end face of said connection reception side optical connector tip end, and connector contacting portions which are pressed by a portion of said optical connector, when it is inserted in said connector hole, other than said junction end face thereof; so that: by said connector contacting portions being pressed by said optical connector, they are pressed down so that the amounts by which they project within said connector hole are reduced, so as to enable the connection of said optical connector to said connection reception side optical connector; and moreover, when said optical connector is contacted against said connector contacting portions, a non contacting state of said light interception plate portions with respect to said junction end face of said optical connector is maintained.

This optical connector equipped with a shutter according to the present invention may be, for example, an optical connector made so that optical connector plugs which are inserted and connected from both opposite ends are mutually connected to one another internally, such as an optical connector adapter, or may be an optical connector which has a connector hole into which an optical connector plug is inserted and connected, such as an optical connector receptacle or the like which, by such an optical connector plug being inserted into the connector hole, internally houses this optical connector plug and an optical connector which is optically connected thereto (via an optical connector ferrule or the like).

These shutter leaves are elements which are endowed with a light interception capability, i.e. which can intercept light which is emitted from a connection reception side optical connector, and they are arranged within the connector hole so as to be able, by extending from the main section so as to be inclined at an angle (which includes the possibility of an angle of 90°) to the axial direction of the connector hole, to intercept the light which is emitted from the connection reception side optical connector within the connector housing. However, although these shutter leaves are arranged in positions (hereinafter sometimes termed their light interception positions) so as to intercept at least the emitted light from the connection reception side optical connector, it is not absolutely necessary for them to be of a size to reliable close off the entire connector hole. Nevertheless, if these shutter leaves are made to be of a size to reliably close off the entire connector hole (i.e. of a size such that they can extend over the entire cross section of the connector hole), then there is the beneficial aspect that it is possible to ensure a good dust interception characteristic for the connector hole.

By the connection reception side optical connector, for an optical connector adapter (a connector housing), there is meant an optical connector plug which, before the insertion of the optical connector into the connector hole, is first inserted into the connector hole, and which is connected with the optical connector within the connector hole by the insertion of the optical connector into the connector hole. For an optical connector receptacle (a connector housing), for example, as shown in FIGS. 45A and 45B, the portion which is assembled to the housing 45*h* of the optical connector receptacles 45*a* and 45*b* so as to be disposed at the bottommost side of the connector hole 46 (its right side in FIGS. 45A and 45B) and which is made so that an optical connector 47 which has been inserted into the connector hole 46 is connected thereto is the connection reception side optical connector. Although, in the case of the optical connector receptacle 45*a* of FIG. 45A, the optical connector 48 is separate from the housing 45*h*, the present invention is not to be considered as being limited by this structure; for example, as with the optical connector receptacle 45*b* shown in FIG. 45B, it would also be possible, as an alternative, for one portion of the housing 45*h* to be formed in the shape of a connector as a portion 49 (this portion 48 is the connection reception side optical connector). It should be understood that, in the interests of convenience, the main section of the shutter unit is not shown in FIGS. 45A and 45B.

The shutter leaves of the shutter unit according to the present invention (which are denoted by the reference symbols 40 in FIGS. 45A and B) comprise light interception plate portions (designated in FIGS. 45A and 45B by the reference symbol 41) which intercept light which has been emitted from the optical fiber which is exposed at the tip end of the connection reception side optical connector, and connector contacting portions (designated in FIGS. 45A and 45B by the reference symbol 42) which are pressed by the optical connector which has been inserted into the connector hole of the connector housing, and the light interception plate portions are disposed so as to oppose the optical fiber which is exposed at the tip end of the connection reception side optical connector. When the optical connector is progressively inserted into the connector hole of the connector housing, due to the pressing force by which the optical connector presses upon the connector contacting portions, the shutter leaves are progressively pressed down so that the amounts by which they project into the connector hole are reduced, and accordingly the task of establishing a connection between the connection reception side optical connector and the optical connector can proceed without any damage. Moreover, since the connector contacting portions of the shutter leaves are pressed by locations of the optical connector other than its junction end face (designated in FIGS. 45A and 45B by the reference symbol 47*a*), and since the connector contacting portions are further contacted against the optical connector, accordingly the non contacting state of the light interception portions of the shutter leaves against the junction end face of the optical connector comes to be maintained. As a structure for maintaining the non contacting state of the light interception plate portions with respect to the junction end face of the optical connector when the connector contacting portions are contacted against the optical connector, for example, it is possible to implement a structure in which the connector contacting portions are projecting portions which are formed more towards the side of the insertion aperture of the optical connector in the connector housing, as compared to the light interception plate portions (to the left side in FIGS. 45A and 45B), or the like.

In other words, as the optical connector is inserted into the connector hole, the connector contacting portions of the shutter leaves are pressed by the housing of the optical connector before its junction end face comes into contact with the light interception plate portions of the shutter leaves, and subsequently the non contacting state of the light interception plate portions of the shutter leaves against this junction end face of the tip end of the optical connector is maintained as the pressing down continues and the amounts by which the shutter leaves project within the connector hole are progressively diminished. Due to this, when the optical connector is pressed open so as to press down the shutter leaves, the junction end face of the optical connector does not come into contact with the shutter leaves, so that it is possible to protect the junction end face of the optical connector from damage or the like due to contact with the shutter leaves, and thereby stably to maintain its optical characteristic.

It should be understood that although, with the present invention, a structure is utilized by the action of which, when the optical connector is taken out from the connector hole, the shutter leaves are returned to their light interception positions, the details of this structure should not be considered as being limited to the ones shown and disclosed with regard to the various preferred embodiments of the present invention which will be discussed hereinafter; for example, it would be possible to employ a structure in which the shutter leaves were returned to their positions in which they were able to intercept the light which was emitted from the connection reception side optical connector by biasing force which was generated due to the elasticity of the shutter leaves themselves, or by the biasing force of biasing members such as springs or the like which were provided to the shutter unit.

With the present invention, it is possible to provide, in said connector housing, a pair of said shutter leaves, in which case the positions where said shutter leaves are linked to said main section may be positions on both sides of the central axis of the connector hole of the connector housing, with said shutter leaves being provided so as to project from their said positions where they are linked with said main section into said connector hole, and so as to mutually overlap with one another so as to close up said connector hole. In this case, it is possible to reduce the size of each one of the shutter leaves.

In the present invention, the shutter leaves were formed in shapes which avoided any interference with projections or the like within the connector hole, in order for pressure by the optical connector to be able to shift them down (to press them down) within the connector hole. If the shutter leaves are small sized, it is possible to reduce their range of possible movement within the connector hole, and, since it is possible thereby to reduce the possibility of interference with projections and the like within the connector hole, provided that they are formed to be of a size which can reliably close off the entire cross section of the connector hole, there is the beneficial aspect that it is possible to anticipate enhancement of the dust interception characteristic within the connector hole.

It should be understood that the case of this structure is not to be considered as being limited to one in which two shutter leaves are provided to the main section of the same shutter unit; it would also be possible to employ a structure in which two shutter leaves were provided within the connector housing as being supported by main sections of separate shutter units.

Furthermore, as a means for solving the above described problem, according to another of its aspects which relates to an optical connector, the present invention proposes an optical connector equipped with a shutter, comprising a connector housing which is formed with a connector hole into which an optical connector is inserted and connected and within which said optical connector and a connection reception side optical connector are connected together, and within which are assembled a shutter unit, which intercepts light which is emitted from said connection reception side optical connector, and an inner piece; wherein: in the interior of said connector housing, there are formed an engagement claw which engages with said optical connector which has been inserted into said connector hole of said connector housing, and long grooves which extend along the axial direction of said connector hole on both sides of said engagement claw; said inner piece is provided in the vicinity of the connection position between said optical connector and said connection reception side optical connector, and comprises an inner main section which is formed with an aperture into which a ferrule which projects at a tip end of said optical connector and/or a ferrule which projects at a tip end of said connection reception side optical connector can be inserted, and a plurality of projections which project from said inner main section towards the side of said optical connector insertion aperture of said connector housing; and said projections of said inner piece are inserted in said long grooves of said connector housing.

The connector housing of the optical connector equipped with a shutter according to the present invention is one which has a connector hole into which an optical connector plug is inserted and connected, and it may, for example, be one such as an optical connector adapter, into which two optical connector plugs are inserted and connected from both opposite ends, so that they can be mutually connected together in its interior; or it may be one such as an optical connector receptacle which houses an optical connector (an optical connector ferrule and the like) which is optically connected to an optical connector plug by insertion of said optical connector plug into the connector hole, or the like.

The shutter leaves are elements which are endowed with a light interception characteristic of being able to intercept light which is emitted from the connection reception side optical connector; it is possible to employ various structures therefor, such as the one which is shown by way of example in FIGS. 60A and 60B, in which two of such shutter leaves are provided which open to extend from upwards and downwards in the axial direction of the connector hole on both sides (like casement windows)—or indeed, alternatively, it would be possible to employ a structure in which only one of such shutter leaves was thus provided—and they are arranged within the connector hole so as to be able to intercept light which is emitted from the connection reception side optical connector within the connector housing. However, it is desirable for the shutter leaf portions to be, at least, disposed in positions in which they intercept the light which is emitted from the connection reception side optical connector, and, furthermore, it is desirable for them to reliably close off the entire connector hole, as much as possible, and for them to be made to be of a size which can reliably ensure the dust interception characteristic of the connector hole.

By the connection reception side optical connector, there is meant, in the case of an optical connector adapter (a connector housing), an optical connector plug which is first inserted into the connector hole, before the optical connector is inserted into the connector hole, so that thereafter, by insertion of the optical connector into the connector hole, it can be connected to the optical connector within the connector hole. Alternatively, in the case of an optical connector receptacle (a connector housing, as for example shown in FIGS. 60A and 60B, the portion which is assembled to the housing 45*h* of the optical connector receptacles 45*a* and

45b and which is disposed at the bottommost end (the right end in FIGS. 60A and 60B) of a connector hole 46, and to which an optical connector 47 which has been inserted into the connector hole 46 is arranged to be connected, is the connection reception side optical connector. Although with the optical connector receptacle 45a of FIG. 60A the optical connector 48 is separate from the housing 45h, the present invention is not to be considered as being limited to this structure; it would also be possible, for example, as an alternative, to employ a structure like that of the optical connector receptacle 45b shown in FIG. 60B, with the portion 49 (this portion 49 includes the connection reception side optical connector and the ferrule 49a) being formed in the form of a connector from one portion of the housing 45h. It should be understood that, in FIGS. 60A and 60B, the main section of the shutter unit has been omitted in the interests of simplicity of illustration.

The two shutter leaves 40 are fitted to the main section of the shutter unit (not shown in the figure) via linking sections 41 so as to be free to rotate with respect thereto, and these two shutter leaves 40 are biased towards their closing positions in which their edges mutually contact one another, in other words towards their positions to close the connector hole 46 from both sides thereof, by biasing members (springs or the like) which are not shown in the figures. An inner piece 61 which is fitted within the connector hole 61 at the bottom side of the shutter unit (the side of the connection reception side optical connector) comprises a main section 63 which is located so as to cut across the connector hole 46, and, in the central portion of this main section 63 (which is also sometimes termed the inner main section), for the optical connector equipped with a shutter of FIG. 60A, an aperture 66 is formed of almost the same size as the cross sectional size of the ferrule 48a of the optical connector 48 and/or of the ferrule 47a at the tip end of the optical connector 47; while, for the optical connector equipped with a shutter of FIG. 60B, an aperture 66 is formed of almost the same size as the cross sectional size of the ferrule 49a which projects at the tip end of the portion 49 which is formed in the shape of a connector from one portion of the housing 45h. Furthermore, with the optical connector equipped with a shutter of FIG. 60B, it would also be possible to employ a structure in which the ferrule 49a is made to be of such a size that it does not project to the side of the shutter leaves 40 from the aperture 66 of the inner piece 61, while the ferrule at the tip end of the optical connector 47 which has been inserted and connected into the housing projects to the side of the connection reception side optical connector 49 from the inner piece 61 via the aperture 66, so as to be connected to the ferrule 49a of the connection reception side optical connector 49.

This inner piece 61 comprises a plurality of projections 64 which extend in the direction of the shutter leaves 40. By these type of projections 64 being inserted into concave portions such as grooves or the like which are formed in the connector housing, as shown by way of example in FIGS. 6 and 56, it is possible to prevent shaking about of the inner piece within the connector housing, and it is also possible to provide enhancement of the dust interception characteristic within the connector housing, and the like.

According to the present invention, as the inner piece, it is also possible to employ a member which is formed from a material which has an electromagnetic radiation shielding capability, so that said inner main section of said inner piece functions as an electromagnetic radiation shielding member due to the action of said electromagnetic radiation shielding material which is provided to said inner main section. For example, if said connector housing is one whose position is fixed relative to said fitting wall and which is fitted to said fitting wall in a connector fitting hole which is formed in said fitting wall, and the inner main section of said inner piece is provided in said connector housing so as to cut across said connector hole, then, when the connector housing is fitted to said fitting wall, said inner piece can exercise the function of a member (hereinafter, also sometimes termed a shielding member) which is endowed with an electromagnetic radiation shielding capability and which is arranged so as almost entirely to close off said connector fitting hole.

In other words, with this structure, the inner main section of said inner piece can function as an electromagnetic radiation shielding member, in order to maintain the electromagnetic radiation shielding capability of the connector fitting hole in the fitting wall. Furthermore, with this structure, from the point of view of ensuring the electromagnetic radiation shielding capability of the connector fitting hole, it is desirable to utilize members which are endowed with electrical conductivity for as many as possible of the members which make up this optical connector equipped with a shutter, such as the members which make up the shutter unit (the main section and the shutter leaves and so on) and the connector housing and the like, whereby these members can be made also to function as electromagnetic radiation shielding members.

It is desirable for the aperture which is formed in the shield portion of the inner piece to be formed of a size which can allow the passage of the ferrule which projects at the tip end of the optical connector and/or of the ferrule which projects at the tip end of the connection reception side optical connector, and, from the point of view of guaranteeing the electromagnetic radiation shielding capability of the connector fitting hole, it is desirable to make this aperture as small as possible. By doing this, it is possible efficiently to ensure the electromagnetic radiation shielding capability of the connector fitting hole, since it is possible to arrange this shield portion of the inner piece so that it covers the larger portion of the connector fitting hole, except for a small portion which corresponds to said aperture.

The assembly of the inner piece and the shutter unit to the connector housing can be performed in various different manners: for example, by insertion during the assembly of the connector housing, by insertion or assembly from the exterior, by embedding within a synthetic resin such as plastic or the like from which the optical connector is made, or the like.

With the present invention, it would also be possible to utilize a structure in which said connector housing was made up from two half housings which are separated from one another by a central portion in the axial direction of said connector hole, so that said inner piece and said shutter unit were assembled within said connector housing so as to be held between said two half housings in the vicinity of the portion where said two half housings were joined to one another. In the case of, for example, an optical connector adapter which is assembled by joining together two half housings, when thus joining together the two half housings, it would be possible to employ a structure in which it was possible to perform assembly by inserting the inner piece and the shutter unit between the two half housings, or the like. In such a case, it would also be possible to utilize a structure in which an alcove for housing the inner piece was formed in the vicinity of the portion where the two half housings are joined together to one another, or the like. Furthermore, it would also be possible to employ a structure in which it was possible to remove the inner piece and the shutter unit by dismantling the connector housing by separating the two half housings from one another.

BRIEF DESCRIPTION OF THE DRAWINGS

FIG. 1 is a figure showing the structure of an optical connector equipped with a shutter according to a first preferred embodiment of the present invention, and more particularly, in this figure, 1A shows a plan view of the connector, 1B shows a left side view thereof, 1C shows a front view thereof, and 1D shows a right side view thereof.

FIG. 9 is a perspective sectional view showing the structure of the optical connector equipped with a shutter of FIG. 1.

FIG. 17 consists of sectional views showing an optical connector receptacle which has been applied to the optical connector equipped with a shutter according to the present invention, and FIG. 17A shows a structure in which a separately built connection reception side optical connector has been assembled to a connector housing, while FIG. 17B shows a structure in which a connection reception side optical connector has been formed integrally with the connector housing.

FIG. 22 consists of views showing the structure of a first preferred embodiment of the optical connector equipped with a shutter of the present invention, and FIG. 22A is a plan view thereof, FIG. 22B is a left side view thereof, FIG. 22C is a front view thereof, and FIG. 22D is a right side view thereof.

FIG. 31 consists of views showing a main section of the shutter unit of the optical connector equipped with a shutter of FIG. 22, and FIG. 31A is a plan view thereof, FIG. 31B is a front view thereof, and FIG. 31C is a side view thereof as seen from the side of one extended portion thereof.

FIG. 45 consists of sectional views showing an optical connector receptacle which has been applied to the optical connector equipped with a shutter according to the present invention, and FIG. 45A shows a structure in which a separately made connection reception side optical connector is assembled within a connector housing, while FIG. 45B shows a structure in which the connection reception side optical connector is formed integrally with the connector housing.

FIG. 50 consists of figures which show the structure of another optical connector equipped with a shutter according to the present invention.

FIG. 51 is a sectional view showing the state in which the optical connector equipped with a shutter of FIG. 50 is fitted to a fitting wall of a chassis, and particularly shows the vicinity of a connector fitting hole in the fitting wall.

FIG. 60 consists of sectional views showing an optical connector receptacle which has been applied to the optical connector equipped with a shutter according to the present invention, and FIG. 60A is a figure showing a structure in which a separately made connection reception side optical connector is assembled within a connector housing, while

DESCRIPTION OF THE PREFERRED EMBODIMENTS

In the following various preferred embodiments of the present invention will be described with reference to the drawings.

Figure 2:
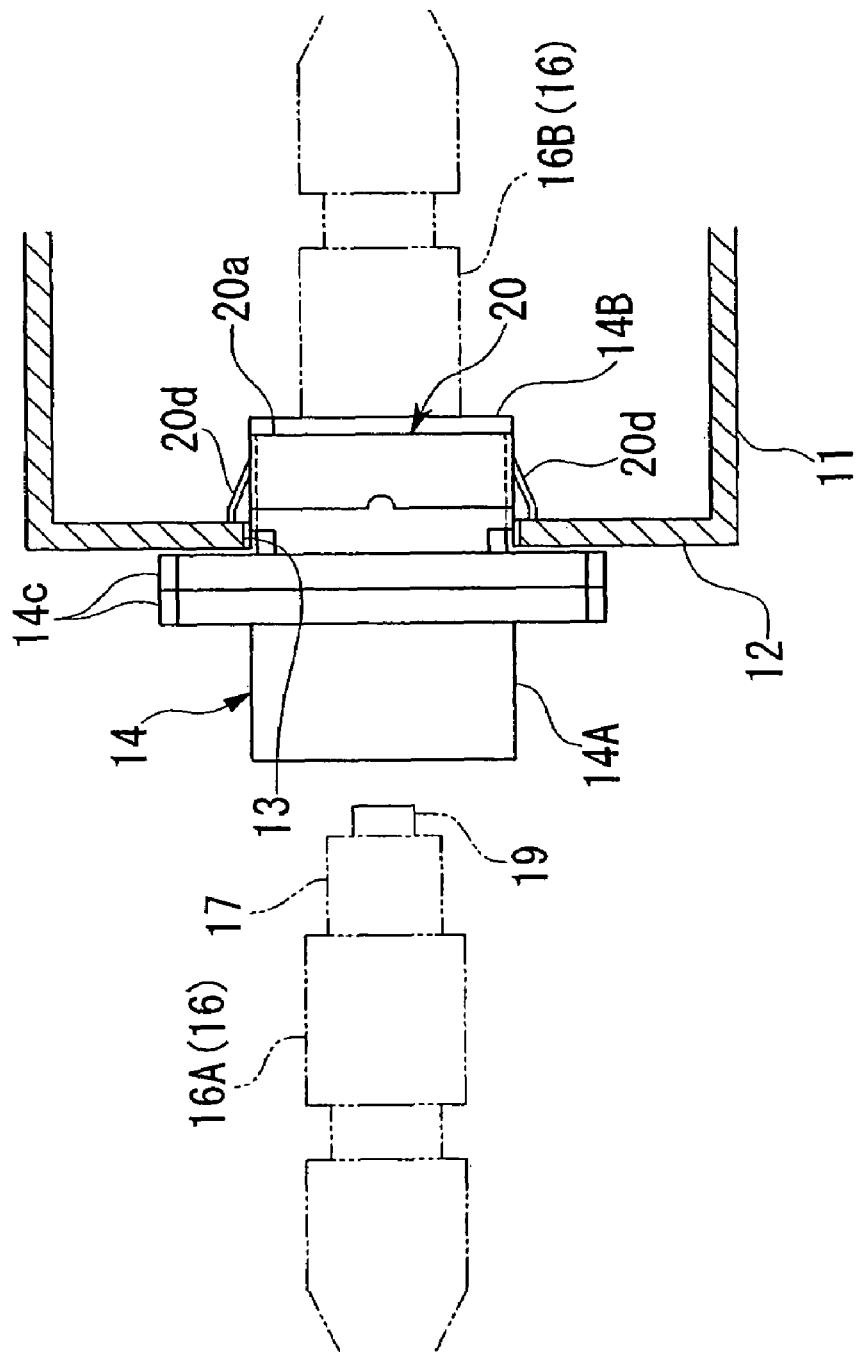
FIG. 2 is a figure showing the optical connector equipped with a shutter of FIG. 1 in its state of being fitted to a fitting wall of a chassis, and is a sectional view showing the vicinity of a connector fitting hole in the fitting wall.
Figure 3:
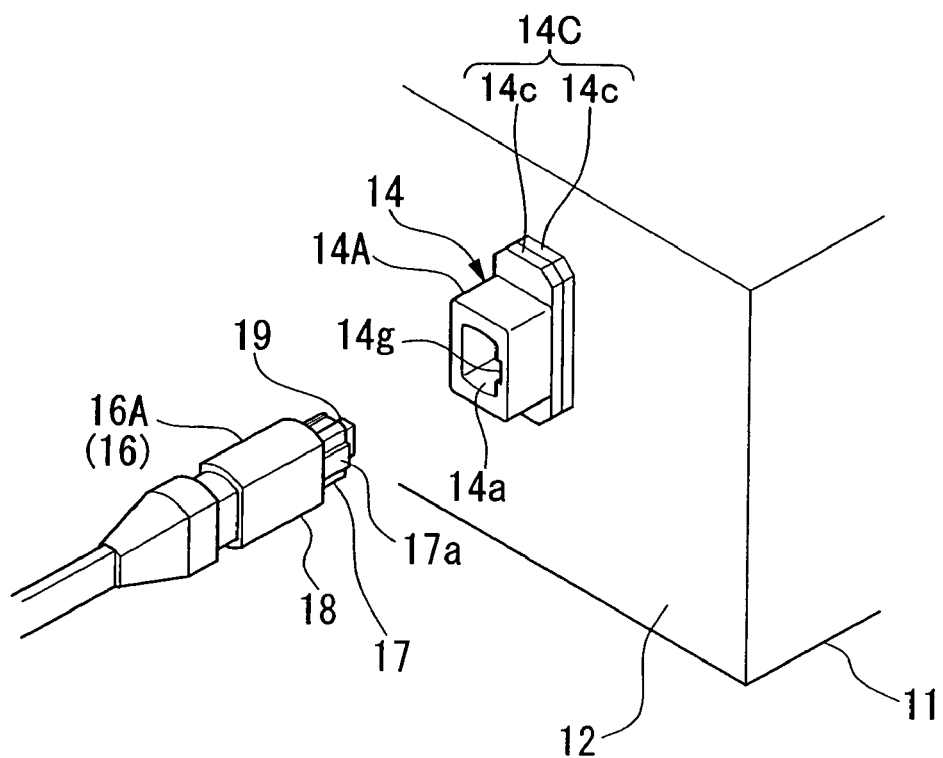
FIG. 3 is a perspective view as seen from the exterior of the chassis, showing the fitting state of FIG. 2.
Figure 4:
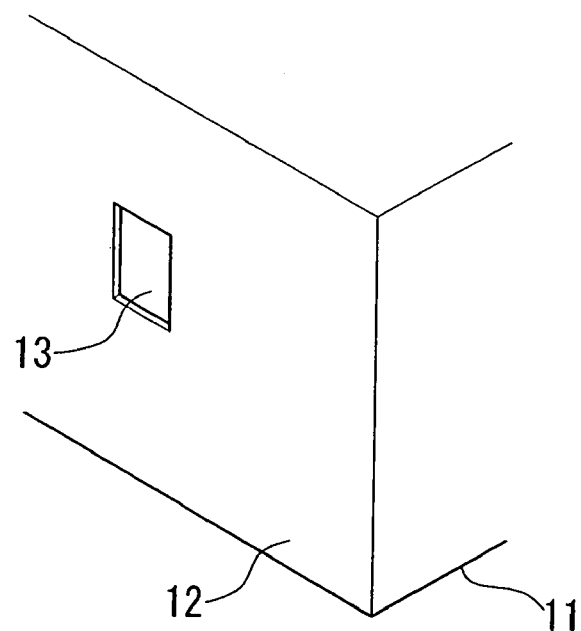
FIG. 4 is a perspective view showing a connector fitting hole which is formed in a fitting wall.
Figure 5:
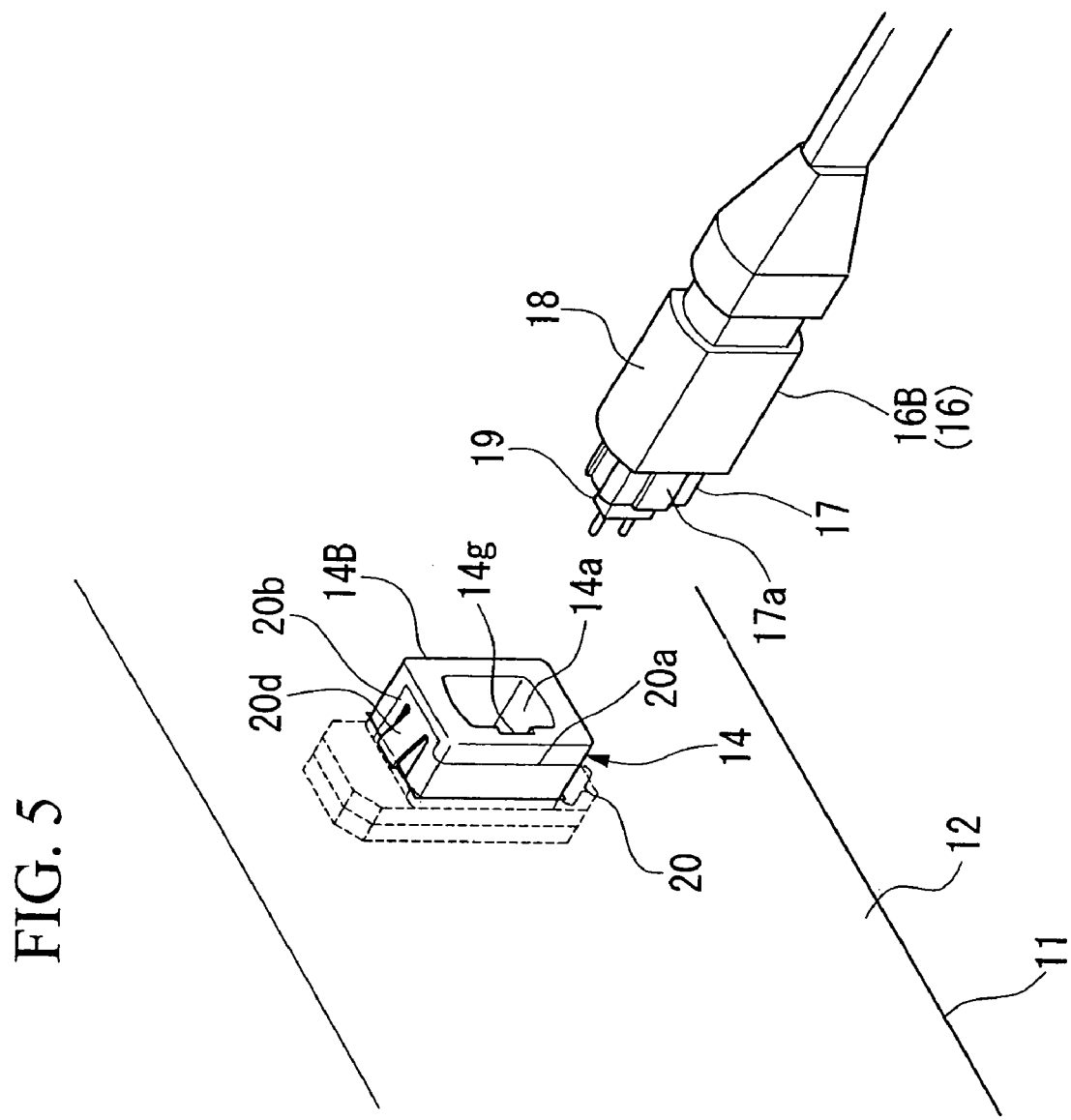
FIG. 5 is a perspective view as seen from the interior of the chassis, showing the fitting state of FIG. 2.
Figure 6:
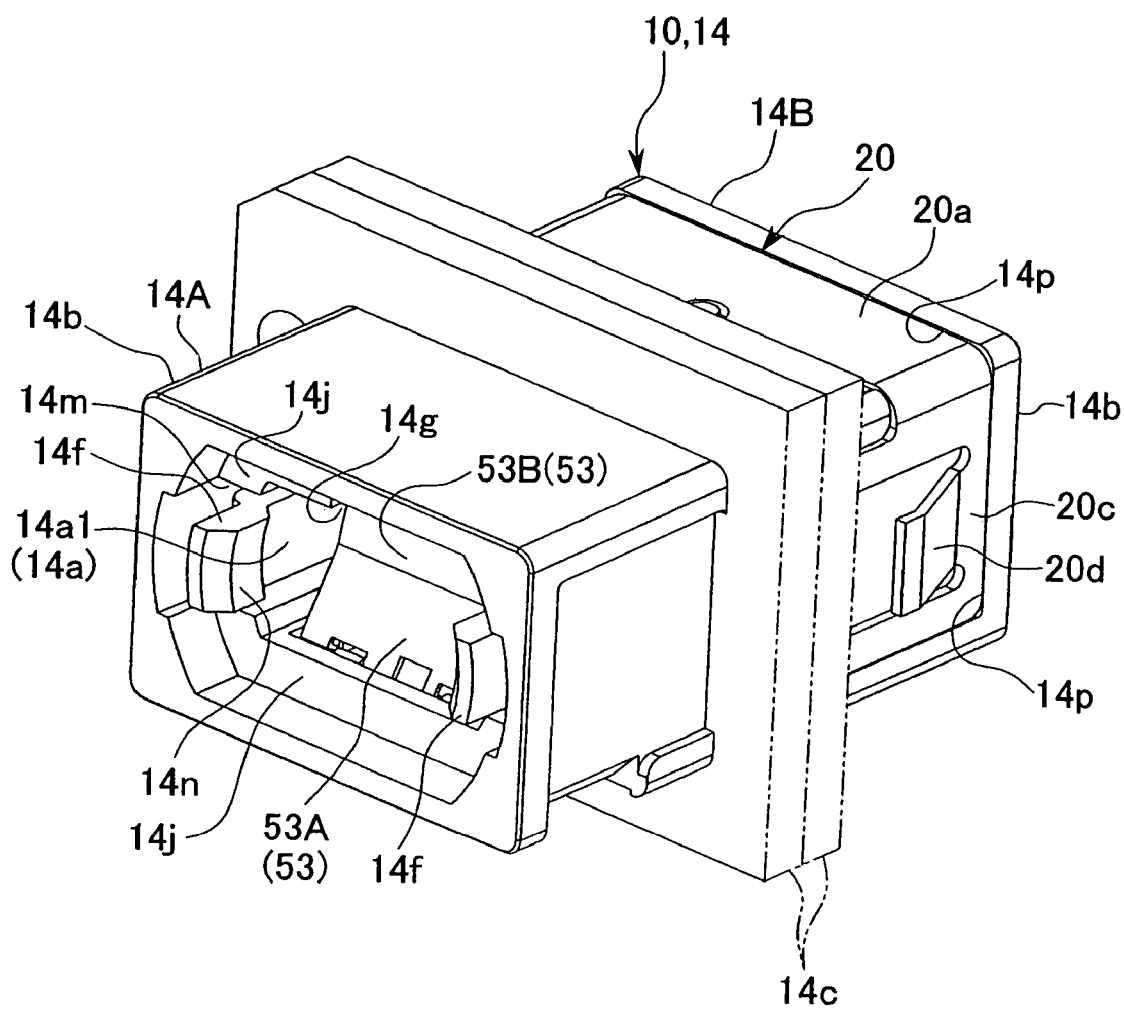
FIG. 6 is an overall perspective view showing a shutter unit of the optical connector equipped with a shutter of FIG. 1.
Figure 7A:
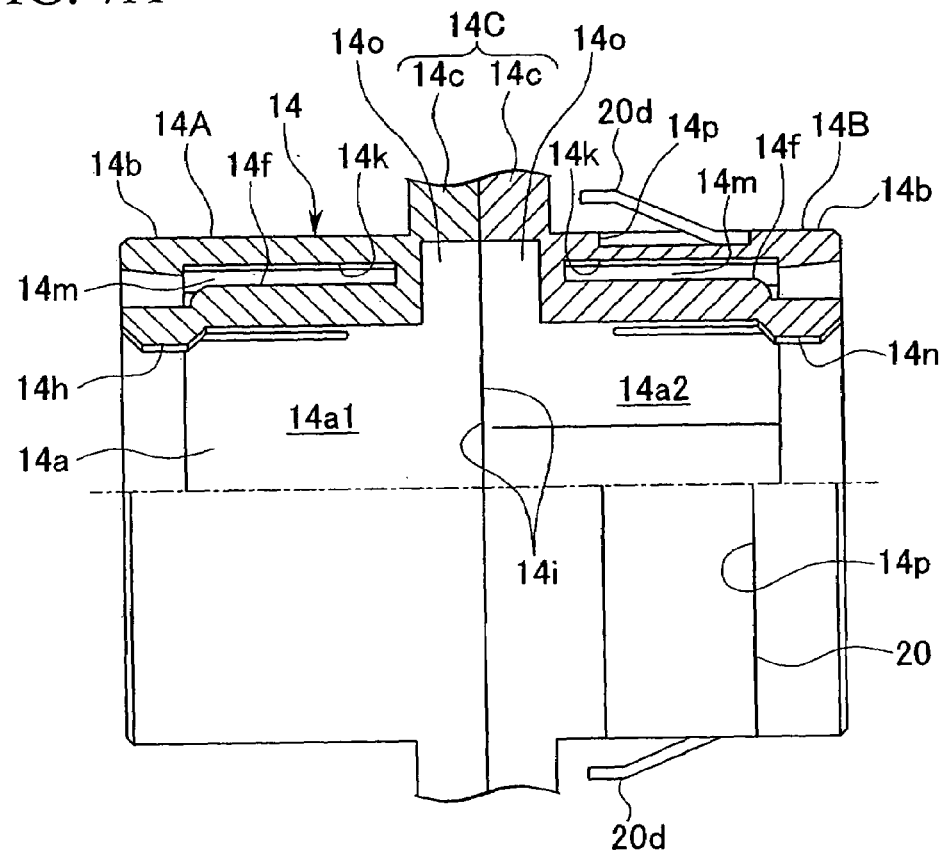
FIGS. 7A and 7B are sectional views showing the connector housing of the optical connector equipped with a shutter of FIG. 1.
Figure 7B:
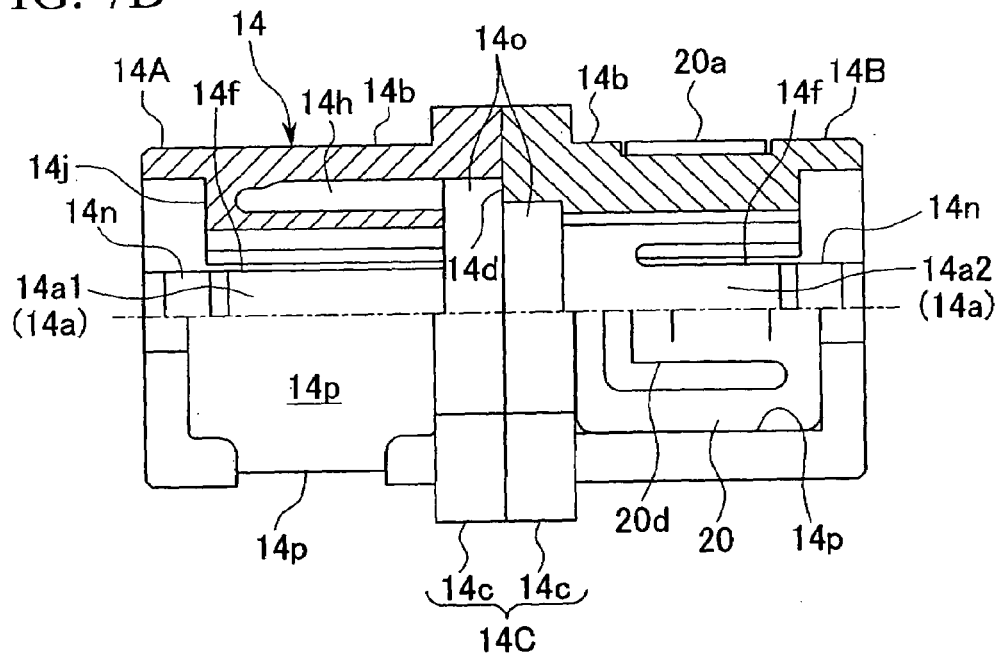
Figure 8:
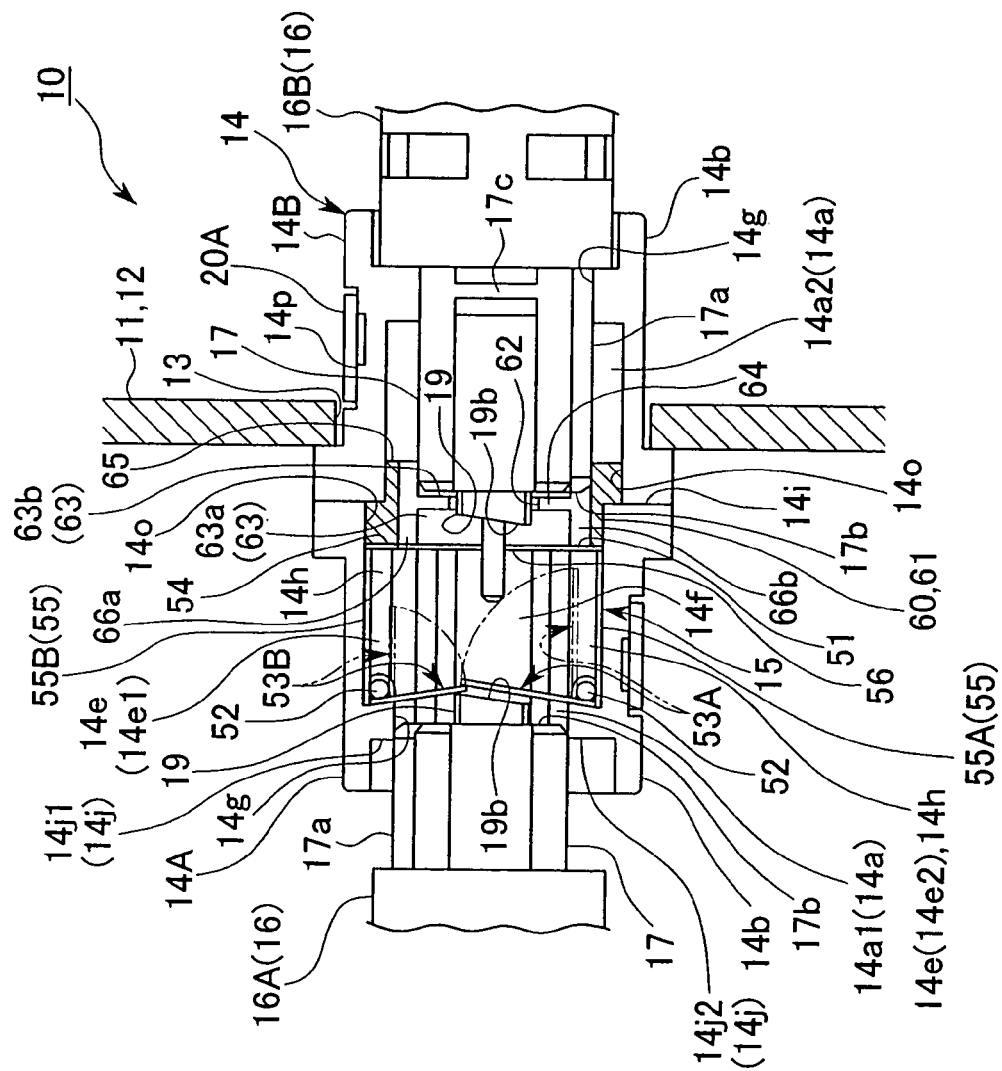
FIG. 8 is a sectional view showing the structure of the optical connector equipped with a shutter of FIG. 1.

FIGS. 1A through 1D are figures showing the exterior appearance of an optical connector 10 equipped with a shutter according to the first preferred embodiment of the present invention; FIG. 2 is a figure showing the optical connector equipped with a shutter 10 of FIG. 1 in its state of being fitted to a fitting wall 12 (a panel) of a chassis 11 of an item of equipment, and is a sectional view showing the vicinity of a connector fitting hole 13 which has been opened up through the fitting wall; FIG. 3 is a perspective view as seen from the exterior of the chassis 11, showing the state of FIG. 2 in which the optical connector equipped with a shutter 10 is fitted to the fitting wall 12; FIG. 4 is a perspective view showing the connector fitting hole 13 which is formed in the fitting wall 12; FIG. 5 is a perspective view as seen from the interior of the chassis 11, showing the state of FIG. 2 in which the optical connector equipped with a shutter 10 is fitted to the fitting wall 12; FIG. 6 is an overall perspective view showing the optical connector equipped with a shutter 10 according to the present invention; FIGS. 7A and 7B are sectional views showing the structure of a connector housing 14 of the optical connector 10 equipped with a shutter of FIG. 1; FIG. 8 is a sectional view showing the internal structure of the optical connector 10 equipped with a shutter of FIG. 1; and FIG. 9 is a perspective sectional view showing the internal structure of the optical connector 10 equipped with a shutter of FIG. 1.

As shown in FIGS. 8 and 9, this optical connector 10 equipped with a shutter comprises, in the interior of a connector housing 14 which constitutes an optical connector adapter, an assembly of a shutter unit 15 and a shielding member 60 (hereinafter also termed a shield plate).

Referring to FIGS. 1A through 1D, this connector housing is an optical connector adapter of the MPO optical connector type (MPO: Multi-fiber Push On, for example as specified by JIS C5982, IEC 1754-7). This connector housing 14 is formed roughly in the shape of a sleeve which has a connector hole 14a pierced through its interior. This connector housing 14 is made by joining together a pair of half housings 14A and 14B and assembling them into a unit. It should be understood that, when the pair of half housings 14A and 14B are joined together and made into a unit, the connector hole 14a of the connector housing 14 is defined by respective connector holes 14a1 and 14a2 of the half housings 14A and 14B being connected together (the connector hole on the side of the half housing 14A is denoted by the reference symbol 14a1, while the connector hole on the side of the half housing 14A is denoted by the reference symbol 14a2).

As shown in FIG. 7, the half housings 14A and 14B are unitarily formed members which are formed from a compound such as, for example, a plastic or the like, and each of them comprises a sleeve shaped housing main section 14b and a projecting flange 14c which is provided as projecting to both sides from one end in the axial direction of this housing main section 14b. And the connector housing 14 is assembled by joining the pair of half housings 14A and 14B directly in series in the axial direction and by connecting them together into a unit. It should be understood that FIG. 7 shows the state in which the half housings 14A and 14B have been directly joined together without a shutter unit 15 or a shield plate 60 being assembled into them.

The pair of half housings 14A and 14B are mutually joined together and unified by their end portions on which the projecting flanges 14c are formed (i.e., by their end portions at the one axial ends of the housing main sections 14b; in the following, these will sometimes be termed the end portions in the axial direction at their junction end face sides), and, due to this arrangement, the connector housing 14 is assembled with the projecting flange 14C which is formed by the mutual overlapping of the projecting flanges 14c on each of the half housings 14A and 14B projecting therefrom on both sides with respect to its central portion in the axial direction (the axial direction of the connector hole 14a).

Furthermore, although various different types of structure may be utilized as constructions for determining the relative position of the pair of half housings 14A and 14B and for mutually unifying them and fixing them together, for example, the pair of half housings 14A and 14B may be fixed together in a unitary state, after having being set in relative positions so that their connector holes mutually communicate together, by engaging together engagement projections (not shown in the drawings) which are formed upon their end surfaces on the sides on which the projecting flanges 14c are formed (their junction end faces 14i) and engagement holes (not shown in the drawings), or by using mechanical means such as for example screws, clamps or the like, or adhesive material or the like. Furthermore, it is also possible to implement the mutual position fixing and unification of the half housings 14A and 14B by placing together the two half housings 14A and 14B, communicating together screw holes 14v (these screw holes 14v are not shown in FIGS. 2, 3, etc.) which are formed in the projecting flanges 14c of these two half housings 14A and 14B, and inserting screws into these screw holes 14v and tightening them up and fixing them therein. Yet further, it is possible to make the screws which are inserted into these screw holes 14v of the projecting flanges of the half housings 14A and 14B also serve as fixing members for attaching the connector housing 14 which is formed by the unification together of the half housings 14A and 14B to a fitting wall 12 such as a wall member of the chassis 11 which is shown, for example, in FIGS. 2 and 3, or the like.

Referring to FIGS. 1C, 1D, 7A, 7B, etc., the reference symbols 14f denote engagement claws (elastic claws) within the connector housing 14, and these (when referring to FIGS. 3 and 5, the explanation sometimes may refer to an optical connector plug (for example, one as specified by JIS C 5982 or IEC 1754-7) of an optical connector of the MPO type by the reference symbol 16, if explaining its structure in common with that of the optical connectors 16A and 16B) are engaged so as to be attachable to and detachable from the engagement portions 17c which are formed on the side portions of the sleeve shaped housing 17 of the optical connectors 16A and 16B which are connected and inserted into the connector housing 14 (the engagement projections as shown in FIGS. 8 and 9). Here, the optical connector 16B is an optical connector which functions as an optical connector on the connection reception side, and hereinafter it may be referred to as the connection reception side optical connector 16B. It should be understood that the guide pins 19c for determining the mutual position of the MPO type optical connector plugs and for connecting them together are assembled to a ferrule 19 of the connection reception side optical connector 16B.

Although here, by way of example, optical connector plugs which are multi-connection type MPO type optical connectors have been shown as the optical connectors, as a MPO type optical connector plug which can be used here, a single connection type would also be acceptable.

These engagement claws 14f are formed integrally with the housing main sections 14b of the half housings 14A and 14B, and they project to the insides of the connector holes 14a1 and 14a2 from the inner surfaces 14k in the connector hole of the inner side of the sleeve shaped housing main body 14b. The engagement claws 14f of the half housings 14A and 14B face, from the end portions of the half housings 14A and 14B in the axial direction of the junction end face 14i side, towards the entrance hole sides (the left and right end portions of the connector housing 14 in FIGS. 7A and 7B) which are opposite to the junction end faces 14i in the axial direction of the connector hole 14a, and are made so as to extend along the inner surface of the housing main section 14b. Furthermore, an approximate clearance 14m is maintained between the portions of these engagement claws 14f which extend along the inner surface of the housing main section 14b, and the inner surface of the housing main section 14b.

The optical connector 16, which is an optical connector plug of the MPO optical connector type, and the two half housings 14A and 14B, are built with a slide lock of a construction such that, when the optical connector 16 is inserted into the connector housing 14 (in more concrete terms, the half housing), along with the engagement projections 14n of the projecting ends from the housing main section 14b of the engagement claws 14f of the half housing being engaged into the engagement portions on the side portions of the housing 17 of the optical connector 16, a lock is engaged which prevents this engagement being released and the optical connector 16 from being pulled out from the half housing; while, when a sliding shroud (a coupling 18) which is attached to the optical connector 16 is pulled, while releasing this lock, it is possible to pull off the optical connector 16 from the connector housing 14 (the half housing).

It should be understood that the configuration of the engagement claws 14f may be varied as appropriate, according to the type of the optical connector 16, the size of the housing 17, the shape of the engagement portions which are formed upon the side portions of the housing 17, or the like.

The engagement claws 14f are not shown in FIGS. 2, 3, and 5, etc., in the interests of simplicity.

Furthermore, the reference symbol 14g denotes a key groove into which a key 17a which is formed as projecting from the side portion of the housing 17 is inserted. The position in which this key groove 14g is formed faces in a relatively opposite direction upon each of the half housings 14A and 14B.

As for features by which the half housings 14A and 14B differ from one another, a shaft insertion groove 14h (refer to FIGS. 8 and 10) is formed on the inside of one of the half housings 14A, while no such groove is formed upon the other half housing 14B; apart from this, their structures are the same. The connector housing 14 is integrally formed so that the directions of the key grooves 14g are relatively opposite on the housings 14A and 14B. The concrete structure of the half housing 14B is not particularly limited, provided that it can maintain the optical connector 16B in place (or, when the ferrule 19 of the end of the optical connector 16A which has been inserted into the half housing 14A has been inserted in the window 56, it is possible to maintain the optical connector 16B in a position which is able to implement connection of this ferrule 19 with the ferrule 19 of the optical connector 16B), so that, when the connection reception side optical connector 16B has been inserted and has been connected, it is possible to maintain the engagement of the optical connector 16B by the engagement claws 14f, and moreover so that the ferrule 19 which projects at the end of the optical connector 16B is inserted into a window 56 of a main plate portion 54 of the shutter unit 15 which will be described hereinafter.

Furthermore, for the connector housing, the structure is not limited to one such as has been described above in which the engagement claws which engage with the optical connector (the optical connector plug) are formed integrally with the housing main sections of the half housings; for example, it would also be possible to employ a structure in which an internal housing of a sleeve shape which was formed as a separate member from the sleeve shaped housing main section of the half housing was received within it, and in which the engagement claws were formed upon this internal housing, or the like.

Figure 11:
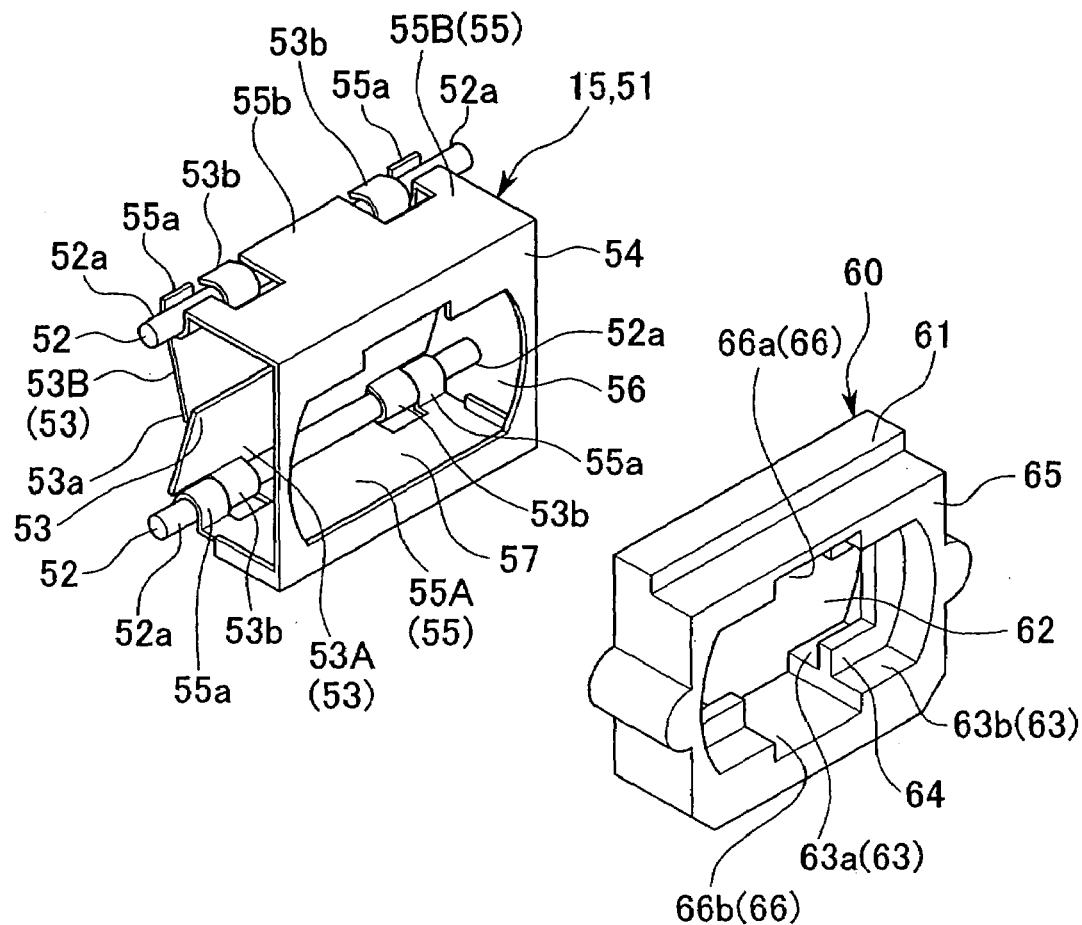
FIG. 11 is a perspective view showing the shutter unit of the optical connector equipped with a shutter of FIG. 1, and a shielding member (shield plate) thereof.

Next, the structure of the shutter unit 15 (which is an integrated type shutter unit) will be explained with reference to FIG. 11 etc. As shown in FIG. 11, the shutter unit 15 is built to comprise a main section 51 which is formed by bending a single metallic plate or the like, and a pair of shutter leaves 53 (to one of which shutter leaves the reference symbol 53A is affixed, while to the other one thereof the reference symbol 53B is affixed) which are mounted to this main section 51 by hinge fitting members 52 so as to be freely rotatable with respect thereto. These hinge fitting members are made with connecting portions which connect the shutter leaves 53A and 53B to the main section 51 while allowing their rotational positions to be varied with respect thereto.

The main section 51 comprises a plate shaped main plate portion 54, and a pair of tongue leaf shaped extended portions 55A and 55B which are extended from both of the opposite sides of this main plate portion 54 so as to subtend substantially right angles with respect to the main plate portion 54. The projections (extensions) of this pair of extended portions 55A and 55B from the main plate portion 54 are in the same direction with respect to the main plate portion 54 (in other words, are towards the same face of the main plate portion 54).

Furthermore, although the shutter leaves 53A and 53B are pivotally attached by the hinge fitting members (shafts) 52 which are provided to the respective extended portions 55A and 55B which project from the edges of the main plate portion 54, it is arranged that, when the shutter unit 15 has been fitted to the connector housing 14 (exactly, to the half housing 14A thereof), for the rotational axes of the rotation of the shutter leaves 53A and 53B about these hinge fitting members 52 to extend in a direction which is orthogonal to the central axis of the connector hole 14a of the connector housing 14. Furthermore, the linking sections between the shutter leaves 53A and 53B (i.e. the hinge fitting members 52) are positioned in locations which are on opposite sides of the central axis of the connector hole 14a of the connector housing 14. Yet further, by the biasing force of springs which are elastic members 58 which are assembled in the vicinity of the hinge fitting members 52 (shown as torsion springs in FIG. 12, by way of example), the shutter leaves 53A and 53B are biased so as to project from their hinge fitting members 52 across the space 57 between the pair of extended portions 55A and 55B, and, in particular, when no external force acts upon them, both of the edge portions 53a of the pair of shutter leaves 53A and 53B which project from their hinge fitting members 52 across the space 57 are mutually overlapped over one another, so as to constitute and function as a single wall member.

Figure 12:
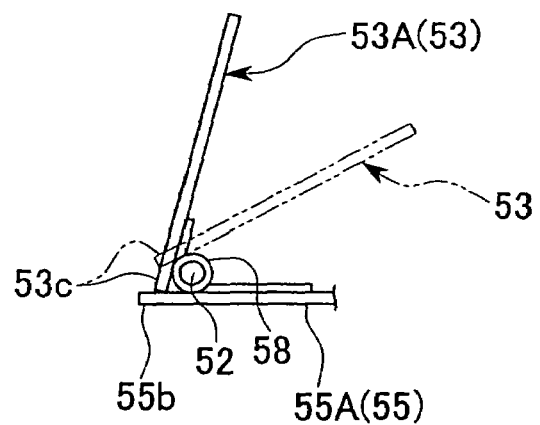
FIG. 12 is an enlarged view showing the relationship between a contacting stopper portion of a shutter leaf of the shutter unit shown in FIG. 11, and a stopper of an extended edge portion.

It should be understood that the springs 58 are omitted from the figures subsequent to FIG. 12.

Furthermore, in this first preferred embodiment of the present invention, all of the members which are incorporated in the shutter unit 15, in other words, the main section 51, the hinge fitting members 52, the shutter leaves 53A and 53B, and the springs 58, are made from materials which are endowed with electrical conductivity, and they are mutually connected together in such a manner that electricity can be conducted between them. In this first preferred embodiment which is shown by way of example, the main section and the shutter leaves are members which are formed from a stainless steel plate material which is endowed with high electrical conductivity.

The shutter unit 15 is inserted from the side of the junction end face 14i towards the half housing 14A, and thus comes to be fitted within the half housing 14A.

Figure 10A:
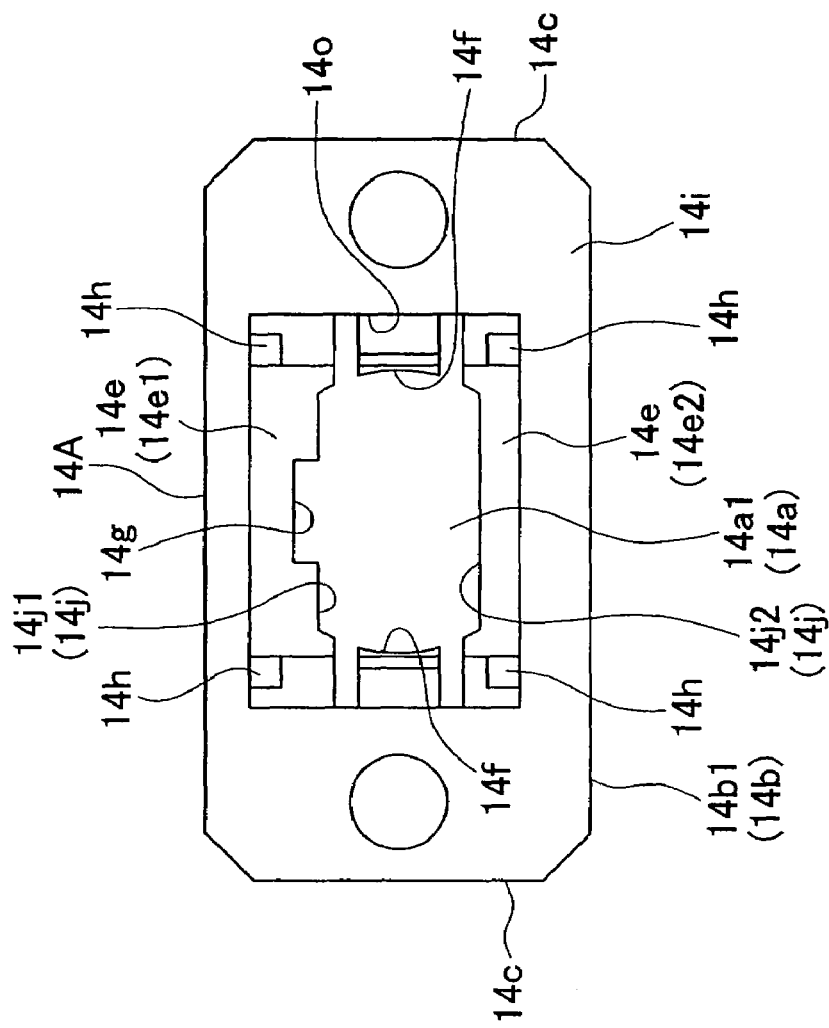
FIG. 10 is a view showing one half housing, among two half housings of the connector housing of the optical connector equipped with a shutter of FIG. 1, which is formed with a shaft insertion groove, and, more particularly, 10A is a sectional view thereof, while 10B is a figure as seen from a junction end face thereof.
Figure 10B:
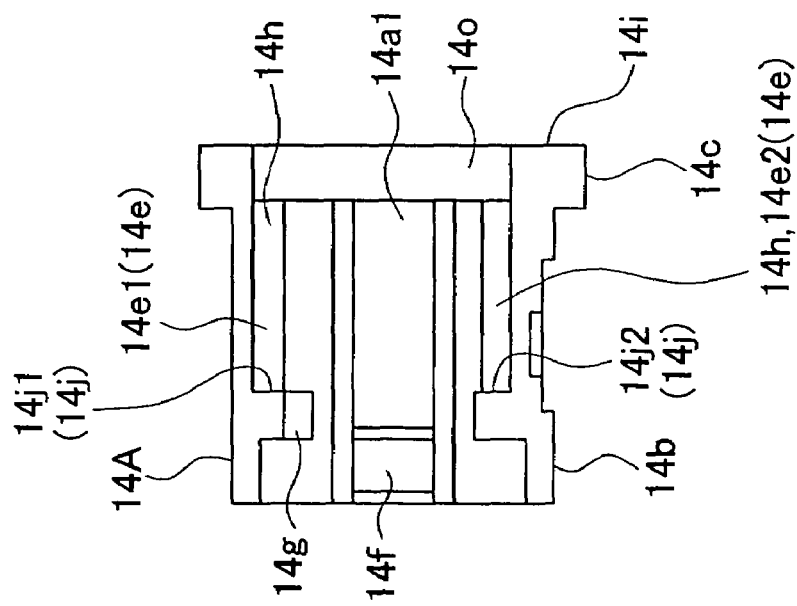

When the shutter unit 15 is to be assembled to the half housing 14A, each of the extended portions 55A and 55B is received in the connector hole 14a1 of the half housing 14A; in concrete terms, they are received in extended portions 14e (refer to FIG. 10), which are portions which extend the connector hole 14a1 on the inner side portions on both sides along the axial line of the connector hole 14a1. Furthermore, as shown in FIG. 10, one of these extended portions 14e (the one which is denoted by the reference symbol 14e1) is a portion which extends the connector hole 14a1 along the side of the key groove 14g and outside of the region in which the optical connector 16A is housed in the half housing 14A, while the other one of these extended portions 14e (the one which is denoted by the reference symbol 14e2) is a portion which extends the connector hole 14a1 along the side which opposes the key groove 14g and outside of said region in which the optical connector 16A is housed in said connector hole 14a1. A pair of engagement claws 14f which are formed on the housing main section 14b in positions on opposite sides with respect to the axial line of the connector hole 14a1 are positioned between this pair of extended portions 14e.

It should be understood that, in this description of the preferred embodiment of the present invention, the term "connector hole 14a1" (and ". . . 14a2") will be used to include the extended portions 14e1 and 14e2 (including also a shaft insertion groove 14h to be described hereinafter, which is one portion of the extended portions 14e).

Each of the extended portions 14e opens up into the junction end face 14i of the half housing 14A, and, in the shutter unit 15, by inserting both of the extended portions 55A and 55B from the side of the junction end face 14i into the extended portions 14e, they can be inserted and stored in the connector holes 14a.

Each of the extended portions 14e is not formed by piercing the half housing 14A along the axial direction of the connector hole 14a1, but rather, in the end portion (the left side in FIG. 8) on the insertion side of the optical connector 16A into the half housing 14A, the wall portion 14j (referring to FIGS. 7B and 8, the division wall) which is provided as extending from the inner surface of the connector hole 14a1 of the half housing 14A functions as a wall portion which blocks off the deepest portion of the extended portions 14e (as seen from the junction end face 14i, the deepest side). This wall portion 14j fulfills the function of supporting the housing 17 of the optical connector 16A which has been inserted into the half housing 14A and of preventing it from shaking about.

The wall portion 14j is formed on both the opposite sides which mutually confront one another across the central axis of the connector hole 14a1, and, between this pair of wall portions 14j, a space is maintained of a shape which almost agrees with the cross sectional shape of the housing 17 of the optical connector 16A which is inserted in the half housing 14A (this space is also a portion of the connector holes 14a, 14a1). The key groove 14g into which is inserted the key 17a of the housing 17 of the optical connector 16A is formed within one of the pair of wall portions 14j (sometimes, in the following, the explanation will be given in terms of affixing the reference symbol 14j1 thereto). The extended portion 55B which has been stored in the extended portion 14e1 on the wall portion 14J1 side, the extended portion 55A which has been stored in the extended portion 14e2 on the wall portion 14J2 side, and the hinge fitting member 52 are made so as not to interfere with the housing 17 of the optical connector 16A during insertion of the optical connector 16A into the half housing 14A. The extended portions 14e are elongated from the wall portions 14j1 and 14j2 along the axial direction of the connector hole 14a, and are formed in the form of grooves which open to alcoves 14o. The extended portions 14e are formed by increasing the size of the connector hole 14a on both sides of its axial line.

As shown in FIG. 11, both ends in the axial direction of the shafts which are the hinge fitting members 52 (hereinafter these hinge fitting members 52 will sometimes be termed shafts) project on both sides of the extended portions 55A and 55B (projecting portions 52a), and both sides of these projecting portions 52a which oppose the extended portions 14e are inserted into shaft insertion grooves 14h (refer to FIGS. 8 and 10) which are portions which are cut into the housing main section 14b in the form of grooves. As shown in FIG. 8, these shaft insertion grooves 14h are formed so as to be elongated along the axial direction of the connector hole 14a1, and, when the shutter unit 15 is inserted into the connector hole 14a from the side of the junction end face 14i, its insertion is limited by the projection portions 52a of each of the shafts 52 hitting the bottommost portions of the shaft insertion grooves 14h. At this time, the projection portions 52a of the shafts 52 are stably supported by the shaft insertion grooves 14h so as not to be able to shake about. Furthermore, both the extended portions 55A and 55B of the shutter unit 15 come to contact the inner surfaces of the portions upon both the sides of the extended portions 14e which are formed within the connector hole 14a1, and are thus supported within the connector hole 14a1. The extended portions 14e also function as position determining grooves which fix the position of the shutter unit 5 as it is stored within the connector hole 14a1.

As shown in FIGS. 8 and 9, in this first preferred embodiment of the present invention, a shielding member 60 is housed within the connector hole 14a and is contacted against the main plate portion 54 of the shutter unit 51 which is housed within the connector hole 14a1 of the half housing 14A. This shielding member 60 is a member of flattened form (a shielding plate), and is arranged in a position which corresponds to the joining boundary between the pair of half housings 14A and 14B, so as to be stored in the alcoves 14o which are formed as hollowed out from the joining end faces 14i of the two half housings 14A and 14B, and so as to be inserted into each of them for about halfway of the respective thickness.

The end portion 14d of the half housing 14B is arranged to contact against the shielding member 60 from its side which is opposite to the main plate portion 54 of the shutter unit 15, and, due to this, along with the shutter unit 15 and the shielding member 60 being pressed by the half housing 14B so that they cannot come out from the connector hole 14a1, also they are stably held within the connector hole 14a so that they cannot shake about therein. It should be understood that, with respect to the shielding member 60, the end portion 14d of the half housing 14B is arranged so that it is contacted against the outer peripheral portion of the end surface 65 on its side which is opposite to the main plate portion 54 of the shielding member 60, and thereby it is ensured that no deterioration is caused to the mutual connection of the optical connectors.

When the shutter unit 15 has been assembled into the half housing 14A, the main plate portion of the main section 51 is positioned so as to cut across the connector hole 14a. Furthermore, the shielding member 60 as well is arranged so as to cut across the connector hole 14a. However, the two sides of the connector hole 14a are communicated together by a window 56 which is formed in the central portion of the main plate portion 54 of this main section 51, and by a window 62 which is formed as being pierced in the shielding member 60, so that the shielding member 60 and the main plate portion 54 of the shutter unit 15 do not hinder the connection together of the optical connectors 16A and 16B which are inserted and connected into the connector hole 14a from both opposing ends thereof. In this optical connector 10 which is equipped with a shutter, the tips of the optical connectors 16A and 16B which have been inserted from both opposing sides into the connector hole 14a (in concrete terms, the ferrules 19) are arranged so as to confront one another and so as to be connected together precisely in the vicinity of the window 62 of the shielding member 60.

It should be understood that, as shown in FIG. 11, it is ensured that the size of the window 56 of the main plate portion 54 of the shutter unit 15 is big enough to be capable of passing the housing 17 of the optical connector 16A. Furthermore, it is desirable for the window 56 to be as small as possible, from the point of view of maintaining its electromagnetic radiation shielding capability (to be described hereinafter); and, in the example shown in FIG. 11, the window 56 is formed so as to have the same cross sectional shape as the housing 17, and so as to have slightly greater dimensions than the cross sectional shape of the housing 17. Yet further, it is also desirable for the window 62 of the shielding member 60 to be as small as possible, from the point of view of maintaining its electromagnetic radiation shielding capability; and, in the example shown in FIG. 8 etc., it is formed so as to have a size which makes it possible to insert the ferrules 19 of the optical connectors 16A and 16B with a slight clearance (i.e. so that it is possible to pass the housing 17 through it).

The shielding member 60 is a member which is formed as a unit from a synthetic resin such as polybutylene terephthalate (PBT) or the like, and, herein, a unitarily formed member is employed which is made from an electrically conductive resin whose entire mass is made to include fine particles which have an action to absorb electromagnetic radiation, such as carbon filler or the like. As shown in FIGS. 8 and 11, this shielding member 60 comprises a main section 61 which is inserted and wedged within the connector hole 14a so as to cut sidewise across the connector hole 14a, and a window 62 which is formed by piercing the central portion of this main section 61. Furthermore, in both sides of the thickness of the main section 61 which is of flattened form, there are formed alcoves 63 into which the end portions 17b of the housings 17 of the optical connectors 16A and 16B are inserted (the reference symbol 63a is appended to the alcove which is disposed on the side of the half housing 14A, while the reference symbol 63b is appended to the alcove which is disposed on the side of the half housing 14B); and the window 62 opens in the central portion of the wall portion 64 which is formed as a partition between the alcoves 63a and 63b on both its sides. The alcoves 63a and 63b on both sides are thus communicated together via the window 62.

The optical connector 16A which has been inserted in the connector housing 14 is supported so as not to be able to shake about therein by the shielding member 60 due to the end portion 17b of the housing 17 being inserted into the alcove 63a, and moreover the ferrule 19 which projects from the end portion of the housing 17 is fixed in a position in which it can be inserted into the window 62. And the key 17a of the housing 17 of the optical connector 16A is inserted into a key groove 66a which is formed in this alcove 63a. The end portion 17b of the housing 17 of the connection reception side optical connector 16B is supported so as not to be able to shake about by the shielding member 60 due to insertion into the alcove 63b, and moreover the ferrule 19 which projects from the end portion of the housing 17 is fixed in a position in which it can be inserted into the window 62. And the key 17a of the housing 17 of the optical connector 16B is inserted into a key groove 66b which is formed in this alcove 63b.

Furthermore, although in FIGS. 8 and 9 a construction is shown by way of example in which the ferrule 19 of the connection reception side optical connector 16B is provided so as to be inserted into the window 62 of the shielding member 60 and so as to project on the side of the half housing 14A, this structure is not to be considered as being limitative; it would also be acceptable for the position of the ferrule 19 of the connection reception side optical connector 16B to be any position which made connection possible with the ferrule 19 of the optical connector 16A end which has been inserted into the connector housing 14 from the side of the half housing 14A, and there is no absolute necessity for it to project from the window 62 to the side of the half housing 14A.

According to the above description, here, the hinge fitting members 52 of the shutter unit 15 are shafts which are fitted to the ends of the extended portions 55A and 55B which project from the main plate portion 54, and, when the shutter unit 15 has been fitted within the connector hole 14a1 of the half housing 14, exactly, they are disposed in a direction which is approximately orthogonal to the axial direction of the connector hole 14a of the half housing 14. Accordingly, these shutter leaves 53A and 53B which are pivotally attached by these shafts (the hinge fitting members 52) to the main section 51 so as to be freely rotatable with respect thereto are supported so as to be freely rotatable in the same direction as these shafts which are the hinge fitting members 52 (in the following, sometimes, these hinge fitting members 52 are also termed the shafts 52); in other words, they are supported so as to be freely rotatable about rotational axes which are approximately orthogonal to the connector hole 14a of the connector housing 14. These shafts 52 are held and maintained inside portions of the extended portions 55A and 55B (shaft holding portions 55a) which have been formed in curved tubular shapes. The shafts 52 are housed in the interiors of shaft holding portions 53b which have been made in portions of the shutter leaves 53A and 53B in curved tubular shapes, so that the shutter leaves 53A and 53B are supported so as to be able to rotate freely around these shafts 52.

It should be understood that, for the convenience of explanation, sometimes in the following, in a case such as this one in which the extended portions 55A and 55B have a common structure, and only the positions in which they project from the main plate portion 54 are different, the reference symbol 55 is affixed to both of these extended portions 55A and 55B.

As shown in FIGS. 8 and 11, the shutter leaves 53A and 53B are small plate leaves shaped in the form of tongue leaves which project from the main section 51 of the shutter unit 15 into the connector hole 14a.

When both of the two shutter leaves 53A and 53B are in light interception positions thereof (to be described hereinafter), the edge portions 53a of these shutter leaves 53A and 53B overlap one another. When pressing force is applied to these shutter leaves 53A and 53B by the optical connector 16 which has been inserted in the connector hole 14a, they are pushed down, and when they return to retracted positions thereof (also to be described hereinafter), the mutual overlapping of their edge portions 53a is cancelled at this time. When the optical connector 16 is pulled out from the connector hole 14a, the shutter leaves 53A and 53B return to their light interception positions due to the biasing force of the springs 58 (refer to FIG. 12), and, again, their edge portions 53a mutually overlap. These springs 58 thus function as biasing members for impelling the shutter leaves so that they are rotationally displaced from their retracted positions to their light interception positions.

It should be understood that it would also be possible to employ various other types of elements as the biasing members for thus returning the shutter leaves 53A and 53B, such as portions of the main section 51 of the shutter unit 15 which were formed into spring shapes, or portions of the shutter leaves 53 which were processed so as to be formed into plate spring shapes, or the like.

As shown in FIG. 8, the shutter leaves 53 are able to change over between an attitude in which, due to rotation about their shafts 52, they are inclined at somewhat of an angle towards the side of the main plate portion 54 from the shafts 52 (the position of the shutter leaves 53A and 53B shown by the solid lines in FIG. 8; this position will sometimes hereinafter be termed their light interception position), and an attitude in which their extended portions 55A and 55B are almost overlapped (the position of the shutter leaves 53A and 53B shown by the dotted lines in FIG. 8; this position will sometimes hereinafter be termed their retracted position).

However, as shown in FIG. 12, for the shutter leaf 53A, in its light interception position (i.e. its position shown in FIG. 12 by the solid lines), further rotation toward the reverse side (in other words, in the case of the shutter leaf 53A, anti-clockwise rotation in FIG. 8) with respect to the main plate portion 54 is prevented by the contacting stopper portion 53c coming into contact against the surface of the projecting edge portion of the extended portion 55A. The situation is the same for the other shutter leaf 53B as well (in other words, in the case of the shutter leaf 53B, rotation from its light interception position in the clockwise direction as seen in FIG. 8 is prevented). The projecting edge portions of the extended portions 55 from the main plate portion 54 function as stoppers 55b which prevent rotation of the shutter leaves 53 from their light interception positions to the opposite side with respect to the main plate portion 54.

The shutter leaves 53A and 53B which are in the light interception positions come to be pressed against their contacting stopper portions 53c by the biasing force of the springs 58, and accordingly it is ensured that they do not clatter about.

It should be understood that, when both of the shutter leaves 53A and 53B are in their light interception positions, since the connector hole 14a is closed up over almost its entire cross sectional extent by the edge portions 53a of these shutter leaves 53A and 53B mutually overlapping one another, in this state, as for example shown in FIG. 8, the light which is emitted from the optical fiber 19a which is exposed at the tip end of the optical connector 16B which has been previously inserted and connected from the opening portion on one side of the connector hole 14a (in detail, the junction end face 19b of the tip end of the optical connector 16; this optical connector 16B will be supposed to be the connection reception side optical connector) can be prevented from escaping from the opening portion on the opposite side of the connector hole 14a. Accordingly, for example, after having inserted the optical connector 16B into the connector housing 14 from the opening portion of the half housing 14B in which the shutter unit 15 is not housed (i.e. from the right side in FIG. 8), when inserting and connecting the optical connector 16A into the connector housing 14 from the opening portion of the half housing 14A in which the shutter unit 15 is housed (i.e. from the left side in FIG. 8), during the operation of insertion and connection of the optical connector 16A into the connector hole 14a, the inconvenience of the emitted light from the connection reception side optical connector becoming hindered does not arise, so that the connection operation can proceed at high efficiency.

Furthermore, in this state in which the shutter leaves 53A and 53B are mutually overlapped in their light interception positions and the connector hole is closed over almost its entire cross sectional extent in this manner, since these shutter leaves 53A and 53B exhibit a dust interception characteristic for the connector hole 14a of preventing the intrusion of dust or the like into the space which is defined between the shutter leaves 53 and the shielding member 60, accordingly it is possible to prevent the inconvenience of the tip end of the connection reception side optical connector 16B (in concrete terms, the junction end face 19b of the ferrule 19) becoming dirty due to adhesion of dust or the like, and the like.

-Regarding the Electromagnetic Radiation Shield for the Connector Fitting Hole-

With the optical connector 10 equipped with a shutter of this preferred embodiment of the present invention, by employing elements which are endowed with electrical conductivity for the connector housing 14 and the shielding member 60, when it is fitted, for example, to the fitting wall 12 of a chassis 11 as shown by way of example in FIGS. 2 through 4, it is possible to ensure good electromagnetic radiation shielding capacity for the connector fitting hole 13. Although, in this preferred embodiment of the present invention, the use has been suggested of elements which have been made from a synthetic resin material which incorporates carbon filler dispersed as particles within the resin for the connector housing 14 and the shielding member 60, in order to endow them with such an electromagnetic radiation shielding function, this is not intended to be limitative of the present invention; for example, it would also be possible to employ elements which incorporated an electrically conductive paint layer which was formed by painting a paint material which was electrically conductive (for example, a paste or the like into which was mixed magnetic metal particles which had an action of absorbing electromagnetic radiation) upon a substrate which was made from a synthetic resin or the like, or elements upon which were fixed electrically conductive cloth layers which were made from electrically conductive fibers (metallic fibers or the like), etc. Furthermore, such fine particles having an action of absorbing electromagnetic radiation are not limited to being carbon filler; it would also be possible to employ various other types of material.

With the optical connector 10 equipped with a shutter of this preferred embodiment of the present invention, in particular, the shielding member 60 effectively and reliably contributes an electromagnetic radiation shielding capability to the connector fitting hole 13. This shielding member 60 comes to close the connector hole 14a over almost its entire cross sectional shape, and, when this optical connector 10 equipped with a shutter is inserted into the connector fitting hole 13 of the fitting wall 12, and is assembled to the fitting wall 12, the connector fitting hole 13 is similarly closed over almost its entire cross sectional shape. And, due to the provision of the connector housing 14 which is in contact with the shielding member 60 and is capable of conducting electricity and/or of the connection circuit which is provided to the connector housing 14 and so on, it is ensured that the shielding member 60 is effectively grounded, so that it is possible for the shielding member 60 to function efficiently as a member of electromagnetic radiation shielding, and thereby it is possible to ensure a good electromagnetic radiation shielding capability for the connector hole 13.

Furthermore, with this optical connector 10 equipped with a shutter, since it is possible to make the connector housing 14 as well function as a member which is endowed with an electromagnetic radiation shielding function, finally, it is possible to close off almost the entire portion of the connector fitting hole 13 with a member which is endowed with an electromagnetic radiation shielding function, except for the portion of the window 62 which is hardly any larger than the outer shape of the ferrule 19, so that an excellent electromagnetic radiation shielding capability is obtained. In other words, when this optical connector 10 equipped with a shutter is fitted to the fitting wall, the connector fitting hole of the fitting wall is put into the state of being closed off by this optical connector 10 equipped with a shutter with hardly any gap being left. Furthermore, with this optical connector 10 equipped with a shutter, it is possible to obtain a better electromagnetic radiation shielding function by utilizing a member which is electrically conductive for the shutter unit 15 as well.

In FIGS. 1 and 2, the shield cover to which the reference symbol 20 is appended comprises three side plate members 20a, 20b, and 20c which are separately attached to three surfaces of the four side surfaces (surrounding surfaces) housing main section 14b (refer to FIG. 1C) of the rectangular cross sectional shaped half housing 14B, thus being a member of cover shape which surrounds the half housing 41B from three sides, and is entirely made from a metallic plate such as a stainless steel plate which is electrically conductive. The three side plate members 20a, 20b, and 20c of this shield cover 20 are attached to the outer sides of the housing main section 14b by receiving them in shallow grooves 14p which are formed on the three surfaces of the housing main section 14b, so that no positional deviation between them can occur. This shield cover 20 is connected so that electrical current can flow between itself and the chassis 11 due to their mutual contact, and thereby, along with exhibiting an electromagnetic radiation shielding capability, it also contributes more effectively to the electrical conduction between the connector housing 14 which is endowed with an electromagnetic radiation shielding capability and the fitting wall 12.

In fitting this optical connector 10 equipped with a shutter to the fitting wall 12, it will be sufficient to press this optical connector 10 equipped with a shutter from the outer side of the chassis 11 (in FIG. 2, from the left side) into the connector fitting hole 13 of the fitting wall 12, with the side on which the shield cover 20 is attached (here, the side of the half housing 14B) being its front side in the pressing in direction (in FIG. 2, it is pressed in towards the right side of the fitting wall 12), so that engagement claws 20d which are projected towards the outside from the side plate members 20b and 20c which are positioned on both sides facing this shield cover 20 pass through the fitting wall 12 while being resiliently deformed. The engagement claw 20d is passed through the fitting wall 12 and resiliently springs back, thus to be engaged with the fitting wall 12. By doing this, the fitting wall 12 is pinched between the engagement claw 20d and the projecting flange 14c, and, at the same time as stably attaching this optical connector 10 equipped with a shutter to the fitting wall 12, conduction of electricity between it and the fitting wall 12 is assured.

It should be understood that it is possible to anticipate a reduction in the cost of this optical connector 10 equipped with a shutter, provided that the construction is one which ensures grounding of the shielding member 60 via the connector housing 14, since there is no requirement to provide any special connection circuit or the like to this optical connector 10 equipped with a shutter. Furthermore, by providing the shutter unit 15 with the contact for conducting electricity which projects to the outside of the connector housing 14, it is also possible to endow the shutter unit 15 with the function of operating as a connecting circuit for grounding the shutter unit 15.

Next, a second preferred embodiment of the present invention will be explained with reference to FIGS. 13 through 16.

Figure 13:
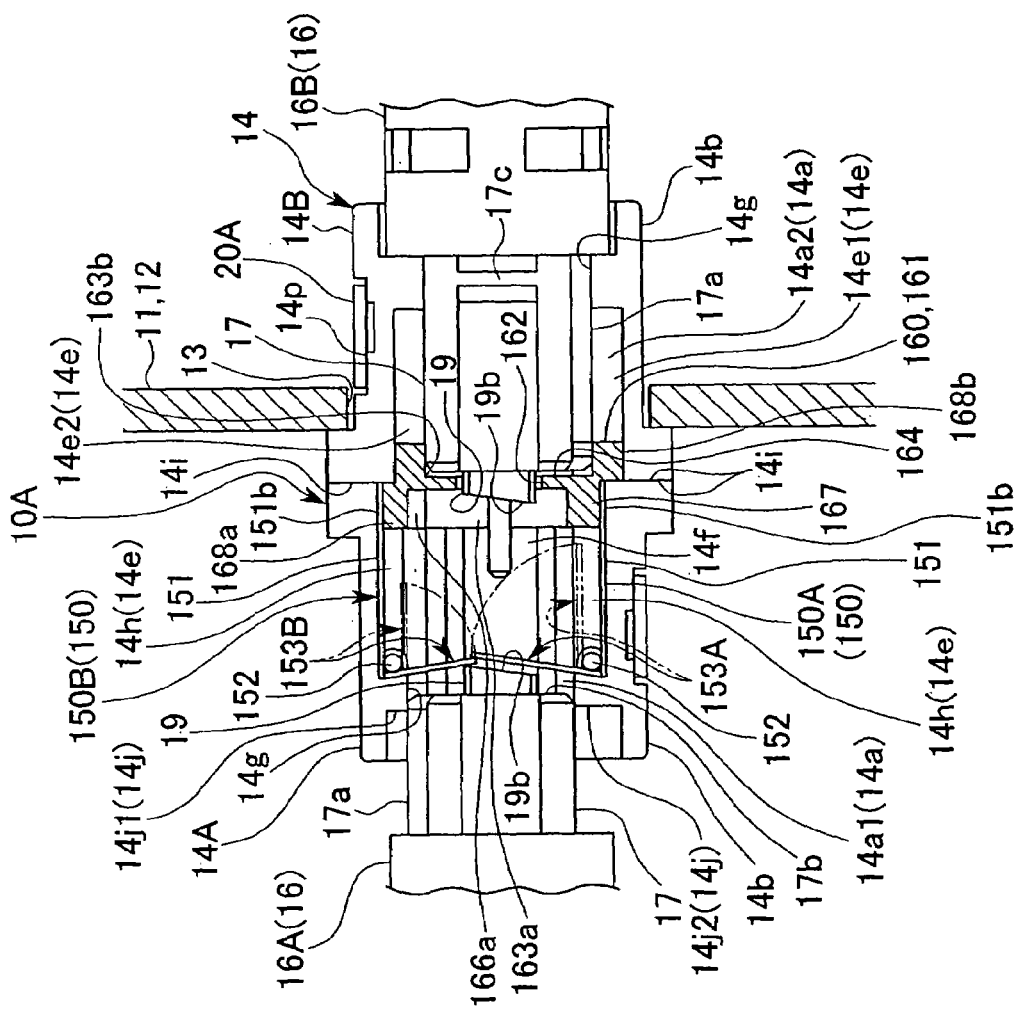
FIG. 13 is a sectional view showing the structure of a second preferred embodiment of the optical connector equipped with a shutter of the present invention.

As shown in FIG. 13, the optical connector 10A equipped with a shutter of this second preferred embodiment differs from that of the first preferred embodiment, as far as concerns the structure of the shutter unit and the shielding member which are fitted within the connector housing.

Figure 14:
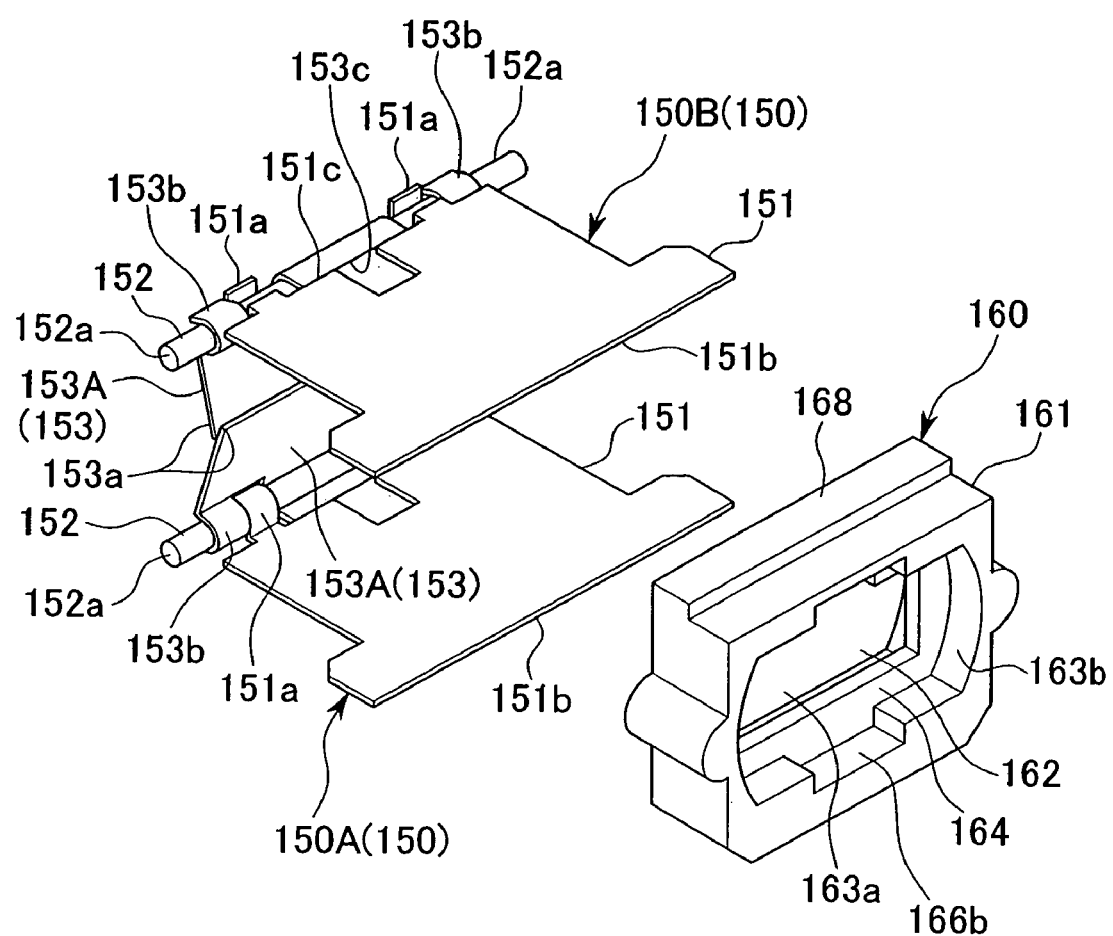
FIG. 14 is a perspective view showing a shutter unit and a light interception member (a light interception plate) of the optical connector equipped with a shutter of FIG. 13.

As shown in FIGS. 13 and 14, the shutter units 150 (the separately assembled shutter units) which are applied to this optical connector 10A equipped with a shutter each has a structure in which a shutter leaf 153 is linked to a main section 151 (sometimes hereinafter also termed a bracket) which is fixed within a connector housing 14 by a linking section (a hinge fitting member; here, a shaft 152) so as to be freely rotatably displacable with respect to the main section 151, and two of these shutter units 150 are provided within the half housing 14A of the connector housing 14. In the following explanation, in some cases, the reference symbol 150A will be appended to the shutter unit which is provided in the lower portion in FIG. 13 of the half housing 14A, while the reference symbol 150B will be appended to the shutter unit which is provided in the upper portion in FIG. 13 of the half housing 14A. Furthermore, in the following explanation, in some cases, the reference symbol 153A will be appended to the shutter leaf 153 which is provided to the shutter unit 150A, while the reference symbol 153B will be appended to the shutter leaf 153 which is provided to the shutter unit 150B.

It should be understood that each of the members which make up these shutter units 150A and 150B is made from a material which has electrical conductivity—for example, by bending a metallic plate. Here, the example will be shown and discussed in which they are made from stainless steel plates.

Figure 15A:
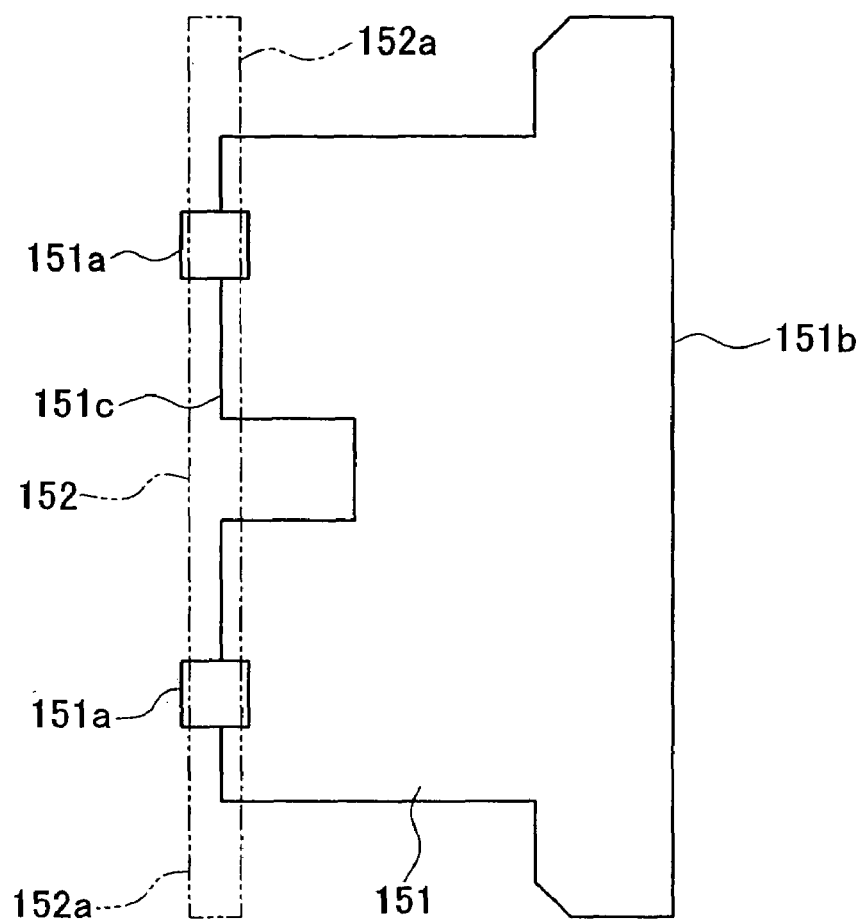
FIG. 15A is a figure showing a plan view of a shutter leaf of the shutter unit of FIG. 14.
Figure 15B:
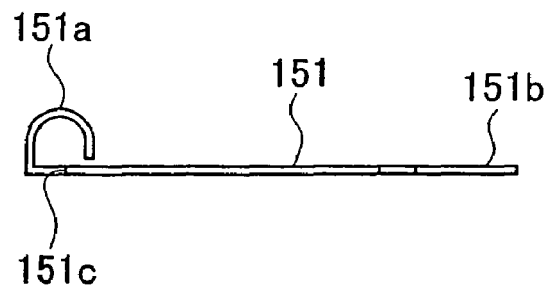
FIG. 15B is a figure showing a side view thereof.

As shown in FIGS. 14 and 15, the bracket 151 of each of the shutter units 150A and 150B is a planar plate member. At one of its end portions (on the left side in FIGS. 15A and 15B), this bracket 151 houses and supports a shaft 152 in a shaft holding portion 151a which is formed in a tubular shape from a portion of the metallic plate out of which the bracket 151 is formed. On the other hand, the shutter leaves 153A and 153B also house the shafts 152 in shaft holding portions 153b which are formed in tubular shapes from portions of the metallic plates out of which the shutter leaves 153A and 153B are formed, and thereby they are linked to their respective brackets 151 via the shafts 152 so as to be freely rotatable with respect thereto.

Both ends in the longitudinal direction of each of the shafts 152 project to both sides of the bracket 151 as projecting portions 152a. In order to assemble each of the shutter units 150A and 150B into the half housing 14A, the projecting portions 152a of both sides of the bracket 151 are inserted from the junction end face 14i side of the half housing 14A into the shaft insertion grooves 14h at both sides confronting the extended portions 14e (refer to FIG. 10). The shutter units 150A and 150B are inserted into the half housing 14A until the projecting portions 152a of the shafts 152 come into contact with the wall portions 14j of the half housing 14a. By doing this, the shafts 152 of each of the shutter units 150A and 150B are arranged so as to confront both sides of the connector hole 14a of the connector housing 14 across its central axis. Furthermore, the shutter units 150A and 150B are arranged so that their other end portions 151b, opposite to their one end portions which are linked to the shutter leaves 53A and 153B, are projected within the alcove 14o, and so that these other end portions 151b are fixed by the shielding member 160 which is inserted into the alcove 14o so as to be pinched against the inner wall surface of the alcove 14o, in other words the wall portion of the half housing 14A. By doing this, a stable storage state is obtained for the shutter units 150A and 150B in which both their end portions which confront the brackets 151 (the one end portion and the other end portion) are fixed within the half housing 14A, with the brackets 151 being fixed so that they cannot wobble about.

In FIGS. 13 and 14, the shielding member 160, just like the shielding member 60 of the first preferred embodiment of the present invention described above, is a unitarily formed member which is made from a synthetic resin material with carbon filler mixed into it, and, overall, its flattened form (that of a shield plate) is the same as the form of the shielding member 60 of the first preferred embodiment described above. Furthermore, a window 162, alcoves 163a and 163b, and a wall portion 164 are formed in this shielding member 160, just like the window 62, the alcoves 63a and 63b, and the wall portion 64 of the shielding member 60 of the first preferred embodiment of the present invention described above. However while, as shown in FIG. 11, the shielding member 60 of the first preferred embodiment, the key grooves 66a and 66b for insertion of the keys 17a of the optical connectors 16A and 16B were formed by piercing the wall portion 64 along the respective alcoves 63a and 63b on both sides (i.e., only the portion of the key groove 66a which was positioned within the alcove 63a, and only the portion of the key groove 66b which was positioned within the alcove 63b, were taken advantage of for insertion of the keys 17a), by contrast, with the shielding member 160 of this second preferred embodiment of the present invention, as shown in FIGS. 13 and 14, the formation of the key grooves for the portions into which the keys 17a are not to be inserted is omitted.

Among the wall portions which are present upon the periphery of the alcove 163a, the side which opposes the key groove 166a across the alcove 163a functions as a fixing wall 167 (refer to FIG. 13) which presses the other end portion 151b of the bracket 151 of the shutter unit 150A against the inner surface of the connector housing 14 (in concrete terms, the inner surface of the half housing 14A) and fixes it thereto.

Furthermore, among the wall portions which are present upon the periphery of the alcove 163a, the rib 168a which projects from the wall portion on the side of the key groove 166b functions as a fixing wall which presses the other end portion 151b of the bracket 151 of the shutter unit 150B against the inner surface of the connector housing 14 (in concrete terms, the inner surface of the half housing 14A) and fixes it thereto.

The position in which the shielding member 160 is received in the connector housing 14 is the same as in the case of the shielding member 60 of the first preferred embodiment described above: it is received so as to be wedged into the alcove 14o on the side of the junction end faces 14i of the pair of half housings 14A and 14B, and it is stably held by the inner surface shape of the alcove 14o of the half housings 14A and 14B so that no play is present therebetween. Although the shielding member 160 is held in an orientation across the connector hole 14a, the connector hole 14a communicates between the two sides of the shielding member 160 via the window 162 in which the ferrules 19 of the optical connectors 16A and 16B can be inserted, and moreover it is possible to connect together the optical connectors 16A and 16B themselves via this window 162.

When the half housings 14A and 14B are connected together and mutually unified so that the shutter units 150A and 150B and the shielding member 160 are housed within the resulting connector housing 14, the rib 168b which is provided as projecting on the side surface of the shielding member 160 (the rib 168b which is projected from the wall portion on the side of the key groove 166b, within the peripheral wall portion of the alcove 163b) is contacted from the side of the half housing 14B against the end portion 151b of the other bracket 151 of the shutter unit 150A, and, due to this, the bracket 151 of the shutter unit 150A, in other words, is sandwiched between the shielding member 160 and the wall portion 14j of the half housing 14A, and is stably held by them so that no play is present. On the other hand, by the junction end face 14i of the half housing 14B being projected and contacted against the other end portion 151b, due to this, the bracket 151 of the shutter unit 150B is sandwiched between the two half housings 14A and 14B, and is stably held between them so that no play is present.

It should be understood that it would also be acceptable, if sufficient fixing force for the other end portions 151b of the bracket 151 of the shutter units 150A and 150B can be obtained by sandwiching it between the shielding member 160 and the inner surface of the half housing 14A (in detail, the inner surface of the alcove 14o), or by supplementing this sandwiching action by adhesive material or the like, to omit its projection and contacting against the rib 168b or the bracket other end portion 151b of the half housing 14B. Furthermore, instead of the projection and contacting against the rib 168b or the bracket other end portion 151b of the half housing 14B, it would also be possible, as another alternative, to utilize a structure in which a portion is formed which projects and contacts against the shielding member 160 so that the bracket 151 is pressed into the half housing 14A by the shielding member 160, or the like.

When the fitting of the shutter units 150A and 150B to the half housing 14A has been completed, the shutter leaves 153A and 153B of the shutter units 150A and 150B are capable of being rotationally displaced around the shafts 152, and they are disposed within the connector hole 14a (in detail, the connection hole 14a1). The orientation of the rotational axes along which the shafts 152 of the shutter leaves 153A and 153B of the shutter units 150A and 150B point is the same as that of the shutter leaves 53A and 53B of the shutter unit 15 of the first preferred embodiment of the present invention described above; in other words, it is a direction which is orthogonal to the axis of the connector hole 14a of the connector housing 14, so that, by rotation around this rotational axis, it is possible for them to be shifted between a light interception position (the position shown by solid lines in FIG. 13) and a retracted position (the position shown by phantom lines in FIG. 13), just as in the case of the shutter leaves 53A and 53B of the shutter unit 15 of the first preferred embodiment of the present invention shown and described above.

Furthermore, since the shutter leaves 153A and 153B which are in their respective light interception positions are mutually overlapped at their edge portions 153a (their edge portions which project from the shafts 152), accordingly it is possible to ensure an excellent light interception characteristic and a good dust interception characteristic for the connector hole 14a; this point is the same as with the first preferred embodiment of the present invention described above. After assembling springs (torsion springs, not shown in the drawings) in the vicinity of the shafts 152 as biasing members for pushing upon the shutter units 150A and 150B so as to return them, if the optical connector 16A which has been inserted and connected in the connector housing 14 is pulled out from the connector housing 14, then, by the biasing force of these bias members for pushing upon and returning the shutter leaves 153A and 153B of the shutter units 150A and 150B, the shutter leaves 153A and 153B are returned to their light interception positions, and are returned to their state of being mutually overlapped so as to close off the connector hole 14a, so that the dust interception characteristic of the connector hole 14a is preserved.

Figure 16:
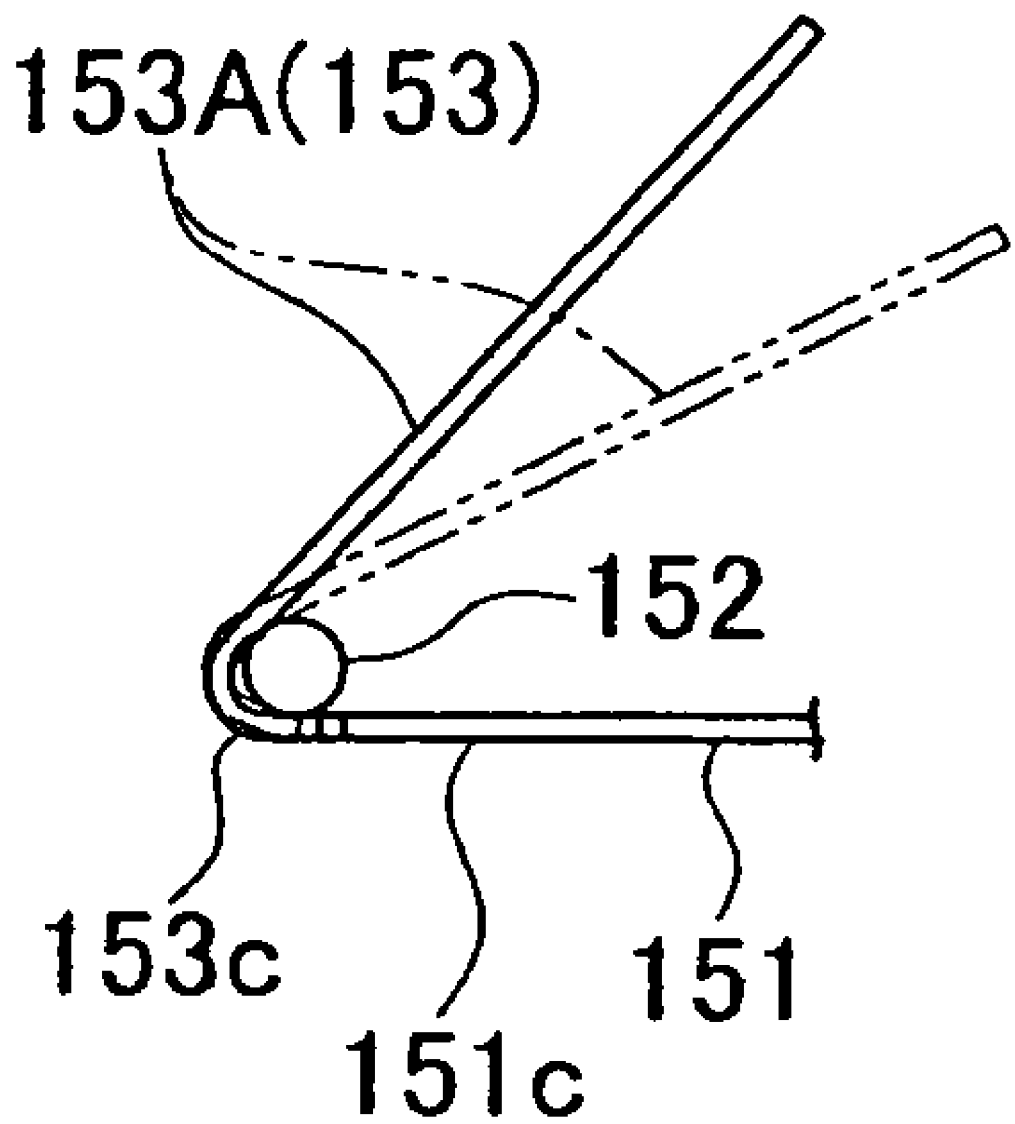
FIG. 16 is an enlarged view showing the relationship between a contacting stopper portion of a shutter leaf of the shutter unit of FIG. 11, and a stopper of a bracket thereof.
Figure 18:
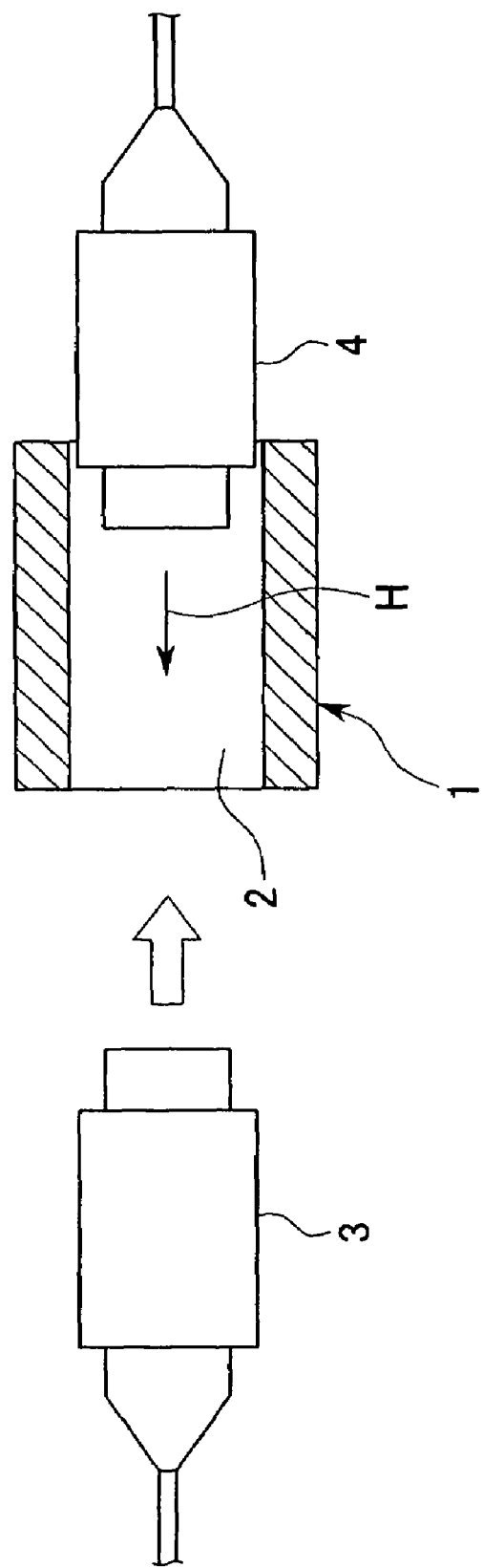
FIG. 18 is a sectional view showing the connection of two optical connector plugs via an optical connector adapter.
Figure 19:
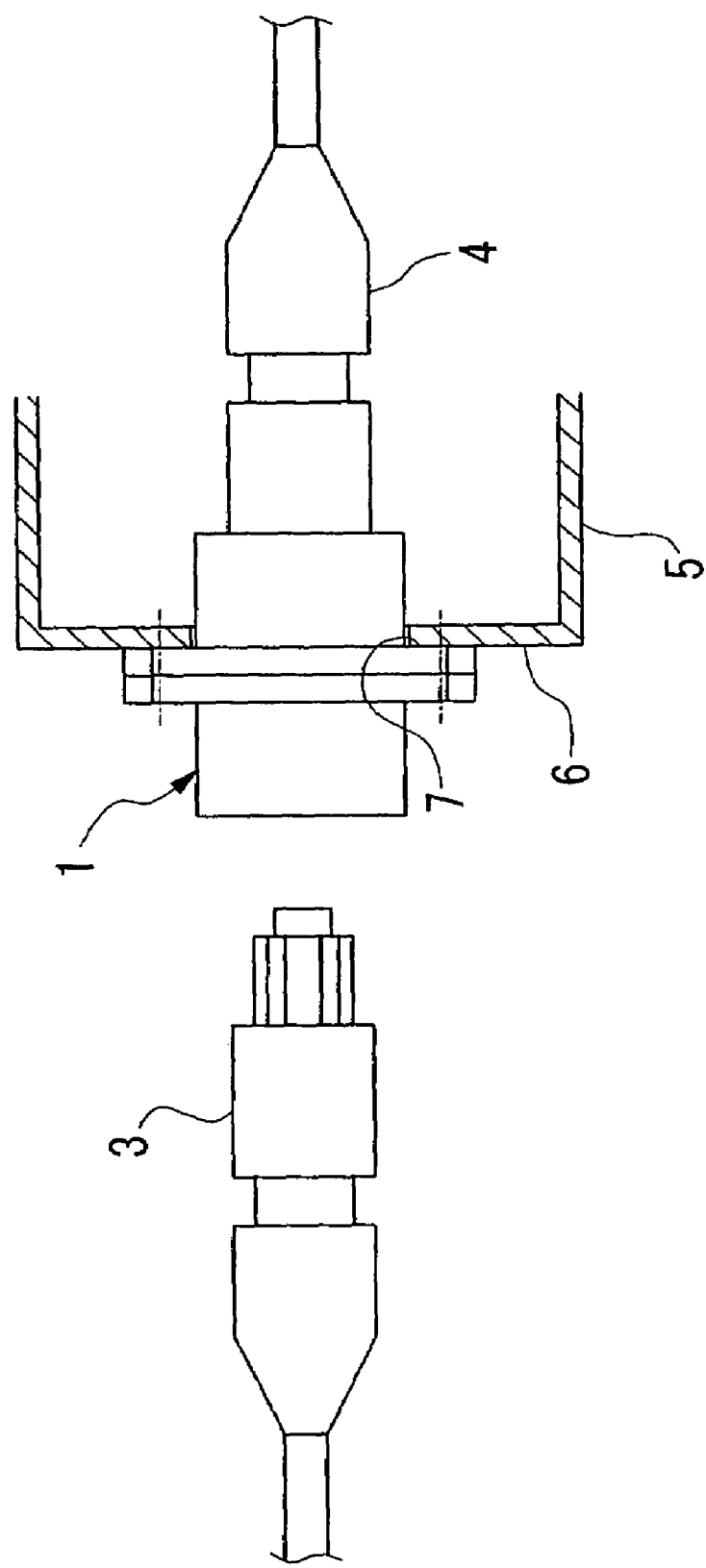
FIG. 19 is a perspective view showing the state in which an optical connector adapter is fitted to a fitting wall (a panel) of a chassis of an item of electronic equipment.
Figure 20:
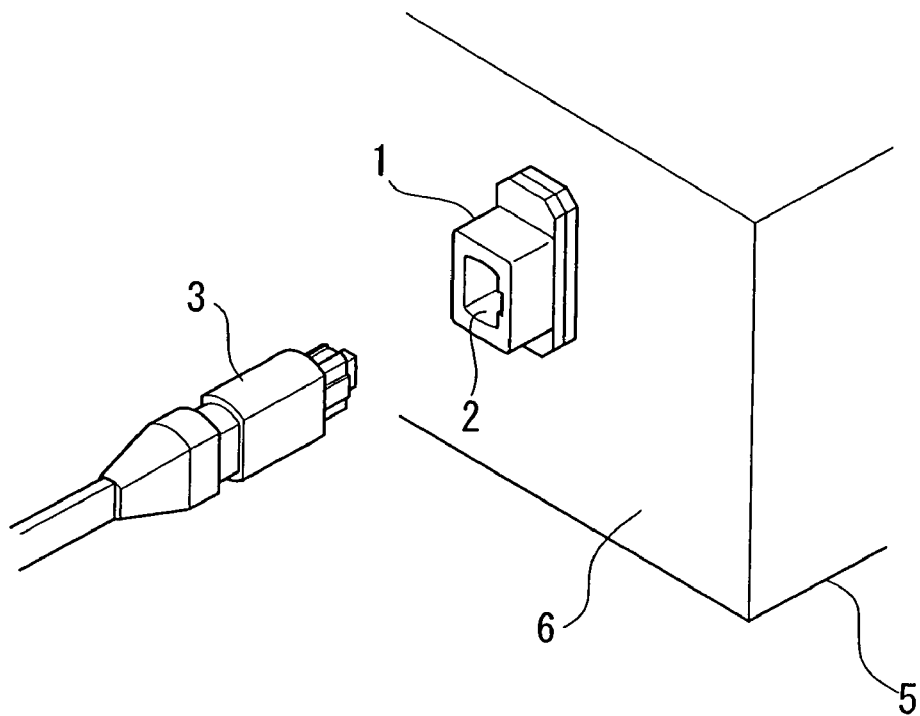
FIG. 20 is a perspective view showing a connector fitting hole which is opened up through the fitting wall of FIG. 19.
Figure 21:
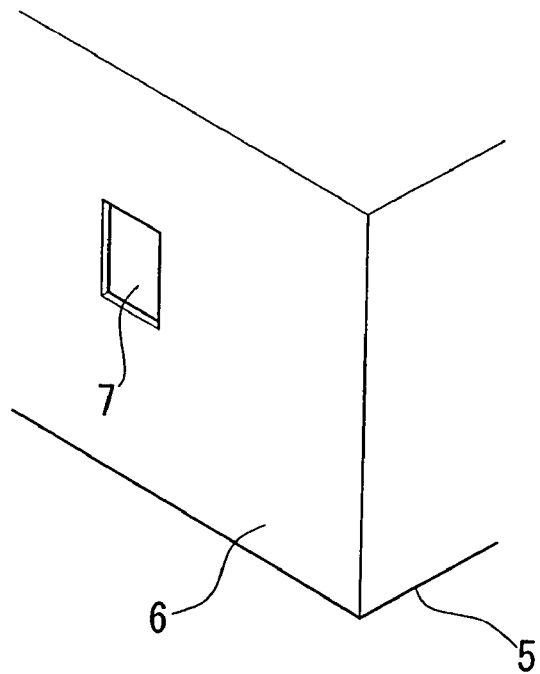
FIG. 21 is a sectional view showing the vicinity of the connector fitting hole, in the view of FIG. 19 of the state in which an optical connector adapter is fitted to a fitting wall.

FIG. 16 is a magnified figure showing the relationship between a contacting stopper portion 153c of the shutter leaf 153A and a stopper 151c of the bracket 151. Since, as shown in this figure, when the shutter leaf 153A is in its light interception position (i.e. in its position as shown in FIG. 16 by the solid lines), its contacting stopper portion, which is a projection which projects from the shutter leaf 153A, protrudes against and contacts the stopper 151c which is at one end portion of the bracket 151, accordingly its rotation from the light interception position in the direction to move away from the connection reception side optical connector 16B (i.e. its rotation in the anticlockwise rotational direction as seen in FIG. 16) is limited. For the shutter leaf 153B as well, in the same manner, its rotation from its light interception position in the direction to move away from the connection reception side optical connector 16B (i.e. its rotation in the clockwise rotational direction as seen in FIG. 13) is limited.

According to this optical connector 10A equipped with a shutter, it is possible to implement assurance of the light interception characteristic for light which is emitted from the connection reception side optical connector 16B and also its dust interception characteristic, and also, when it is fitted to a fitting wall 12, it is possible to implement assurance of the electromagnetic radiation shielding capability of the connector fitting hole 13, in the same manner as with the first preferred embodiment of the optical connector 10 equipped with a shutter which was described and shown previously. Furthermore, according to this optical connector 10A equipped with a shutter, since the structure is one in which the shutter units 150A and 150B are fitted separately on both sides of the central axis of the connector hole 14a of the connector housing 14 (in detail, the connector hole 14a1 of the half housing 14A), accordingly there are the beneficial features that it is possible to make its width well adjusted to the size and so on of the connector housing 14, and that it is possible to arrange to house it easily and stably within the connector housing 14. Yet further, it is not necessary for the shutter units which are housed within the connector housing to be of exactly the same shape as one another. Even further, it would be possible to select and to utilize shutter units which are easy to assemble, as corresponding to the structure of the connector housing and the like, and it is possible, due to this, to make it easy to assemble them to the connector housing.

It should be understood that the present invention is not to be considered as being limited by the above described preferred embodiment thereof; various modifications of the form and the content of any preferred embodiment are possible.

For example, the concrete structure of the shutter unit is not to be considered as being limited by that of the above described preferred embodiment; various modifications in the details thereof are possible, as appropriate.

Furthermore although, in this preferred embodiment, an application to a optical connector adapter which is utilized for connecting together optical connector plugs of an MPO type optical connector has been described by way of example, the present invention is not to be considered as being limited to this application; it could also be applied to an optical connector adapter which is used for connecting together various types of optical connector plug other than an MPO type optical connector, either of a multi connection type or a single connection type. Furthermore, the present invention is not to be considered as being limited to an optical connector adapter; it can be utilized for various types of optical connector having a connector hole into which an optical connector plug is inserted and connected.

It would also be possible, for example, to endow the main plate portion of the shutter unit, which was of a type which was assembled all at once as described above, with the function of acting as a shielding member. In this case, in the shutter unit, its main plate portion is housed within the connector hole of the connector housing so as to be in the vicinity of the position of mutual connection together of the two optical connectors. Furthermore, it would also be acceptable to form a window in the main plate portion whose size was approximately such that the ferrule of the optical connector could be inserted therein with a slight clearance.

The fitting wall to which this shutter optical connector equipped with a shutter is fitted is not limited to being a portion of a chassis of an item of electronic equipment; for example, it would also be possible to apply various structures thereof to a panel or the like for provision of an optical connector such as an optical connector adapter or the like upon a rack such as an optical distribution board or the like.

This preferred embodiment is not to be considered as being limited to the use of shafts as the linking portions between the main sections of the shutter units and the shutter leaves; it would also be possible, as an alternative, to utilize various other types of structure, such as members which can be resiliently deformed due to pressing in force from the optical connector, or the like.

Since, as has been explained above, according to the present invention, it is possible to intercept light which is emitted from the connection reception side optical connector by the shutter leaves of the shutter unit which have been assembled within the connector housing, accordingly it is possible to perform the task of connecting another optical connector to this connection reception side optical connector at high efficiency. Due to this, it is possible to abolish the necessity of providing any member for light interception outside the connector housing. Moreover, it is easy to avoid increase in the overall size of the connector housing, since the structure is one which is assembled by inserting the shutter unit which supports the shutter leaves for light interception so that they can be freely rotationally displaced into the connector hole of the connector housing. Furthermore since, when no optical connector is inserted and connected into the connector housing, the connector hole of the connector housing is closed by the mutual overlapping of the plurality of shutter leaves which are in their light interception positions, thereby it is possible to ensure an excellent dust interception characteristic for the connector hole, so that there is the beneficial feature that it is possible to protect the ferrule and the like of the connection reception side optical connector from contamination such as dust, and the like.

Furthermore, according to the optical connector equipped with a shutter of the present invention, it is possible to guarantee the electromagnetic radiation shielding capability by fitting the shielding member within the connector housing, so that, simply by fitting it to the connector fitting hole of the fitting wall, it is possible to guarantee the electromagnetic radiation shielding capacity of the connector fitting hole. Moreover, it is also possible to implement connection between the optical connector and the connection reception side optical connector via the window in the shielding member.

Next, a further preferred embodiment of the present invention will be described with reference to the drawings.

Figure 23:
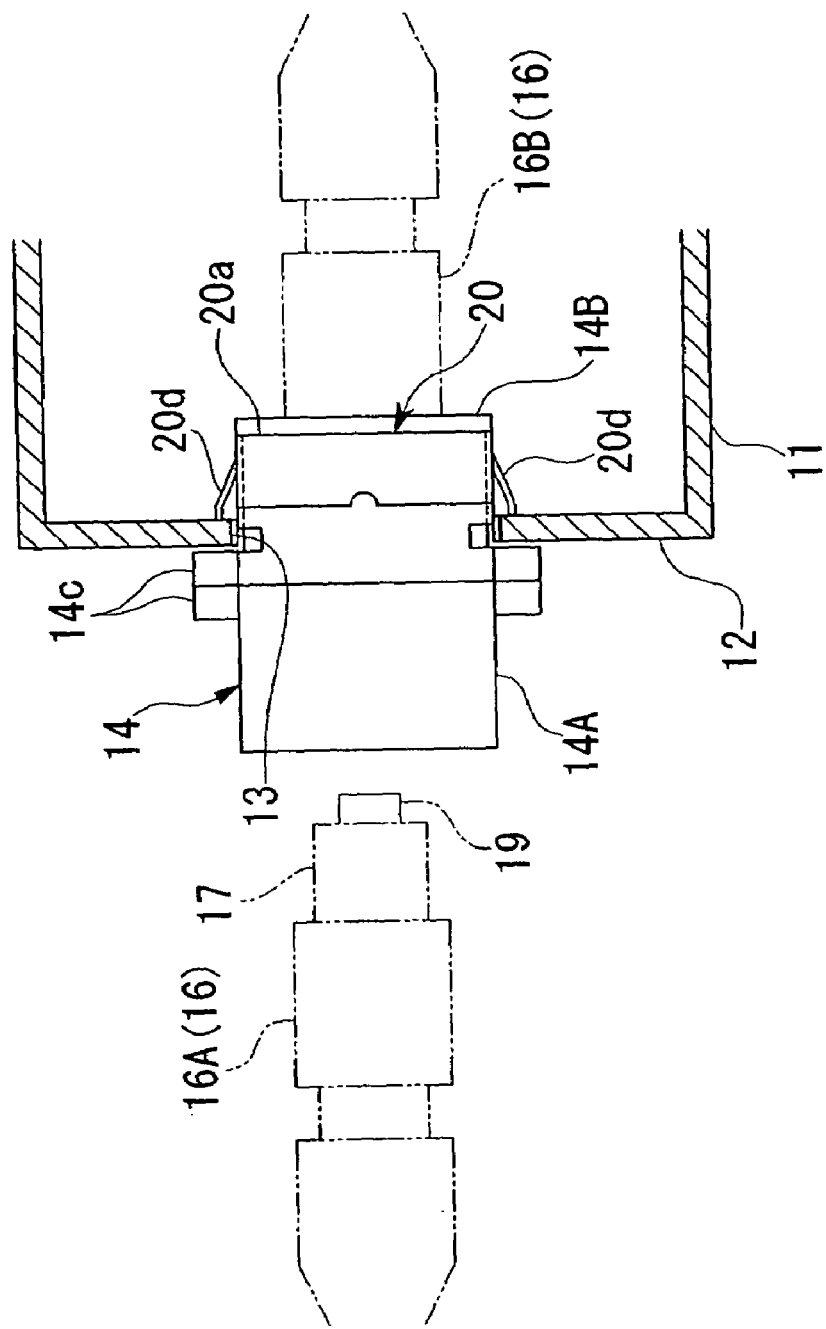
FIG. 23 is a sectional view showing, in the state in which the optical connector equipped with a shutter of FIG. 22 is fitted to a fitting wall of a chassis of an item of equipment, the vicinity of the connector fitting hole in the fitting wall.
Figure 24:
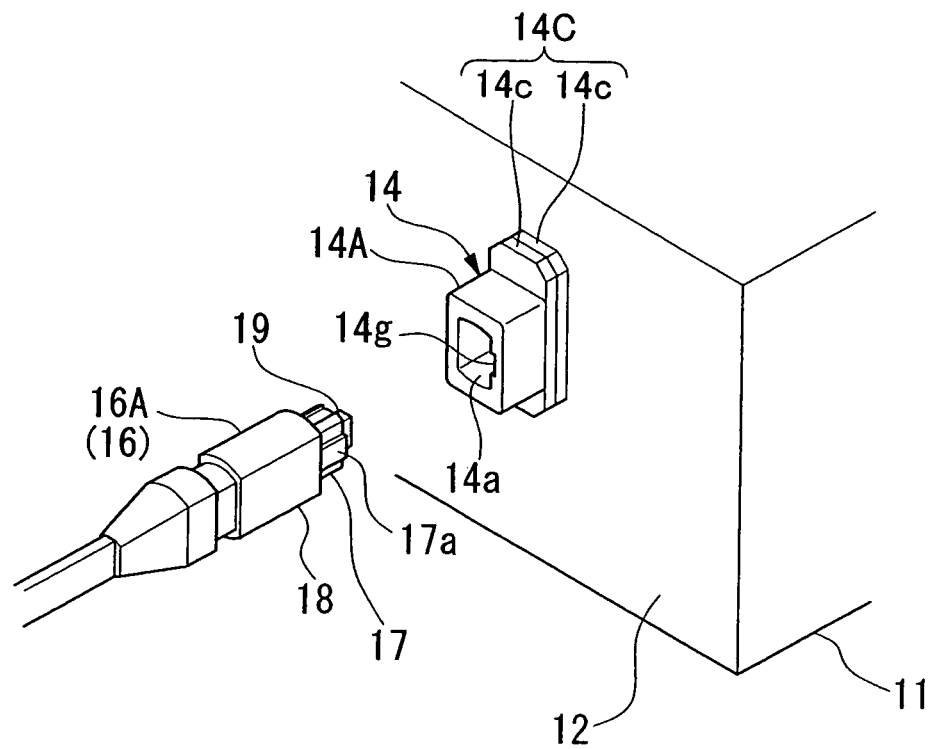
FIG. 24 is a perspective view of the fitting state of FIG. 23 as seen from the exterior of the chassis.
Figure 25:
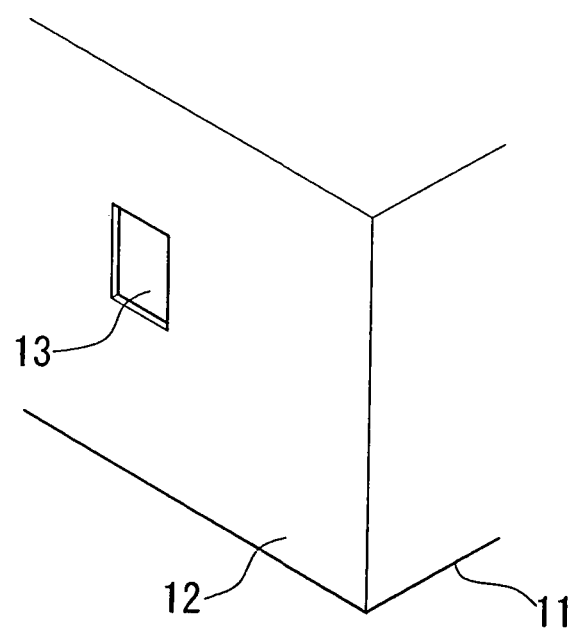
FIG. 25 is a perspective view showing a connector fitting hole which has been formed in the fitting wall.
Figure 26:
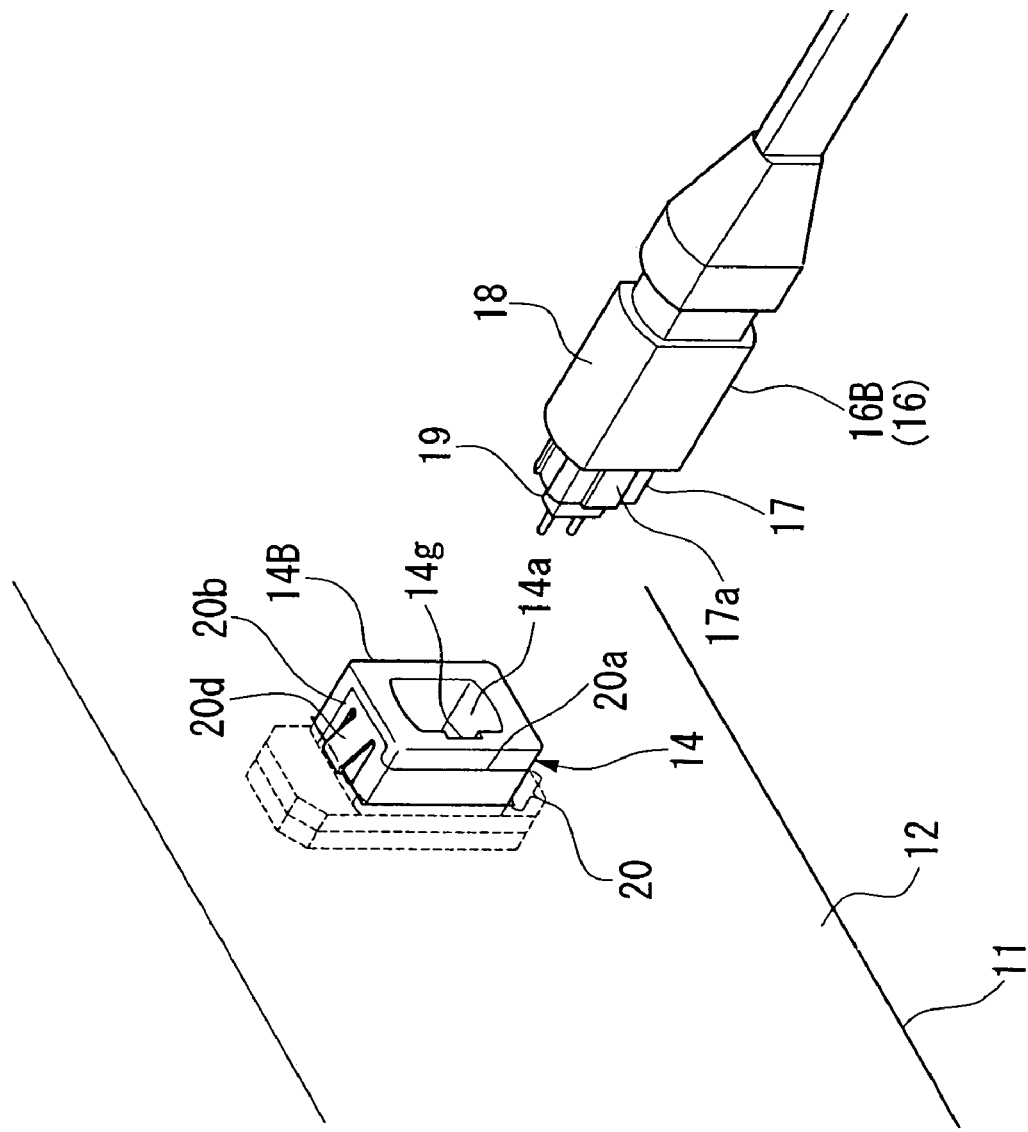
FIG. 26 is a perspective view of the fitting state of FIG. 23 as seen from the interior of the chassis.
Figure 27:
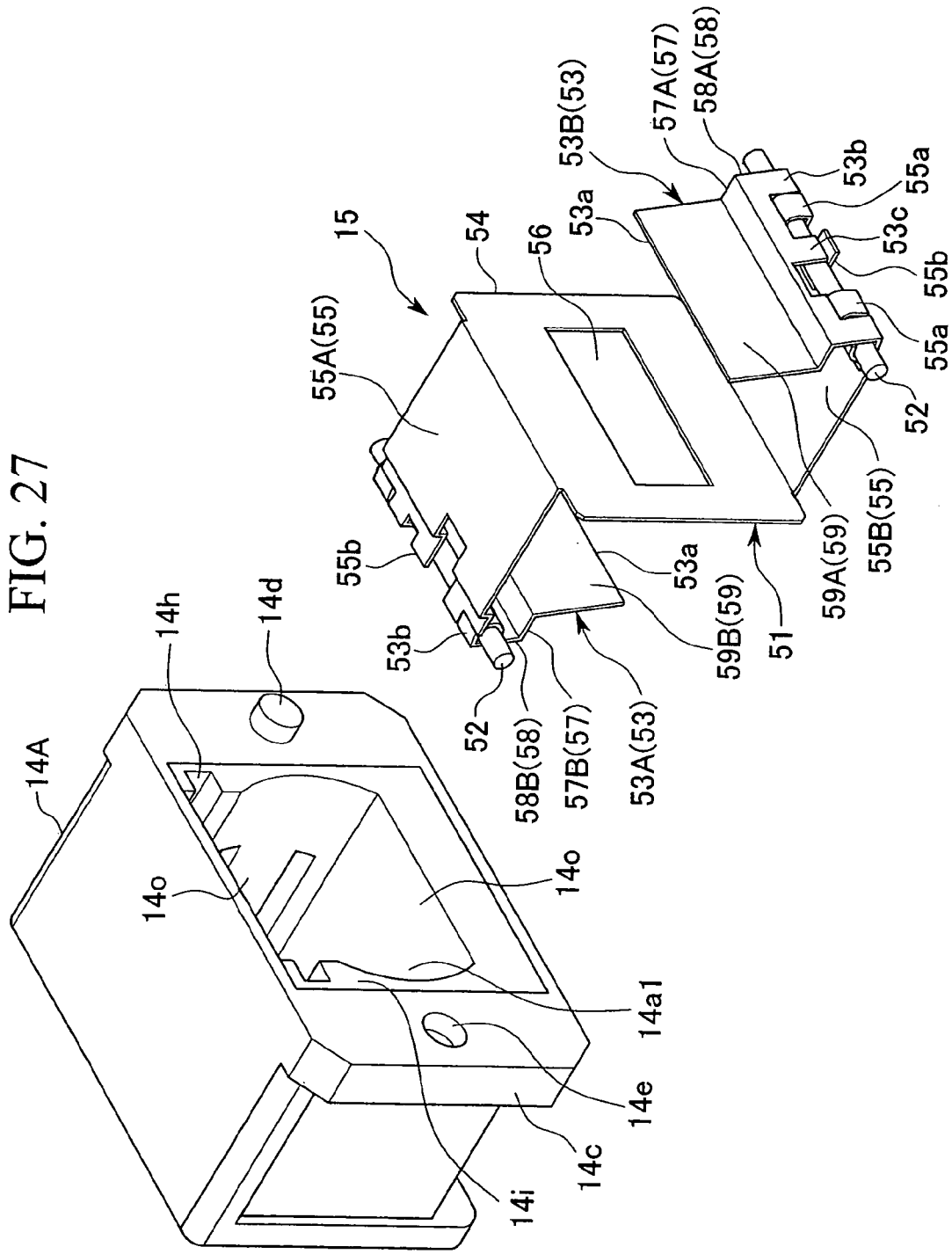
FIG. 27 is a perspective view showing a shutter unit of the optical connector equipped with a shutter of FIG. 22.
Figure 28:
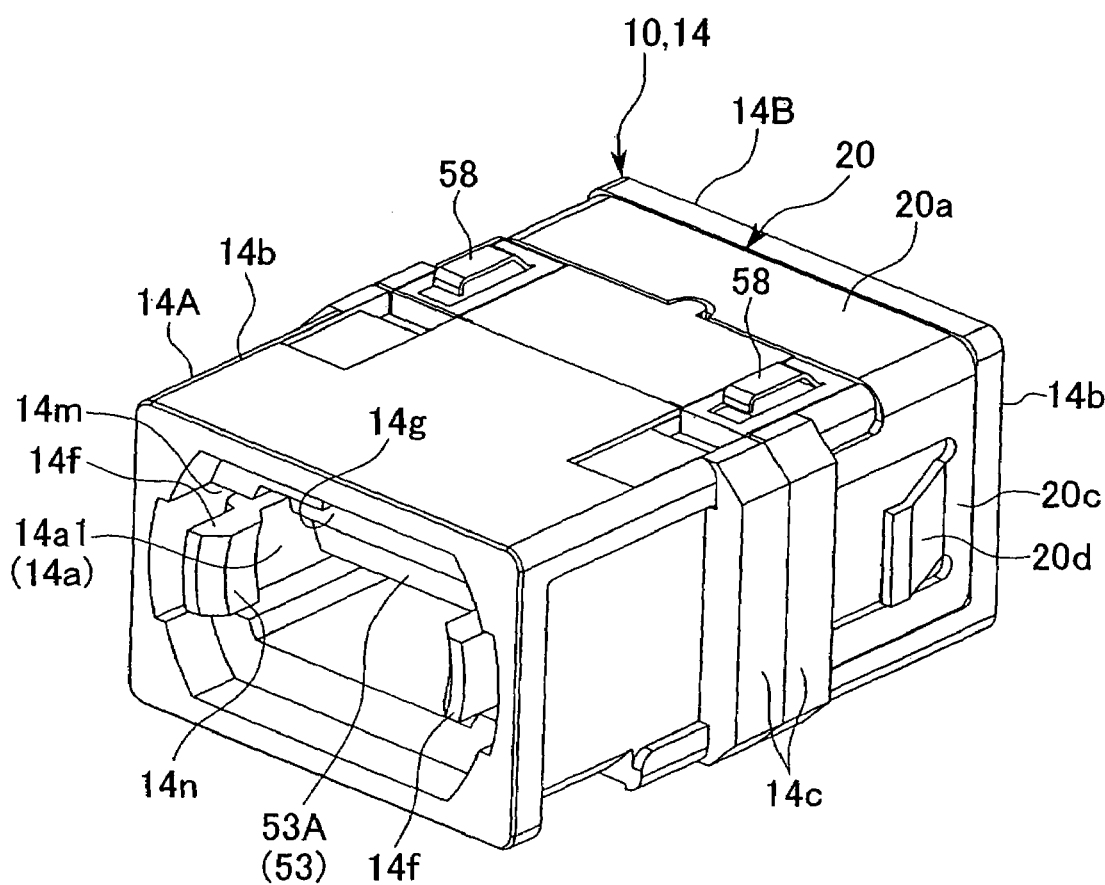
FIG. 28 is an overall perspective view showing the optical connector equipped with a shutter of FIG. 22.

FIGS. 22A through 22D are views showing the external appearance of this third preferred embodiment of the optical connector equipped with a shutter 10 of the present invention; FIG. 23 is a sectional view showing, in the state in which this optical connector equipped with a shutter 10 is fitted to a fitting wall 12 of a chassis 11 of an item of equipment, the vicinity of a connector fitting hole 13 which is pierced through the fitting wall; FIG. 24 is a perspective view of the fitting state of FIG. 23 in which the optical connector equipped with a shutter 10 is fitted to the fitting wall 12 of the chassis 11, as seen from the exterior of the chassis 11; FIG. 25 is a perspective view showing a connector fitting hole 13 which has been formed in the fitting wall 12; FIG. 26 is a perspective view of the fitting state of FIG. 23 in which the optical connector equipped with a shutter 10 is fitted to the fitting wall 12 of the chassis 11, as seen from the interior of the chassis 11; FIG. 27 is a perspective view showing the structure of a shutter unit 15 of the optical connector equipped with a shutter 10; FIG. 28 is an overall perspective view showing the optical connector equipped with a shutter 10 according to this preferred embodiment of the present invention; and FIG. 29 is an exploded view showing the structure of the optical connector equipped with a shutter 10.

Figure 29:
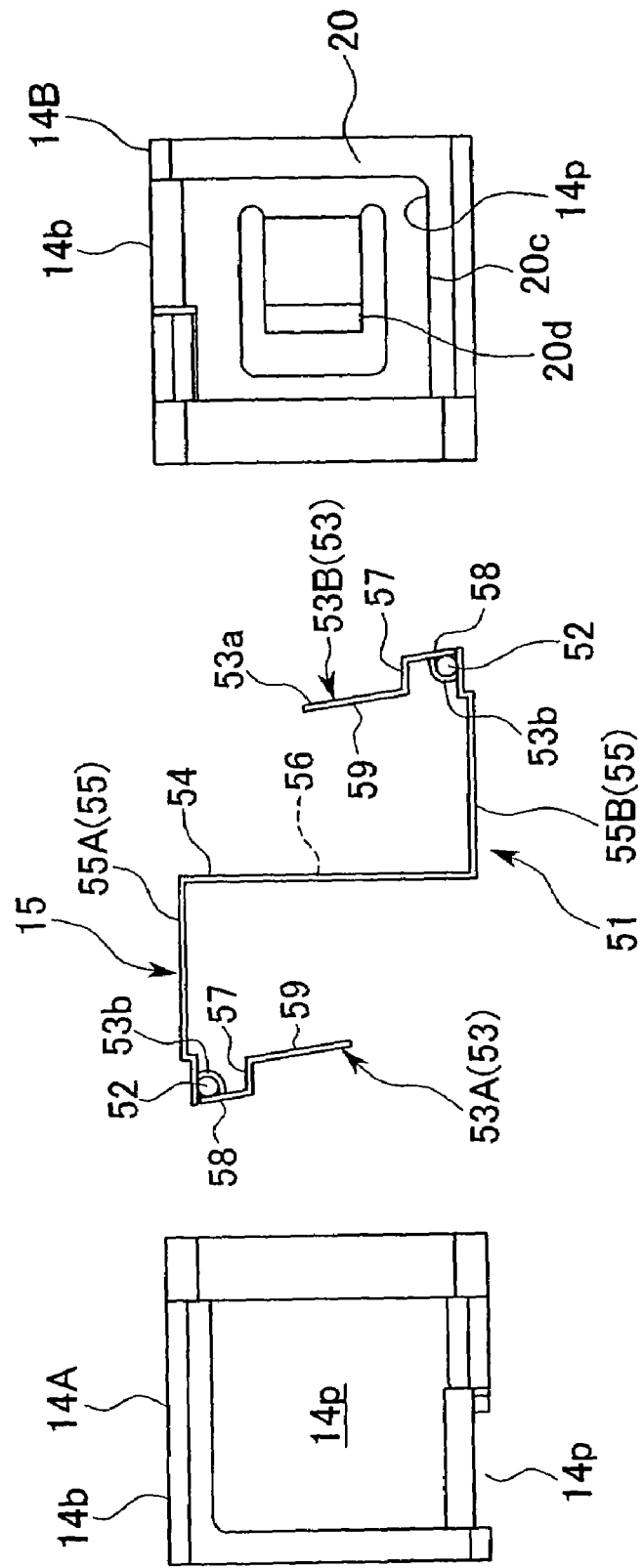
FIG. 29 is an exploded view showing the structure of the optical connector equipped with a shutter of FIG. 22.

As shown in FIG. 29, this optical connector equipped with a shutter 10 has a structure in which a shutter unit 15 is assembled into the interior of a connector housing 14 which constitutes an optical connector adapter.

Referring to FIGS. 22A through 22D, the connector housing 14 is an optical connector adapter of the MPO optical connector type (MPO: Multifiber Push-On; for example, as specified by JIS C 5982 or IEC 1754-7). This connector housing 14 is one which is entirely made from an electrically conductive resin material which includes fine particles which function to absorb electromagnetic waves (radiation), such as carbon filler or the like, and it is formed roughly in the shape of a sleeve which has a connector hole 14a pierced through its interior. This connector housing 14 is made by joining together a pair of half housings 14A and 14B and assembling them into a unit.

Figure 30A:
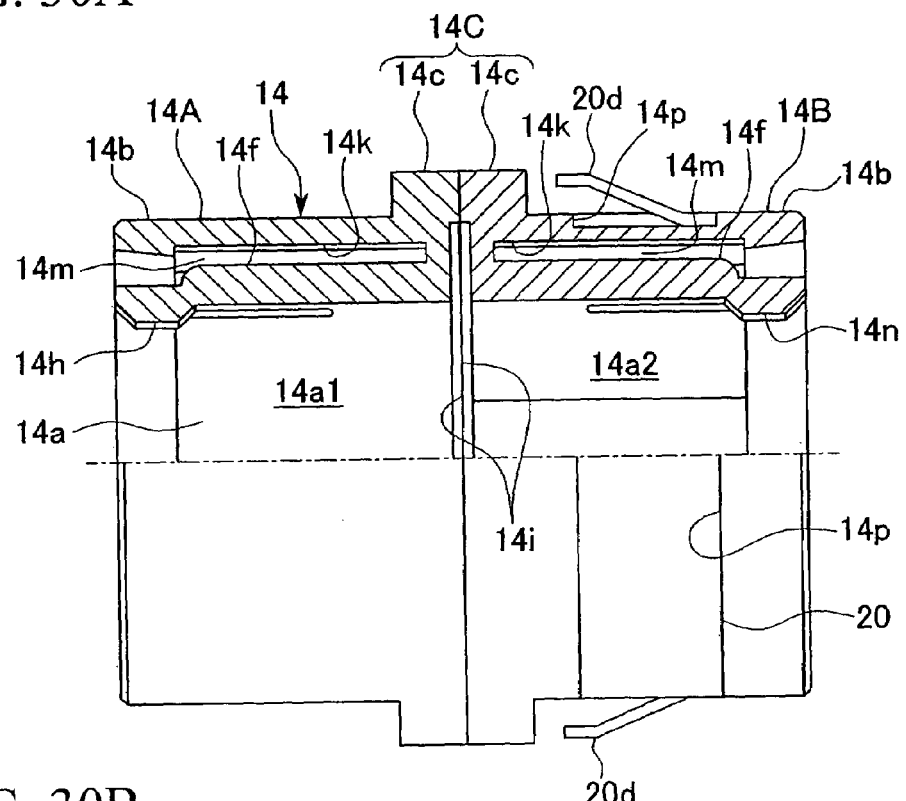
FIGS. 30A and 30B are sectional views showing a connector housing of the optical connector equipped with a shutter of FIG. 22.
Figure 30B:
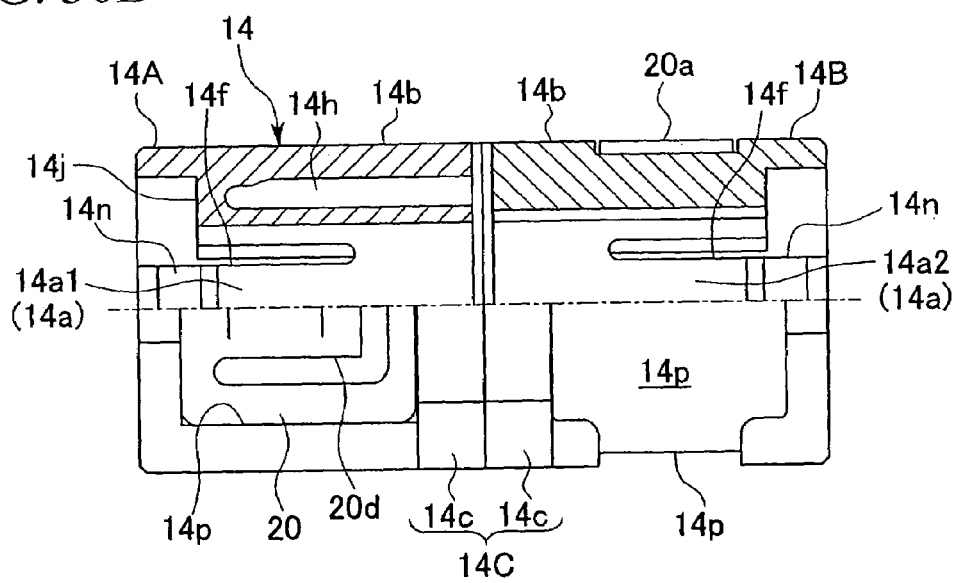
Figure 32:
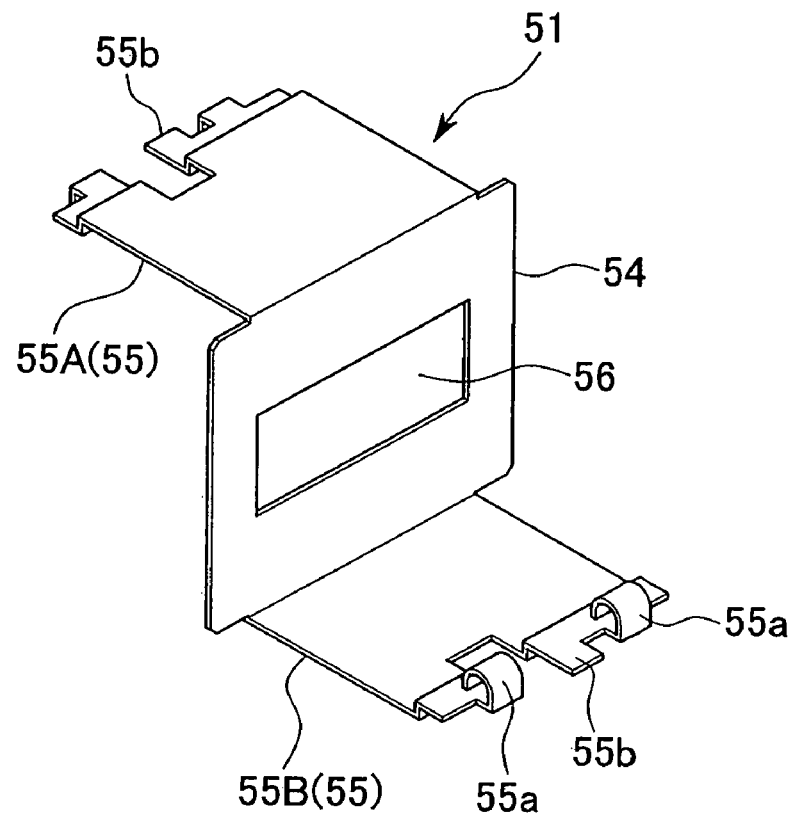
FIG. 32 is a perspective view showing the main section of the shutter unit of FIG. 31.

As shown in FIG. 30, each of the half housings 14A and 14B is a unitarily formed member which is made of, for example, a synthetic resin such as plastic or the like, and each of them comprises a sleeve shaped housing main section 14b and a projecting flange 14c which is provided as projecting to both sides from one end in the axial direction of this housing main section 14b. And the connector housing 14 is assembled by joining the pair of half housings 14A and 14B directly in series in the axial direction and by connecting them together into a unit. It should be understood that FIG. 30 shows the state in which the half housings 14A and 14B have been directly joined together without the shutter unit 15 being assembled into them.

The pair of half housings 14A and 14B are mutually joined together and unified by their end portions on which the projecting flanges 14c are formed (i.e., by their end portions at the one axial ends of the housing main sections 14b; in the following, these will sometimes be termed the end portions in the axial direction at their junction end face sides), and, due to this arrangement, the connector housing 14 is assembled with the projecting flange 14C which is formed by the mutual overlapping of the projecting flanges 14c on each of the half housings 14A and 14B projecting therefrom on both sides with respect to its central portion in the axial direction (the axial direction of the connector hole 14a).

Furthermore, as shown in FIG. 27, the pair of half housings 14A and 14B are set into relative position, so that their connector holes mutually communicate together and so that they are mutually unified, by engagement projections 14d which are formed upon their end surfaces on the side where the projecting flanges 14c are formed (their junction end faces 14i) and engagement holes 14e being engaged together. Although, here, the pair of half housings 14A and 14B are of the same structure, and are engaged together by the engagement projections 14d which are formed as projecting from a one of the half housings 14A being engaged into engagement holes (not shown in the drawings) which are formed in the other one of the half housings 14B, while engagement projections (not shown in the drawings) which are formed as projecting from the other one of the half housings 14B are engaged into the engagement holes 14e which are formed in the first one of the half housings 14A, the structure is not to be considered as being limited to the one described above: for example, it would also be possible to utilize various other types of structure for determining the mutual positions of the half housings 14A and 14B, and for unifying them and for fixing them together. Furthermore, it would also be possible to utilize various types of appropriate mechanical means for fitting together the two half housings 14A and 14B, such as screws, clamps, or the like, or to utilize adhesive material or the like.

Referring to FIGS. 22C, 22D, 30A, and 30B, the reference symbols 14f denote engagement claws (elastic claws) within the connector housing 14, and these (refer to FIGS. 24 and 26; here, the explanation sometimes may refer to an optical connector plug (for example, one as specified by JIS C 5982 or IEC 1754-7) of an optical connector of the MPO type by the reference symbol 16, if explaining its structure in common with that of the optical connectors 16A and 16B) are engaged so as to be attachable to and detachable from engagement portions (engagement alcoves or the like, not shown in the drawings) which are formed on the side portions of the sleeve shaped housing 17 of the optical connectors 16A and 16B which are inserted and connected into the connector housing 14.

These engagement claws 14f are formed integrally with the housing main sections 14b of the half housings 14A and 14B, and they project to the insides of the connector holes (the reference symbol 14a1 is appended to the connector hole on the side of the half housing 14A, while the reference symbol 14a2 is appended to the connector hole on the side of the half housing 14B) from the inner surfaces 14k in the connector holes of the inner sides of these sleeve shaped housing main bodies 14b. The engagement claws 14f of the half housings 14A and 14B face, from the end portions of the half housings 14A and 14B in the axial direction of the junction end face 14i side, towards the entrance hole sides (the left and right end portions of the connector housing 14 in FIGS. 7A and 7B) which are opposite to the junction end faces 14i in the axial direction of the connector hole 14a, and are made so as to extend along the inner surface of the housing main section 14b. Furthermore, an approximate clearance 14m is maintained between the portions of these engagement claws 14f which extend along the inner surface of the housing main section 14b, and the inner surface of the housing main section 14b.

Figure 36:
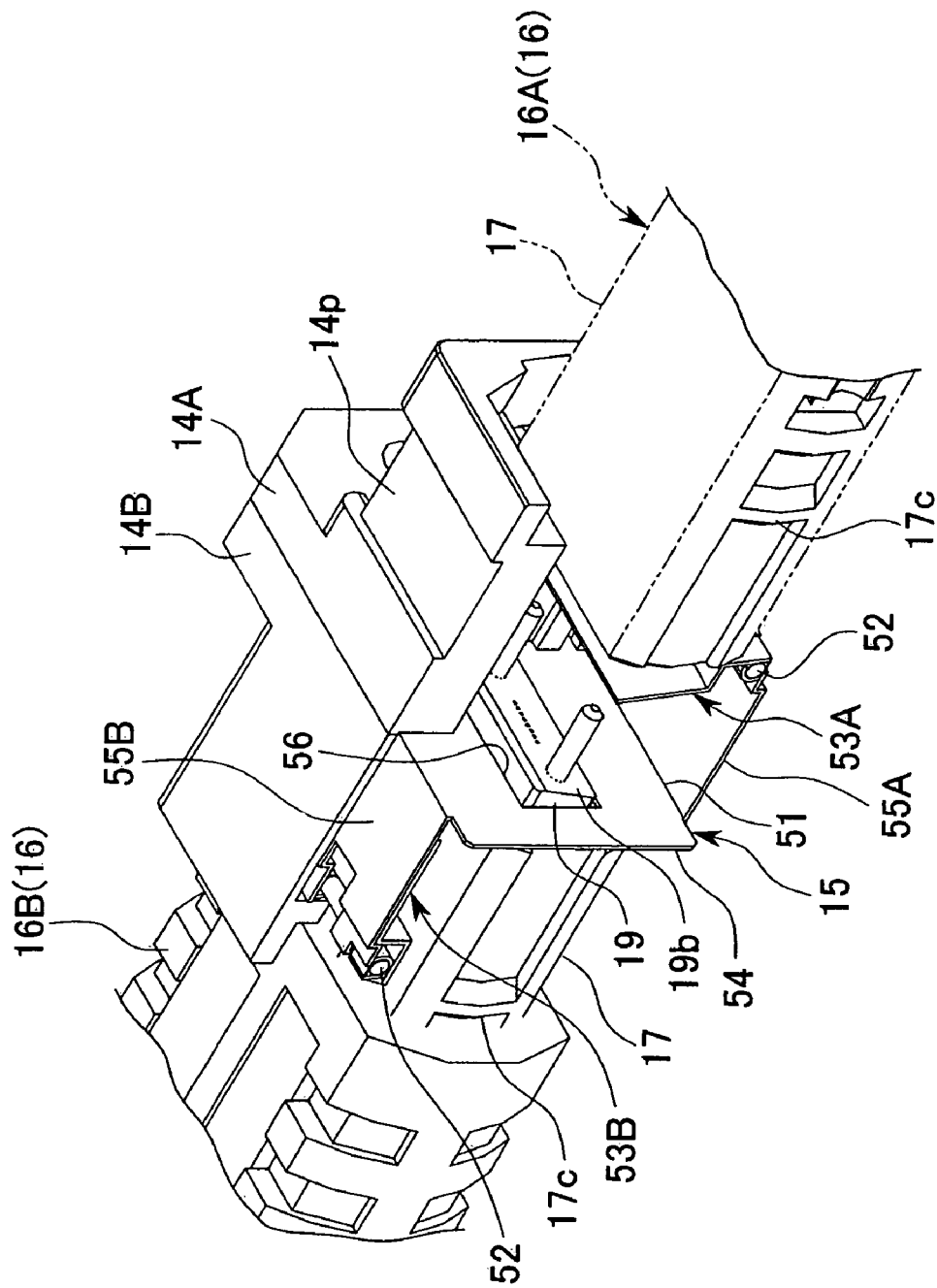
FIG. 36 is a sectional perspective view showing the relationship between the tip end portion of the optical connector plug which is inserted into and connected to the optical connector adapter, and the window of the shutter unit.

The optical connector 16, which is an optical connector plug of the MPO optical connector type, and the two half housings 14A and 14B, are built with a slide lock of a construction such that, when the optical connector 16 is inserted into the connector housing 14 (in more concrete terms, the half housing), along with the engagement projections 14n of the projecting ends from the housing main section 14b of the engagement claws 14f of the half housing being engaged into the engagement portions 17c on the side portions of the housing 17 of the optical connector 16 (refer to FIG. 36 and so on), a lock is engaged which prevents this engagement being released and the optical connector 16 from being pulled out from the half housing; while, when a sliding shroud (a coupling 18) which is attached to the optical connector 16 is pulled, while releasing this lock, it is possible to pull off the optical connector 16 from the connector housing 14 (the half housing).

It should be understood that the engagement claws 14*f* may be appropriately modified, according to the type of the optical connector 16, according to the size of the housing 17, and according to the form of the engagement portion and so on.

In the interests of simplicity, the engagement claws 14*f* are not shown in FIGS. 23, 24, and 26.

Furthermore, the reference symbol 14*g* denotes a key groove, into which is inserted a key 17*a* which is provided as projecting from a side portion of the housing 17.

Further, with regard to the connector housing, as has been described above, the engagement claws which engage with the optical connector (the optical connector plug) are not limited, as far as their structure is concerned, to being formed unitarily with the housing main section of each of the half housings; for example, it would also be possible, as an alternative, to utilize a structure in which a sleeve shaped internal housing was provided which was formed separately from the sleeve shaped housing main section of the half housing, and the engagement claws were formed upon this internal housing, or the like.

Figure 35:
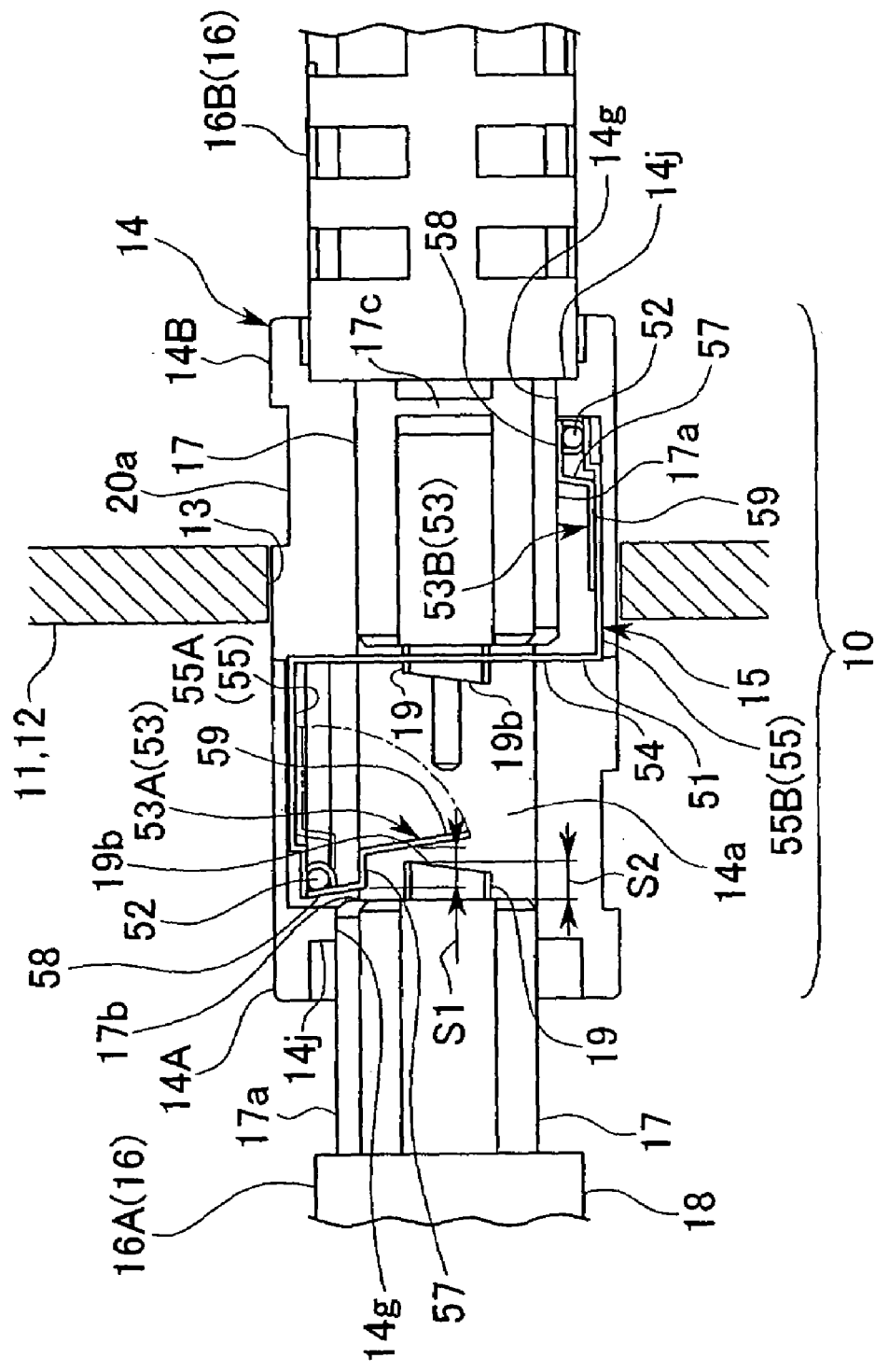
FIG. 35 is a sectional view showing the relationship between the tip end portion of an optical connector plug which is inserted into and connected to an optical connector adapter, and a window of a shutter unit.

As shown in FIGS. 27, 29, and 35, the shutter unit 15 is built to comprise a main section 51 which is formed by bending a single metallic plate or the like, and a pair of shutter leaves 53A and 53B which are mounted to this main section 51 by hinge fitting members 52 so as to be freely rotatable with respect thereto. Furthermore, in this preferred embodiment of the present invention, all of the members which are incorporated in the shutter unit 15, in other words, the main section 51, the hinge fitting members 52, and the shutter leaves 53A and 53B are made from materials which are endowed with electrical conductivity, and they are mutually connected together in such a manner that electricity can be conducted between them. In this preferred embodiment which is shown by way of example, the main section and the shutter leaves are members which are formed from a stainless steel plate material which is endowed with high electrical conductivity.

FIGS. 31A through 31C and FIG. 32 show the structure of the main section 51.

The main section 51 comprises a plate shaped fixed plate portion 54 which is fixed by being sandwiched between the pair of half housings 14A and 14B, and a pair of tongue leaf shaped extended portions 55A and 55B which are extended from both of the opposing longer edges of this main plate portion 54 so as to subtend right angles with respect to the fixed plate portion 54. However, the projections (extensions) of this pair of extended portions 55A and 55B from the main plate portion 54 are exactly in opposite directions with respect to the fixed plate portion 54. When the shutter unit 15 has been fitted between the pair of half housings 14A and 14B, these extended portions 55A and 55B are respectively inserted into the connector holes 14*a*1 and 14*a*2 of the half housings 14A and 14B; in concrete terms, into the extended portions 14*o* (refer to FIG. 27) which are portions which extend the side of the key grooves 14*g* of the connector holes 14*a*1 and 14*a*2; and thus they fulfill the function of setting the position of the main section 51 to its intended position within the connector housing 14. It should be understood that the extended portions 14*o* are formed as one portion of position determination grooves 14*h* which will be described hereinafter.

When the shutter unit 15 is assembled to the pair of half housings 14A and 14B, the main section 51 (in detail, the fixed plate portion 54) is positioned so as to cut exactly horizontally across the portion which is central along the axial direction of the connector hole 14*a* which is constituted by the pair of half housings 14A and 14B of the connector housing 14. However, both the sides of the main section 51 (in detail, of the fixed plate portion 54) are connected together along this connector hole 14*a* via a window 56 which is formed in the central portion of the fixed plate portion 54 of this main section 51, so that it is ensured that the fixed plate portion 54 of the main section 51 offers no obstruction to the mutual connection together of the optical connectors 16A and 16B which are inserted into the connector hole 14*a* from both sides and connected together.

With this optical connector equipped with a shutter 10, it is possible for the ferrules 19 of the optical connectors 16A and 16B which are inserted into the connector hole 14*a* to be inserted into the window 56 (refer to FIG. 36) of the main section 51 of the shutter unit 15, and it is so arranged that both the two end portions of the optical connectors 16A and 16B (in concrete terms, both of the ferrules 19), which have been inserted into the connector hole 14*a* from both its sides, project so as to engage together exactly in the vicinity of the fixed plate portion 54 of the main section 51.

It should be understood that it is most desirable to make this window 56 in this main section 51 as small as possible, from the point of view of maintaining the electromagnetic radiation shielding capability of the assembly; and, in this preferred embodiment of the present invention, no harm will come to the connection together of the optical connectors 16A and 16B, provided that this window 56 is kept sufficiently big, at least, for the ferrules 19 at both the ends of the two optical connectors 16A and 16B to be able to pass through it. This window 56 is formed of dimensions slightly bigger than the outer shape of the ferrules 19.

Furthermore, this main section 51 and its fixed plate portion 54 are formed of size and shape so as almost to agree with the cross sectional shape of the housing main sections 14*b* of the half housings 14A and 14B, so that, when the connector housing 14 of this optical connector equipped with a shutter 10 has been assembled to the fitting wall 12, it is arranged so as to close up almost the entire extent of the connector fitting hole 13, whereby it fulfils the function of a shield plate which is endowed with an electromagnetic radiation shielding capacity (this electromagnetic radiation shielding capacity will be described in detail hereinafter).

The position of the main section 51 is reliably assured by its fixed plate portion 54 being fixed by being pressed between certain position determining projections not shown in the drawings which are provided at a plurality of locations upon the junction end faces 14*i* of the half housings 14A and 14B, and it is thus securely and stably fixed between the pair of half housings 14A and 14B. It should be understood that the means for stably determining the position of and fixing the main section 51 (in detail, of its fixed plate portion 54) between the half housings 14A and 14B without allowing any mutual play therebetween are not to be considered as being limited to the means described above; it would, alternatively, be possible to employ any of various different structures for the same purpose, such as, for example, one in which position determination holes are provided as being pierced through the fixed plate portion 54, and the engagement projections 14d which are formed upon the junction end faces 14i of each of the half housings 14A and 14B stick through these position determination holes so as to engage into the engagement holes 14e of the junction end face of the other one of the half housings 14A and 14B and thereby fix together the half housings 14A and 14B, or the like.

The hinge fitting members 52, here, are shafts which are fitted to the projecting edges from the fixed plate portion 54 of the extended portions 55A and 55B, and, exactly, they are disposed so as to extend in a direction which is almost orthogonal to the axial direction of the connector holes 14a of the connector housing 14, when the shutter unit 15 has been assembled between the pair of half housings 14A and 14B. Accordingly, the shutter leaves 53A and 53B which are pivotally attached to the main section 51 by these shafts (the hinge fitting members 52) so as to be freely rotatable with respect thereto are supported in the same orientation as the shafts which are the hinge fitting members 52 (hereinafter the hinge fitting members 52 will sometimes be termed the shafts 52); in other words, they are supported along rotational axial lines which are almost orthogonal to the connector hole 14a of the connector housing 14, and so as to be freely rotatable with respect thereto. These shafts 52 are received and held in the interiors of portions (shaft holding portions 55a) at the edges of the extended portions 55A and 55B which are made in curved shapes as tubular portions.

Thus, as shown in FIG. 27, both the ends of the shafts 52 are projected to both sides of the extended portions 55A and 55B, so that, with the extended portions 55A and 55B being held within the half housings 14A and 14B, they are endowed with the function of stably supporting the main section 51 so that it cannot shake about with respect to the half housings 14A and 14B, by being inserted into position determination grooves 14h which are formed by dilating the one side portions (here, the side of the key grooves 14g) of the connector holes of the half housings 14A and 14B (the reference symbol 14a1 is appended to the connector hole upon the one half housing 14A).

To explain this matter in more detail, by arranging to dilate the one side portions (the sides of the key grooves 14g) of the connector holes of the half housings 14A and 14B into shapes which almost agree with the external shapes of the shafts 52, the position determination grooves 14h are formed as groove shapes which extend from the junction end faces 14i of the half housings 14A and 14B, almost parallel to the axial direction of the connector holes. Furthermore, with these position determination grooves 14h, their portions into which both the ends of the shafts 52 are inserted are made, exactly, in the shape of guide grooves which cut along the wall portions on both sides confronting the connector holes in the half housings 14A and 14B. Accordingly, both the ends of the shafts 52 which project to both sides of the extended portions 55A and 55B are respectively inserted into both the ends in the cross sectional direction of the position determination grooves 14h which are of long and thin cross sectional shapes which almost agree with the external shapes of the shafts 52, and thus, since they are held within the half housings 14A and 14B, they are endowed with the function of stably supporting the entire main section 51 and the shutter unit 15 so that they do not shake about therein.

However the position determination grooves 14h are not formed by piercing the half housings 14A and 14B in the axial direction of the connector hole; rather, at the end portions (the left side in FIG. 35 for the half housing 14A, and the right side in FIG. 35 for the half housing 14B) of the insertion aperture side of the optical connector 16 in the half housings 14A and 14B, the wall portions 14j (refer to FIGS. 30B and 35: division walls) which are formed as projecting from the inner surfaces of the connector holes of the half housings 14A and 14B function as wall portions to close off the deepest portions (the deepest sides as seen from the junction end faces 14i) of the position determination grooves 14h. These wall portions 14j fulfill the function of supporting the housing 17 of the optical connector 16 which has been inserted into the half housings 14A and 14B and preventing it from shaking about. Furthermore, as shown in FIGS. 28 and 35 and so on, the key grooves 14g of the half housings 14A and 14B are formed in the wall portions 14j.

It should be understood that the positions of the key grooves 14g of the half housings 14A and 14B are relatively opposite between the half housings 14A and 14B.

In these position determination grooves 14h, there are portions (the above described extended portions 14o) for receiving the extended portions 55 of the shutter unit 15, and there are portions in which the projecting portions from the extended portions 55 of the shafts 52 are inserted. When the assembly of the shutter unit 15 within the connector housing 14 has been completed, the shafts 52 of the ends of both the extended portions 55A and 55B of the main section 51 of the shutter unit 15 are respectively held so as to be sandwiched from both sides by the wall portions 14j (refer to FIGS. 30B and 35 and so on) which close off the deepest portions of the position determination grooves 14h of the half housings 14A and 14B, so that they are stably held with no play being able to occur between them and the connector housing 14.

It should be understood that the extended portions 55A and 55B only differ from one another with regard to their projection directions from the fixed plate portion 54; and accordingly, in the following, the explanation will sometimes be made in terms of appending the reference symbol 55 to both these extended portions 55A and 55B, when referring to their structure in common.

The positions on the shutter unit 15 which connect together the shutter leaves 53A and 53B which are arranged to oppose one another on both sides via the main section 51, and the main section 51 (here, the positions of the shafts 52) are positioned so as to confront one another from both the sides of the main section 51, and moreover in positions so as to be on both sides of the central axis of the connector hole 14a of the connector housing 14 (in other words, they pierce through the window 56 of the main section 51 on both sides of its central axial line).

The extended portions 55 of the shutter unit 15 are exactly inserted and held in the extended portions 14o within the position determination grooves 14h of the half housings 14A and 14B, and furthermore the portions of the shafts 52 which are projected on both sides of these extended portions 55 are received within the groove shaped portions which extend on both sides of the extended portions 14o of the position determination grooves 14h of the half housings 14A and 14B, and which are cut into the wall portions on both sides of the half housings 14A and 14B.

Even though, in this optical connector equipped with a shutter 10, the shutter unit 15 is included as being assembled to the connector housing 14, nevertheless, by comparison to an optical connector adapter in which no such shutter unit 15 is provided, the size is not particularly increased, and accordingly it is possible to make it be of the same external dimensions as an optical connector adapter in which no such shutter unit 15 has been incorporated.

The shutter leaves 53A and 53B are tongue leaf shaped small plate shrouds which project from the main section 51 of the shutter unit 15 into the connector hole 14a. It should be understood that these shutter leaves 14A and 14B only differ from one another in the orientation in which they are fitted to the main section 51 of the shutter unit 15, and they are identical in terms of their other concrete structures, so that, in the following description, when discussing these shutter leaves 53A and 53B in terms of their common structure, sometimes they will be simply referred to by appending the reference symbol 53 to them.

Figure 37:
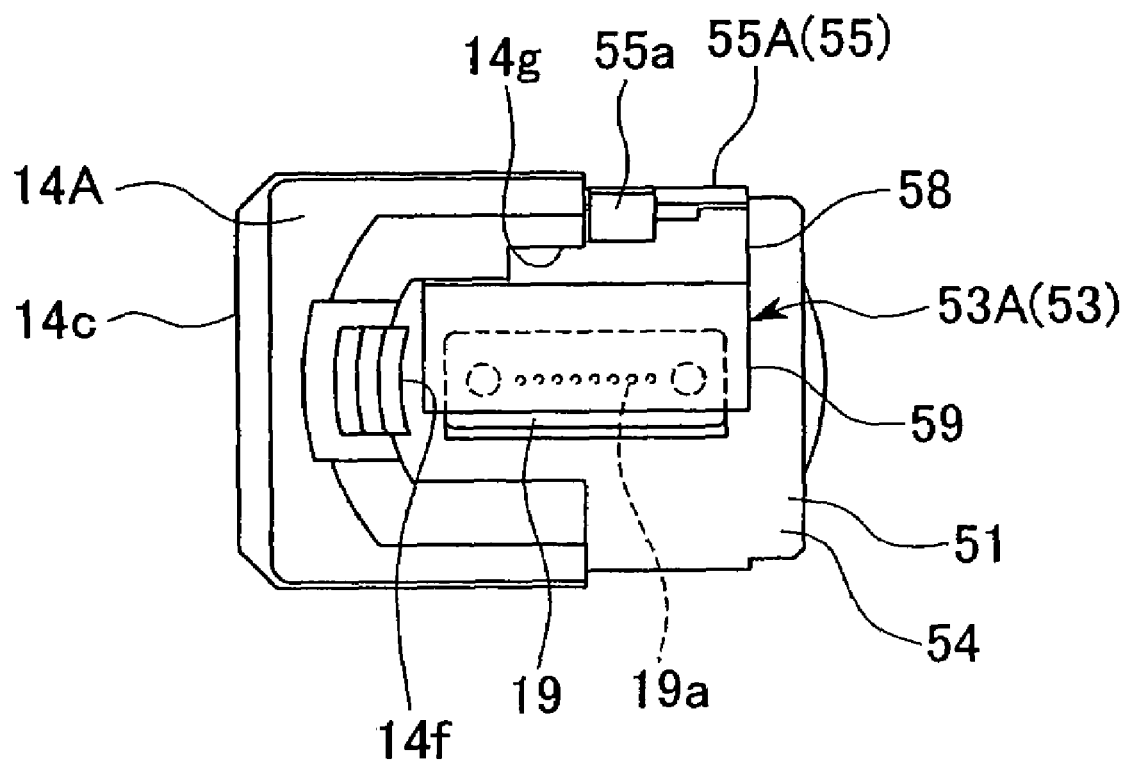
FIG. 37 is a partial sectional view showing the relationship between the tip end portion of the optical connector plug which is inserted into and connected to the optical connector adapter, and the shutter unit.

As shown in FIG. 34, the shutter leaves 53 are each made by bending a single metallic plate (here, these are metallic plates which are electrically conductive, and in concrete terms they are stainless steel plates), and bent portions 57, connector contacting portions 58, shaft holding portions 53b, and stoppers 53c are formed in the vicinity of their edge portions at the sides where they are pivotally attached to shafts 52 (i.e., at the sides at which the shaft holding portions 53b are provided as projecting). Furthermore, when the shutter leaf 53A is in a light interception position thereof (the position of the shutter leaf 53a which is shown in FIG. 29; i.e., the position of the shutter leaf 53a which is shown in FIG. 35 by the solid lines), a light intercepting plate portion thereof which is designated by the reference symbol 59 is arranged in a position which faces the junction end face 19b of the ferrule 19 of the connection reception side optical connector 16B, and this light intercepting plate portion 59 fulfils a function of intercepting light, so that the emitted light from the optical fiber 19a (refer to FIGS. 22B and 37) which is exposed at that junction end face 19b of the ferrule 19 of the optical connector 16B does not escape from the aperture portion on the opposite side of the connector hole 14a.

It should be understood that, in contrast to the above described situation, in the case that the optical connector designated by the reference symbol 16A has been made to be the connection reception side optical connector, a light intercepting plate portion 59 of the shutter leaf 53B which is in its light interception position (i.e., the position of the shutter leaf 53B shown in FIG. 29) is arranged in a position which faces the junction end face 19b of the ferrule 19 of the optical connector 16A which is inserted into the connector hole 14a and is connected to the connector housing 14, and it functions to intercept the light which is emitted from the optical fiber 19a (refer to FIG. 22D) which is exposed at the junction end face 19b of the ferrule 19.

The light interception plate portion 59 is shaped as a flat plate, and, in the shutter leaf 53, it is on the side which opposes the hinge fitting member (here, the shaft holding portion 53b) for the shaft 52 of the shutter leaf 53, via the bent portion 57 and the connector contacting portion 58. Furthermore, this light interception plate portion 59 is positioned to oppose the connector contacting portion 58 via the bent portion 57. The light interception plate portion 59 and the connector contacting portion 58 are connected to the bent portion 57 via the corner portions 57a and 57b at which the metallic plate which forms the shutter leaf 53 is folded at both sides opposing the bent portion 57, and moreover, are extended opposing the bent portion 57 from both sides, so as to be in relatively opposite orientations.

When the shutter leaves 53 are in their light interception positions as shown in FIG. 29 and so on, the light interception plate portion 59 comes to be arranged in a position displaced further to the side of the connection reception side optical connector than the connector contacting portion 58. With respect to the light interception plate portion 59, this connector contacting portion 58 is a projecting portion which is formed in the connector housing 14 so as to extend outwards at the side of the insertion aperture of the optical connector 16A (in this preferred embodiment of the present invention, it is positioned within the aperture portions on both ends in the axial direction of the connector hole 14, i.e. on the left sides in FIGS. 30A and 30B, and on the left side in FIG. 35).

The shutter leaves 53A and 53B are provided so as to project from their connection positions to the main section 51 (the shafts 52) into the connector hole 14a (in their light interception positions), and, when their connector contacting portions 58 are pressed by the tip end portion 17b of the housing 17 of the optical connector 16 which has been inserted into the connector hole 14a, they are pressed down and arrive at their retracted positions (which will be described hereinafter). When the optical connector 16 is pulled out from the connector hole 14a, the shutter leaves 53A and 53B are returned to their light interception positions by the biasing force of springs 60 (refer to FIG. 33; here, these are torsion springs) which are provided in the vicinity of the shafts 52. It should be understood that the pressing down of the shutter leaves 53 to their retracted positions by the optical connector 16 is against the biasing force of the springs 60 which is overcome, and is performed while elastically deforming the springs 60.

The structure for the biasing members which are assembled to the shutter unit 15 in order to press the shutter leaves back from their retracted positions to their light interception positions is not to be considered as being limited to the springs 60 which have been described above; as an alternative, it would also be possible to employ, for example, a structure in which a portion of the main section 51 was processed so as to be formed into a plate spring shape, or the like.

Each of the shutter leaves 53 comprises a shaft holding portion 53b which is made by bending processing its portion in the vicinity of its end towards the shaft 52 into a tube so as to hold the shaft 52, and a contacting stopper portion 53c which is made by bending the portion in the vicinity of its end towards the shaft 52 through a sharp angle. As shown in FIG. 35, by being rotated about the shafts 52 as centers, the shutter leaves 53 can be changed over between positions in which they roughly slope from the shafts 52 towards the side of the fixed plate portion 54 (the positions of the shutter leaves 53A and 53B shown in FIG. 29 by the solid lines, and the position of the shutter leaf 53A shown in FIG. 35 by the solid lines; these positions will be termed their light interception positions), and positions in which their extended portions 55A and 55B almost overlap one another (the position of the shutter leaf in FIG. 35 shown by the imaginary lines, and the position of the shutter leaf 53B in FIG. 35 shown by the solid lines; these positions will be termed their retracted positions).

Figure 33:
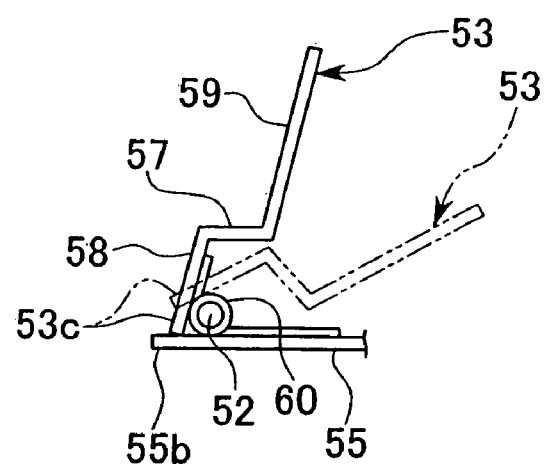
FIG. 33 is an enlarged view showing the relationship between a contacting stopper portion of a shutter leaf of the shutter unit of FIG. 31, and a stopper of an extended edge portion.

However, as shown in FIG. 33, when the shutter leaves 53 arrive at their light interception positions (their positions shown in FIG. 33 by the solid lines), then their further rotation to the opposite sides with respect to the fixed plate portion 54 is prevented by their contacting stopper portions 53c projecting and contacting against the surface of the projecting tip end portion of the extended portion 55; in other words, for the shutter leaf 53A, its further rotation in the anticlockwise direction in FIG. 33 is prevented. This situation is the same for the shutter leaf 53B (for the shutter leaf 53B, rotation in the clockwise direction from its light interception position shown in FIG. 29 by the solid lines is thus prevented). The projecting end portion from the fixed plate portion 54 of the extended portion 55 thus functions as a stopper 55b which prevents the further rotation of the shutter leaves 53 from their light interception positions to the opposite sides with respect to the fixed plate portion 54.

It should be understood that, since when the shutter leaves 53 are in their light interception positions they almost completely close off the connector hole 14a (i.e., they almost completely extend across the connector hole 14a in its cross sectional direction), therefore, in this state, as shown for example in FIG. 35, the light which is emitted from the optical fiber (denoted by the reference symbol 19a in FIGS. 22B and 37) which is exposed at the tip end of the optical connector 16B (in detail, at the junction end face 19b of the tip end of the optical connector 16; this optical connector 16B will be assumed to be the connection reception side optical connector), which has been previously inserted and connected from the aperture portion at the one end of the connector hole 14a, can reliably be prevented from escaping from the aperture portion on the opposite side of the connector hole 14a.

Furthermore, since when the shutter leaves 53 are in their light interception positions, a dust interception characteristic is exhibited in which intrusion of dust or the like into the space which is located in the connector hole 14 between the shutter leaves 53 and the connection reception side optical connector 16B is prevented, accordingly it is possible to prevent the inconvenience of the connection reception side optical connector 16B becoming dirtied or the like due to the adhesion of dust or the like.

It should be understood that, when neither of the optical connectors 16A and 16B is connected to the connector housing 14, each of the pair of shutter leaves 53 of the shutter unit 15 is in its light interception position, so that the pair of shutter leaves 53 fulfill the function of an anti dust protective shutter, and it is possible to prevent the intrusion of dust or the like into the space between the pair of shutter leaves within the connector hole 14a, so that it is possible to keep this space clean.

According to the above described optical connector equipped with a shutter 10 according to this preferred embodiment of the present invention, when mutually connecting together the optical connectors 16A and 16B within the connector hole 14a of the connector housing 14, even with the order of procedure in which, after first inserting one only of these optical connectors into the connector housing 14 (that optical connector which has been first inserted will be termed the connection reception side optical connector), subsequently the other one of the optical connectors is inserted and connected into the connector housing 14, the inconvenience does not arise that light which is emitted from the connection reception side optical connector should become a hindrance during the task of insertion and connection into the connector hole 14a of the optical connector which is to be subsequently inserted into the connector housing 14, which is to be connected to the previously inserted connection reception side optical connector, since any light which is emitted from the tip end of the optical connector which was first inserted into the connector housing 14 (in concrete terms, light which is emitted from the optical fiber 19a which is exposed at the junction end face 19b at the tip end of the optical connector 16; in the following description, sometimes this emitted light will be termed the "emitted light from the optical connector tip end") is intercepted by the shutter leaves 53 of the shutter unit 15 and is prevented from escaping from the connector hole 14a; and accordingly this task can be performed at high efficiency.

Furthermore, with this optical connector equipped with a shutter 10 according to this preferred embodiment of the present invention, when proceeding to insert the optical connector into the connector hole 14a, the shutter leaves 53 are pressed down by being pressed with this optical connector, so that the amount by which they project into the connector hole 14a is reduced, and accordingly it is possible to press in the optical connector. The shutter leaves 53 do not provide any hindrance to the insertion of the optical connector, and the optical connectors 16A and 16B which have been inserted from both ends of the connector hole 14a each press down the shutter leaves 53, and proceed into the region between the pair of shutter leaves 53A and 53B, so that it is easy to perform the task of connection. Furthermore, when taking out the optical connector from the connector hole 14a, the shutter leaves 53 are returned by the biasing force of the biasing members (the springs 60) to their positions in which they can intercept the emitted light (i.e. to their light interception positions).

It should be understood that, when the shutter leaves 53 are in their light interception position, their contacting stopper portions 53c come to be pressed against the stoppers 55b of the projecting end portions of the fixed plate portions of the extended portions 55 due to the biasing force of the biasing members (the springs 60), and they are thereby held so that no shaking about can occur.

When the optical connector 16 is being inserted into the connector hole 14a, although the shutter leaves 53 are pressed down by the connector contacting portions 58 of the shutter leaves 53 being pressed by portions thereof other than the junction end face 19b of the ferrule 19—in concrete terms, by the tip end portion 17b of the housing 17—as compared to the light interception plate portion 59, due to the structure of the shutter leaves 53 which are pressed down by the optical connector 16 and are shifted forward and positioned, in the pressing down of the shutter leaves 53 by the optical connector 16, the connector contacting portions 58 maintain the state in which the junction end face 19b of the tip end of the optical connector 16 does not come into contact with the shutter leaves 53, so that they reach their retracted positions.

As shown in FIG. 35, when the housing tip end portion 17b of the optical connector 16 (here, meaning the optical connector which is designated by the reference symbol 16A in FIG. 35) which has been inserted into the connector hole 14a has been contacted against the connector contacting portion 58 of the shutter leaf 53 (here, meaning the shutter leaf which is designated by the reference symbol 53A in FIG. 35) which is in its light interception position, the clearance between the light interception plate portion of the shutter leaf 53A and the ferrule 19 of the optical connector 16A comes to be reliably maintained. In other words, with regard to the contacting against position of the housing tip end portion 17b of the optical connector 16A at the connector contacting portion 58, in the confronting position with the junction end face 19b of the ferrule 19 of the optical connector 16A at the light interception plate portion 59, the shift amount S1 in the direction of forward pressing down due to the optical connector 16 (in the light interception position, the amount of deviation in the direction along the axial direction of the connector hole 14a of the connector housing 14) is set to be bigger than the amount of projection S2 of the ferrule 19 from the housing tip end portion 17a of the optical connector 16A.

Since the distance of the light interception plate portions 59 from the rotational axes of the shutter leaves 53 (the shafts 52) is far as compared to the connector contacting portions 58, when the pressing in of the optical connector 16A into the connector housing 14 is continued, along with this pushing in of the optical connector 16A, the distance of rotational shifting of the light interception plate portions 59 is greater than the distance of rotational shifting of the connector contacting portions 58, so that, finally, as a result, along with the pushing in of the optical connector 16A, the light interception plate portions 59 little by little increase their distance from the ferrule 19, and the shutter leaf 53A reaches its retracted position, with the junction end face 19b of the tip end of the optical connector 16A maintaining its state of not being in contact with the shutter leaf 53A. Due to this, since the junction end face 19b of the tip end of the optical connector 16 does not come into contact with the shutter leaves 53 at any time, the inconvenience of the junction end face 19b becoming damaged is reliably prevented, and it is possible to maintain the optical characteristic of the optical connector 16 in a stable manner.

During the task of taking out the optical connector 16 from the connector housing 14 as well, the non contact state between the light interception plate portion 59 and the junction end face 19b is reliably maintained.

Furthermore, in this manner, if the shift amount S1 in the forward pressing down direction of the shutter leaf 53A by the optical connector 16 of the light interception plate portion 59 (in detail, the confronting position of the light interception plate portion 59 with the junction end face 19b of the ferrule 19 of the optical connector 16A) with respect to the connector contacting portion 58 (in detail, the contacting position of the housing tip end portion 17b of the optical connector 16A with the connector contacting portion 58) is kept as being larger than the amount of projection S2 of the ferrule 19 from the housing tip end portion 18a of the optical connector 16A, then the pressing down of the shutter leaf 53A by the housing tip end portion 17a of the optical connector 16A pressing the shutter leaf 53A is started at a point at which the optical connector 16A has been inserted more deeply into the connector housing 14, as compared to the case in which the shift amount S1 is smaller than the projection amount S2. In other words since, with this optical connector equipped with a shutter according to the present invention, a structure has been made possible in which the pressing down of the shutter leaf 53A by the optical connector 16A is continued in the state in which the connector hole 14a is closed off by the optical connector 16A, thereby, due to this, there is the beneficial aspect that it is possible to enhance the dust interception characteristic of the connector hole 14a. Moreover, with this optical connector equipped with a shutter 10, when, by pressing down of the shutter leaf 53A by the optical connector 16A, the shutter leaf 53A has been rotationally displaced as far as a position in which it cannot intercept the light which is emitted from the tip end of the connection reception side optical connector 16B, the insertion of the optical connector 16A into the connector housing 14 arrives at a point which is deeper (in other words, whose distance from the connection reception side optical connector 16B is shorter) as compared with the case in which the shift amount S1 is smaller than the projection amount S2; and, accordingly, it is possible reliably to intercept the light which is emitted from the tip end of the connection reception side optical connector 16B by the optical connector 16A itself, so that it is possible reliably to prevent the escape of such emitted light from the connector hole 14a, even partway through the task of inserting and connecting the optical connector 16A into the connector housing 14.

Figure 34A:
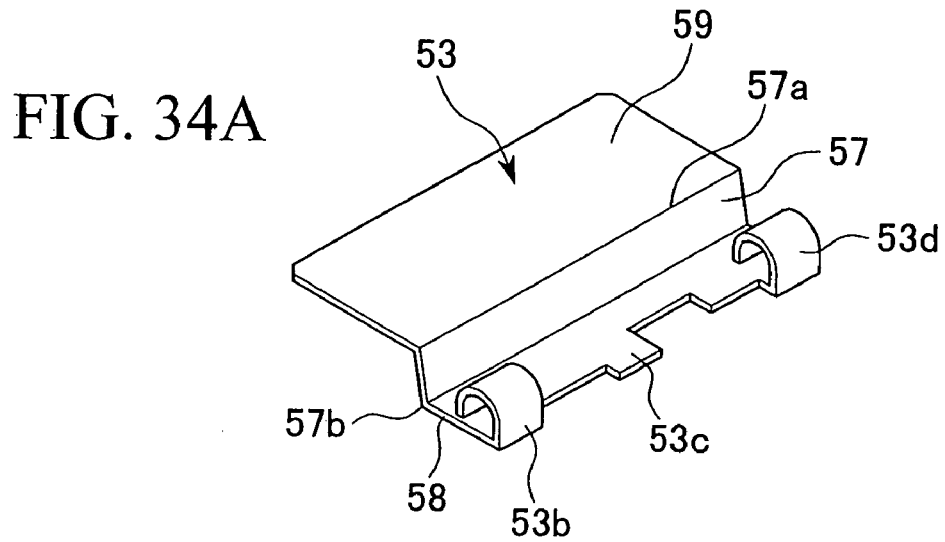
FIGS. 34A, 34B, and 34C are perspective views showing various structures for a shutter leaf which is applied in the shutter unit of FIG. 31.
Figure 34B:
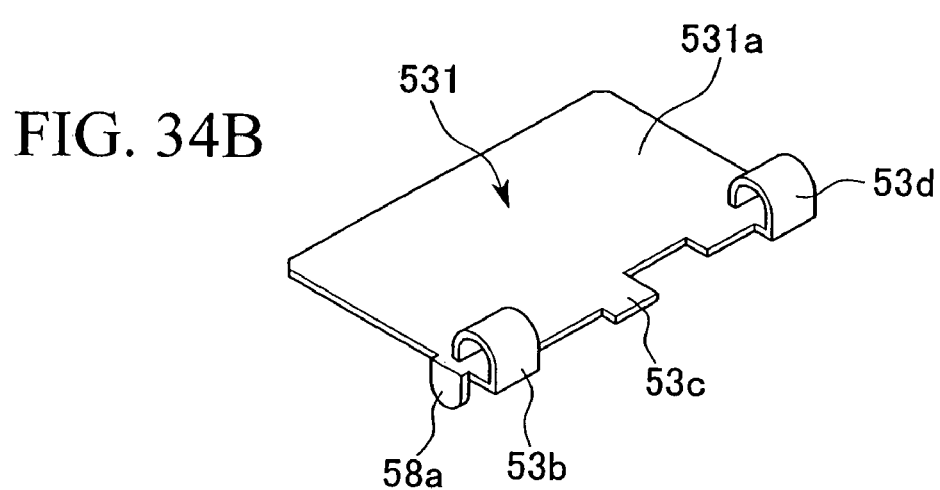

It should be understood that, for the shutter leaves, the shifting amount (the above described value S1) of the light interception plate portions with respect to the connector contacting portions is not to be considered as being limited to the one which has been shown in FIG. 34A and has been described by way of example in the above explanation; any shifting amount will be acceptable, provided that the structure is one which can keep to a size which can maintain the non contact state between the light interception plate portions 59 and the junction end face 19b. For example, it is also possible to utilize a structure in which, as with the shutter leaf 531 shown in FIG. 34B, a projection shaped connector contacting portion 58a is provided as projecting on a single plate shaped shutter leaf main body 531a which also serves as a light interception plate portion. It is desirable for this shutter leaf 531 also to be one which is entirely formed by bending from a single metallic plate, including a connector contacting portion 58a. Furthermore, the position of the connector contacting portion 58a in the shutter leaf main body 531a is not to be considered as being particularly limited; any position will be acceptable, provided that it is a position which does not confront the junction end face 19b of the optical connector 16 which is pressing down the shutter leaf 531 by being inserted into the connector housing 14.

Although, as shown in FIG. 35, with this preferred embodiment of the present invention, by way of example, a connector housing 14 was shown which had position determination grooves 14h which were formed by dilating the connector holes of the housings 14A and 14B on the sides of the key grooves 14g, the present invention is not to be considered as being limited by this; for example, it would also be possible, as an alternative, to form the position determination grooves 14h by dilating the connector holes of the half housings 14A and 14B on the sides of the key grooves 14g. In this case, it is possible to extend the key grooves 14g in the half housings 14A and 14B up to the vicinity of the central portion of the connector housing 14, so that it is possible to enhance the stability of position determination of the optical connector 16 by inserting the keys of the optical connector 16 into the half housings 14A and 14B.

Figure 34C:
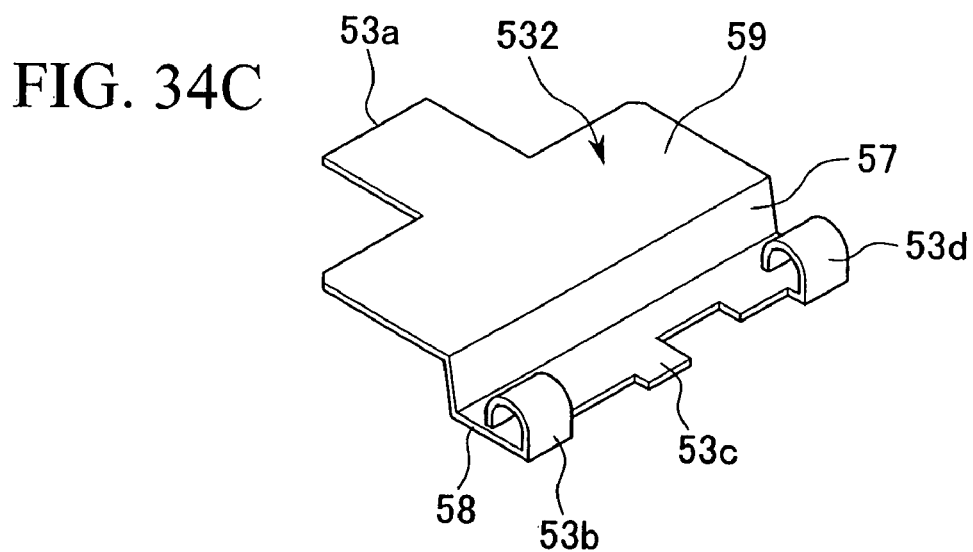

Although in this case, for example, as shown in FIG. 34C, there is employed, as the shutter leaf (the reference symbol 532) as well, one which is shaped as a projecting flange 53a which can be inserted into the key grooves 14g of the half housings 14A and 14B, projecting at the tip end portion which is projected within the connector hole 14a, this is also desirable from the point of view of maintaining the dust interception characteristic within the connector hole.

With the shutter leaf 532 shown in FIG. 34C, there is provided a projecting flange 53a at the tip end portion which is projected within the connector hole 14a of the shutter leaf 53 shown by way of example in FIG. 34A, and it can be assembled within the connector housing 14 by being fitted to the main section 51 of the shutter unit 15, instead of the shutter leaf 53.

-Regarding the Electromagnetic Radiation Shielding of the Connector Fitting Hole- From the point of view of ensuring the electromagnetic radiation shielding capability of the connector fitting hole 13, it is desirable for the connector housing 14 itself to be an element which is endowed with an electromagnetic radiation shielding function, and, in this preferred embodiment of the present invention, there is employed a connector housing 14 (or two half housings) which is made from a synthetic resin which has, dispersed within the resin material from which it is formed, minute particles which are endowed with an action of absorbing electromagnetic radiation; and, in concrete terms, a carbon filler is employed as these minute particles which are endowed with an action of absorbing electromagnetic radiation. However the present invention should not be considered as being limited to this use of a carbon filler is employed as these minute particles which are endowed with an action of absorbing electromagnetic radiation; it would be possible to utilize various other appropriate types of material. Furthermore, the present invention should not be considered as being limited to this use of such minute particles for the function of absorbing electromagnetic radiation; it would be possible, as an alternative, to utilize, for example, a material which included an electrically conductive paint layer which was formed by painting a paint material which was electrically conductive (for example, a paste or the like into which were mixed magnetic metallic particles which had an action of absorbing electromagnetic radiation) upon a substrate material which was made from synthetic resin or the like, or a material to which was fixed an electrically conductive cloth layer which was made from electrically conductive fiber material (such as metallic fibers or the like).

In this manner, it is possible simply to ensure the grounding of this connector housing 14 which is endowed with electromagnetic radiation shielding capacity, as for example shown in FIG. 23, just by fitting it to the chassis 11 (including the fitting wall 12) which has an electromagnetic radiation shielding capacity, and by guaranteeing electrical conduction between it and the chassis 11 to which it is fitted, and the like, and by simply contacting it or the like to an electrically conductive member which serves as a ground, thus ensuring electrical conductivity between them. Furthermore, there is the beneficial aspect that it is possible simply also to assure the grounding, via this connector housing 14, of the shutter unit 15 which is endowed with electromagnetic radiation shielding capacity. In this case, a contribution is made towards reducing the cost of this optical connector equipped with a shutter 10, since it is no longer necessary to provide any special separate connection circuit to this optical connector equipped with a shutter 10 for grounding the shutter unit 15.

It should be understood that there is no need to say that it is also possible to provide to the shutter unit 15 a contact for electrical conduction which projects to the exterior of the connector housing 14, and to make this contact also serve for connection to the electrically conductive member for grounding such as the fitting wall 12 of the chassis 11 or the like. Although it will be acceptable to provide a separate member which is separately connected to the shutter unit 15 as such a contact for electrical conduction, it is also possible to employ an extended portion from the main section of the metallic plate which constitutes the main section 51 of the shutter unit 15 for this purpose.

Here, the chassis 11 (including the fitting wall 12) is a member which is endowed with an electromagnetic radiation shielding capacity, such as a member which is formed from a metallic plate which is electrically conductive, for example stainless steel or the like; or it would also be possible to utilize a material (in this case, not limited to the material from which the chassis 11 is made) which is provided with an electrically conductive layer which is formed by adhering a film or an electrically conductive paint layer which is made by painting on a paint material which is electrically conductive (for example, a paste or the like into which are mixed magnetic metallic particles which have an action of absorbing electromagnetic radiation) upon a substrate material such as a plate member or the like, or a member consisting of a plate member to which is fixed an electrically conductive cloth layer which is made from electrically conductive fiber material (such as metallic fibers or the like).

Due to the contact between the connector housing 14 itself and the chassis 11, or due to the contact between the contact for conducting electricity and the chassis 11, the shutter unit 15 is connected to the chassis 11 via the connector housing 14, or via the contact for conducting electricity, so that electricity can be conducted between them, and accordingly the electromagnetic radiation shielding capacity of the connector fitting hole is properly maintained by the shutter unit 15, since the chassis 11 being endowed with the function of serving as a ground.

Furthermore, in FIG. 23, the shield cover which is designated by the reference symbol 20 comprises three side plate members 20a, 20b, and 20c which are fitted separately to three faces out of the four faces (the peripheral faces) of a housing main section 14b of the half housing 14B which is rectangular in cross sectional shape (refer to FIG. 22C), and it is entirely made from a metallic plate which is electrically conductive, such as stainless steel or the like, and this shield cover 20 is a member formed as a cover shape which surrounds the half housing 14B from these three sides. Thus, the three side plate members 20a, 20b, and 20c of this shield cover 20 are made so as to be housed in shallow grooves 14p (refer to FIGS. 29 and 30) which are formed on three sides of the housing main section 14b, and it is attached on the outside of the housing main section 14b so that no positional deviation can occur between them.

Engagement claws 20d which are projected to the outside from the side plate members 20b and 20c which are positioned at both opposite sides this shield cover 20, as shown in FIG. 23 and so on, are engaged with the fitting wall 12 around the periphery of the connector fitting hole 13 when this optical connector equipped with a shutter 10 has been inserted into the connector fitting hole 13 of the fitting wall 12, and, along with fulfilling the function of preventing the optical connector equipped with a shutter 10 from coming away from the fitting wall 12, also connect it to the chassis 11 in close contact therewith so that electrical current can pass between them, whereby the electromagnetic radiation shielding capacity of the shield cover 20 can be exhibited to the best effect. Furthermore, a more effective contribution is made to maintaining the electrical conduction between the connector housing 14, which is endowed with an electromagnetic radiation shielding capability, and the fitting wall 12.

These engagement claws 20d are portions which are made by forming portions of the side plate members 20b and 20c so as to project to the outside, and they are formed so that the amount by which they project to the outside of the housing 14B gets bigger little by little as one goes from the far side from the junction end face 14i of the half housing 14B towards the junction end face 14i side.

In order to fit this optical connector equipped with a shutter 10 to the fitting wall 12, this optical connector equipped with a shutter 10 is pushed from the outside of the chassis 11 (in FIG. 23, from the left side of the fitting wall 12) into the connector fitting hole 13 of the fitting wall 12 (i.e. is pushed in the direction towards the right side of the fitting wall 12 in FIG. 23), with the side to which the shield cover 20 is fitted (here, the side of the half housing 14B) being the forward side in the pushing direction. The connector fitting hole 13 is shaped in a shape which almost agrees with the external shape of the fixing portion of the shield cover 20 of this optical connector equipped with a shutter 10, and, along with the progress of the pushing in of the optical connector equipped with a shutter 10 towards the connector fitting hole 13, the engagement claws 20d of the shield cover 20 are elastically deformed by their contact against the inner wall surfaces of the connector fitting hole 13, so that, after they have been pressed into the connector housing 14 side, and after they have passed through the fitting wall 12, they return to their originally projecting states due to their own resilience, and are thereby engaged to the fitting wall 12 from the inside of the chassis 11. Due to this, the fitting wall 12 is pinched and sandwiched between the engagement claws 20d and the projecting flange 14c, and thereby the optical connector equipped with a shutter 10 is stably fitted to the fitting wall 12. At this time, detachment of the optical connector equipped with a shutter 10 from the fitting wall 12 is impossible unless the engagement of the engagement claws 20d to the fitting wall 12 is released, so that it is possible to prevent unintentional pulling out or the like of the optical connector equipped with a shutter 10 from the fitting wall 12.

In this preferred embodiment of the present invention, the chassis 11 is a member in which, at least in the locations against which the engagement claws 20d are contacted, portions which are endowed with electrical conductivity (electrically conducting elements for grounding) are exposed on the inner surface side of the fitting wall 12, and, when the engagement claws 20d are engaged to the fitting wall 12 of this chassis 11, the connector housing 14 and the electrically conductive portions for grounding of the chassis 11 are mutually connected together via these engagement claws 20d so that electrical current can flow between them, so that grounding of the shutter unit 20 is effectively assured.

When this optical connector equipped with a shutter 10 is fitted to the fitting wall 12 of the chassis 11, the connector fitting hole 13 of the fitting wall 12 comes to be in a state in which it is closed off by the optical connector equipped with a shutter 10 with almost no gap being left between them. At this time, the main section 51 of the shutter unit 15 (in detail, the fixed plate portion 54) is positioned at the periphery of the connector fitting hole 13, so that it is possible thereby effectively to ensure electromagnetic radiation shielding of the connector fitting hole 13, since the shutter unit 15 has been disposed so as almost entirely to close off the connector fitting hole 13.

-Another Preferred Embodiment-

Figure 38:
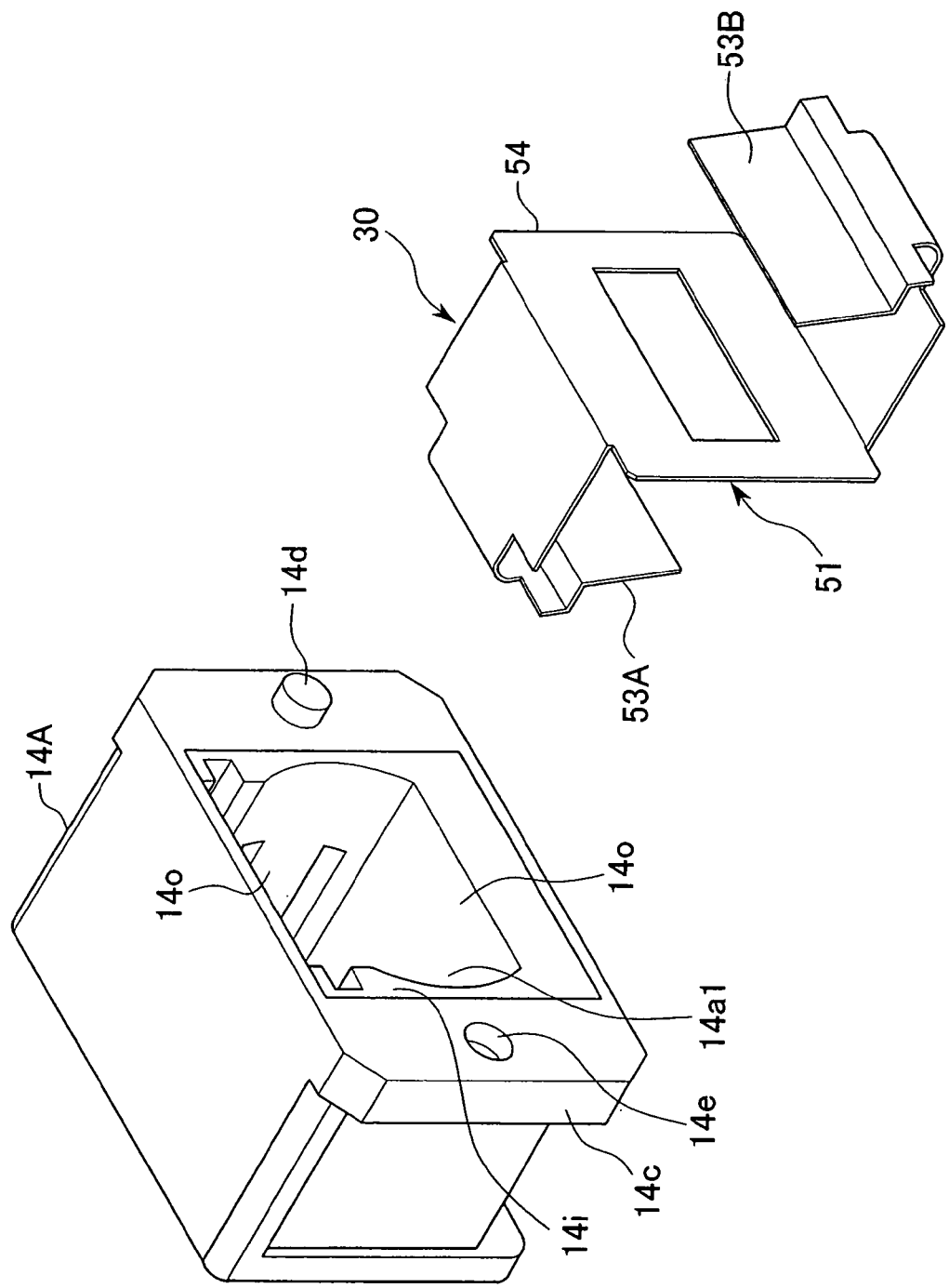
FIG. 38 is a perspective view showing a shutter unit which is entirely made from a single metallic plate.
Figure 39:
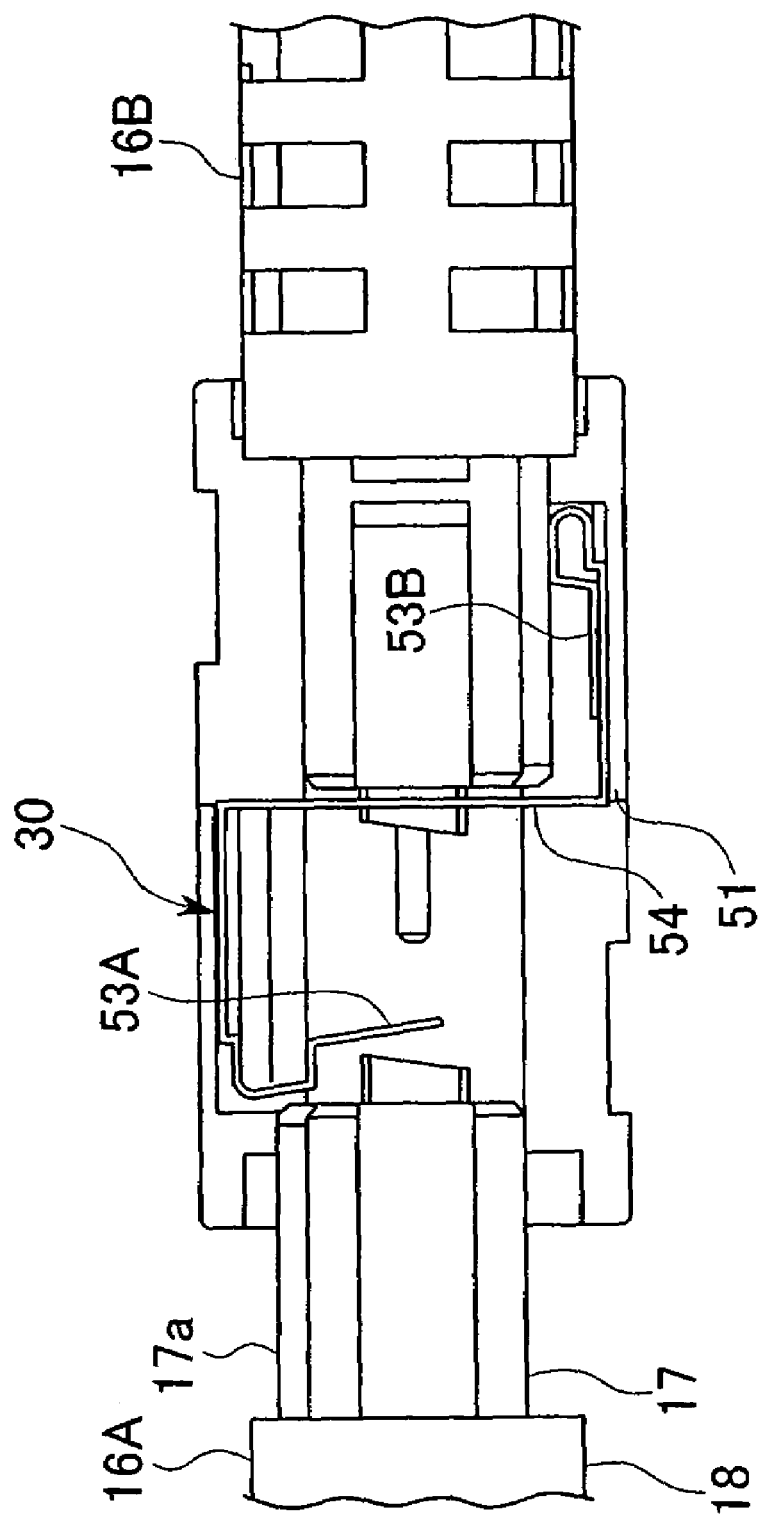
FIG. 39 is a sectional view showing the state in which the shutter unit of FIG. 38 has been assembled within a connector housing.

FIGS. 38 and 39 are figures showing an example of an optical connector equipped with a shutter, to which a shutter unit 30 which has been formed by processing a single plate of metal (stainless steel or the like) has been applied. This shutter unit 30 is a single element which has been entirely formed from a single metallic plate, including a main section 51 (including the fixed plate portion 54) and shutter leaves 53A and 53B. According to this structure, the number of component parts is reduced, so that there is the beneficial aspect of reduction in cost. Furthermore, there is the benefit that it is easy to make the device compact.

Since, according to the above described optical connector equipped with a shutter, the shutter unit 30 which has been assembled within the connector housing comprises the shutter leaves 53A and 53B confronting the main section 51 on both its sides, thereby the same light interception beneficial effect is obtained, whichever one among the pair of optical connectors 16A and 16B which are inserted from both the opposite sides of the connector housing 14 and which are connected within the connector hole 14a may be the connection reception side optical connector.

-The Second Preferred Embodiment-

Figure 40:
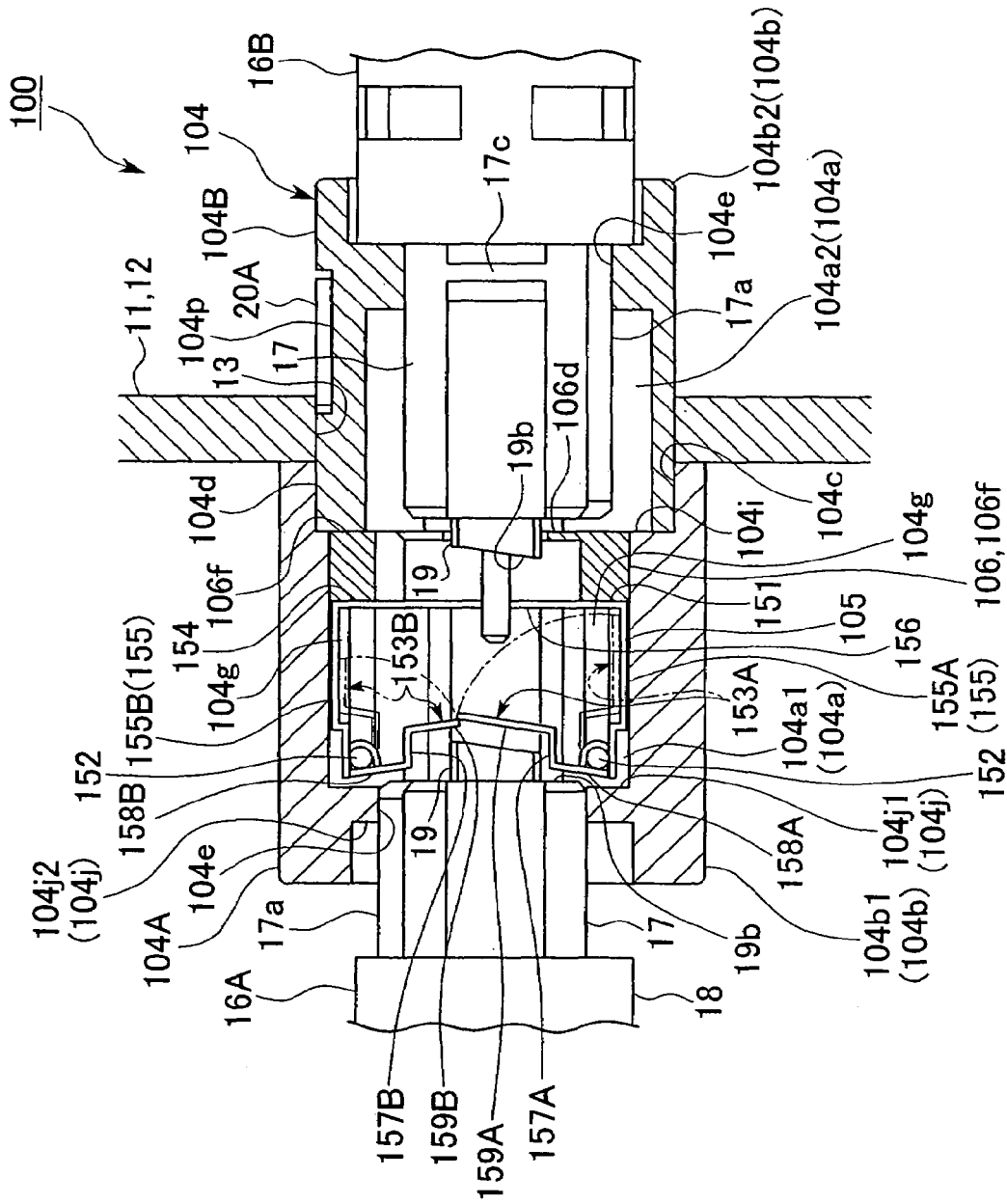
FIG. 40 is a sectional view showing the structure of an optical connector equipped with a shutter according to the second preferred embodiment of the present invention, and particularly showing the relationship between a tip end portion of an optical connector plug which is inserted into and connected to an optical connector adapter, and a shutter unit.
Figure 41:
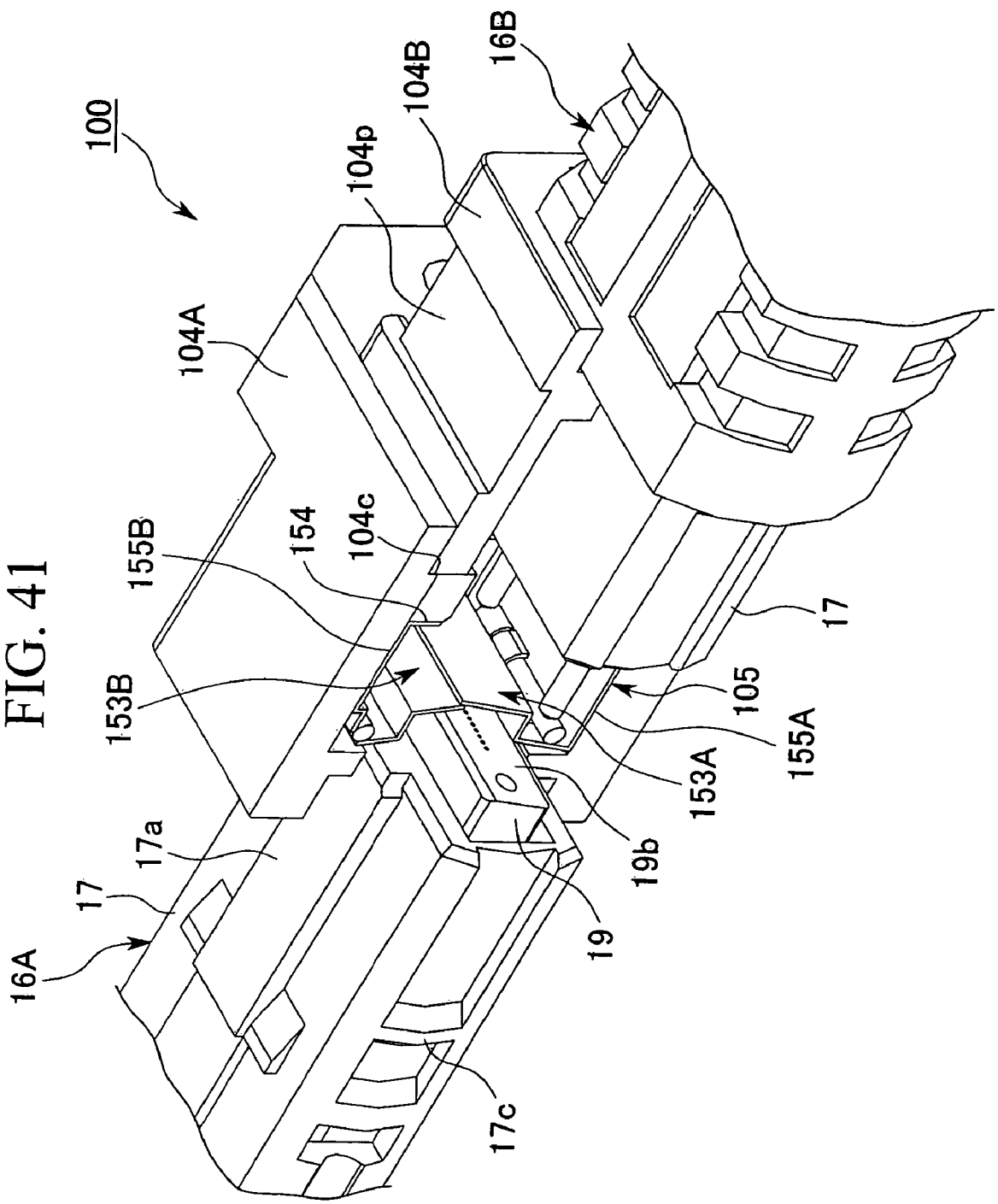
FIG. 41 is a sectional perspective view showing the structure of the optical connector equipped with a shutter according to the second preferred embodiment of the present invention, and particularly showing the relationship between the tip end portion of the optical connector plug which is inserted into and connected to the optical connector adapter, and the shutter unit.

FIG. 40 is a sectional view showing an optical connector 100 equipped with a shutter according to a second preferred embodiment of the present invention, and FIG. 41 is a perspective sectional view thereof.

As shown in FIGS. 40 and 41, the optical connector equipped with a shutter 100 is made as a structure of a shutter unit 105 and a spacer 106, assembled into the interior of a connector housing 104 which constitutes an optical connector adapter. Referring now to FIGS. 40 and 41, the connector housing 104 is made by joining and unifying together a pair of half housings 104A and 104B which are of different sizes, and it is formed to have a generally sleeve shaped structure with its interior being pierced with a connector hole 104a. This connector housing 104 is arranged for optical connectors 16A and 16B to be inserted into its connector hole 104a from the two opposite ends thereof, so that they can be connected together at the central portion of the connector hole 104a, with engagement claws 104f being formed in the interiors of the half housings 104A and 104B, and with these engagement claws 104f being able to be engaged with, or to be disengaged from, the optical connectors 16A and 16B. These engagement claws 104f are of the same general structure as the engagement claws 14f which were formed within the connector housing 14 of the optical connector equipped with a shutter 10 of the first preferred embodiment of the present invention which was described above (refer to FIG. 28 and so on), and they have a structure which includes a slide locking mechanism which is engagable to and disengagable from an engagement portion 17c of the interior of the housing 17 of the optical connector 16 which is the optical connector plug of an MPO type optical connector (MPO: Multifiber Push-On; for example, as specified by JIS C 5982 or IEC 1754-7). It should be understood that the type of these engagement claws 14f, the type of the optical connector 16, the size of the housing 17, the shape of the engagement portions and so on can be varied as appropriate.

Each of the half housings 104A and 104B is a unitarily formed member which is made of, for example, a synthetic resin such as plastic or the like, but, here, for each of them is employed a member which is formed as a unit from an electrically conductive resin material in which are dispersed minute particles of a material which has an action to absorb electromagnetic waves (radiation), such as carbon filler or the like. And it comprises a sleeve shaped housing main section 104b (the reference symbol 104b1 is appended to the housing main section on the side of the half housing 104A, while the reference symbol 104b2 is appended to the housing main section on the side of the half housing 104B). And the connector housing 104 is assembled by joining the pair of half housings 104A and 104B directly in series in the axial direction (i.e., in the axial direction of their connector holes 104a1 and 104a2) and by connecting them together into a unit. By doing this, the connector holes 104a1 and 104a2 are communicated together, and thereby the connector hole 104a of the connector housing 104 is defined.

One of the half housings 104A is made to be larger than the other one of the half housings 104B, and an end portion 104d on the opposite side of the half housing 104B from the end portion at the side at which the optical connector 16B is inserted into it, is inserted into a concave engagement portion 104c which is formed in the end portion of the half housing 104A on the opposite side to the insertion aperture (the left side in FIG. 40) of the optical connector 16A, thus connecting them together and mutually unifying them.

Figure 42A:
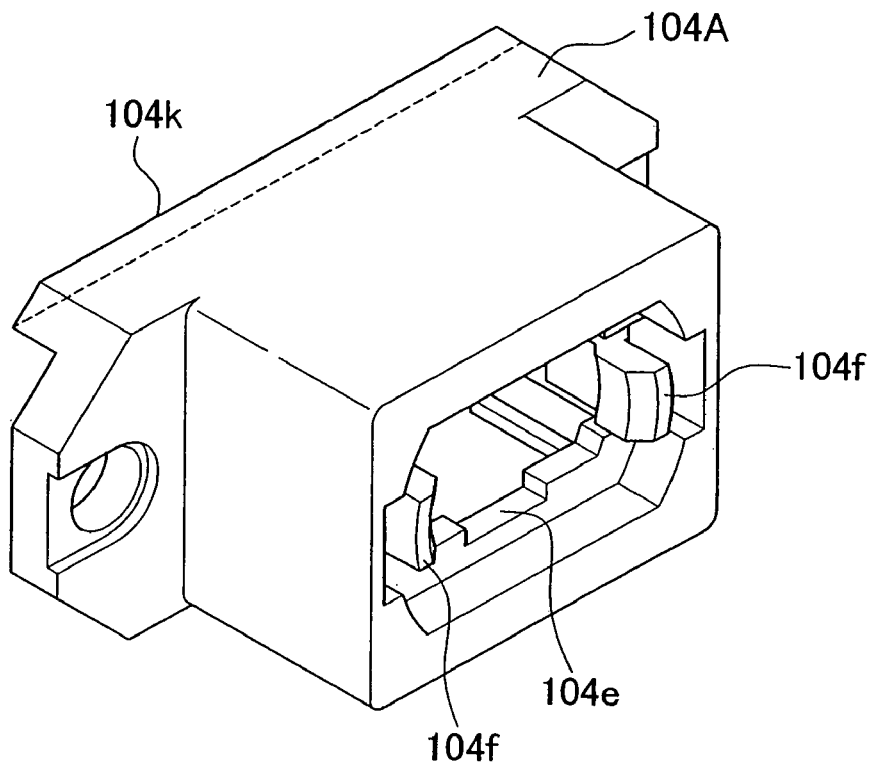
FIGS. 42A, 42B, and 42C are perspective views showing one half housing of the optical connector equipped with a shutter of FIG. 40.
Figure 42B:
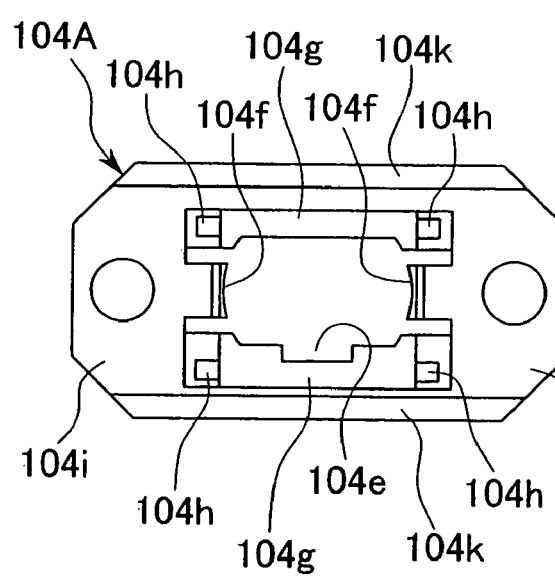
Figure 42C:
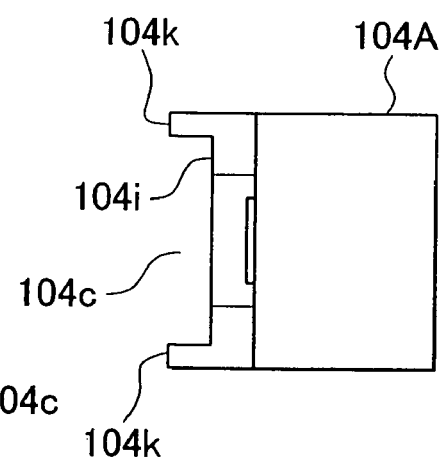

As shown in FIGS. 42A through 42C, the concave engagement portion 104c is a concave portion between a pair of projecting ribs 104k which are provided as projecting upon the junction end face 104i between the half housing 104A and the half housing 104B, parallel and opposite to one another. The end portion 104d of the half housing 104B is engaged into this engagement alcove 104c, its position is fixed by utilizing a position regulation jig or the like, and then it is fixed to the half housing 104A by being attached by heat welding or by the use of an adhesive material or the like.

It should be understood that it would be possible to utilize various alternative types of methods or structure for regulating the mutual relative positions of the half housings 104A and 104B and unifying them and fixing them together; for example, they might also be mechanically fixed together by the use of a screw fastening or the like. Furthermore, it goes without saying that it would also be possible to employ a structure in which the mutual relative position determination between the two half housings 104A and 104B was performed, and these two half housings 104A and 104B were fixed together, by the use of engagement projections which were formed upon the junction end face 104i of one of the two half housings 104A and 104B, and engagement holes which were formed upon the junction end face 104i of the other one of the two half housings 104A and 104B.

Furthermore although here, as the connector housing 104, a type has been shown in which the pair of half housings 104A and 104B which are of different sizes have been assembled together, the structure should not be considered as being limited by this detail; it would also be acceptable, as an alternative, to utilize a structure in which the pair of half housings 104A and 104B were of the same structure as one another, and were assembled by being joined and unified together.

Yet further, in the interior of each of the half housings 104A and 104B, there is formed a key groove 104e into which a key 17a which projects into the interior of the housing 17 is inserted. The positions in which these key grooves 104e are formed are relatively opposite on the two half housings 104A and 104B.

Figure 43:
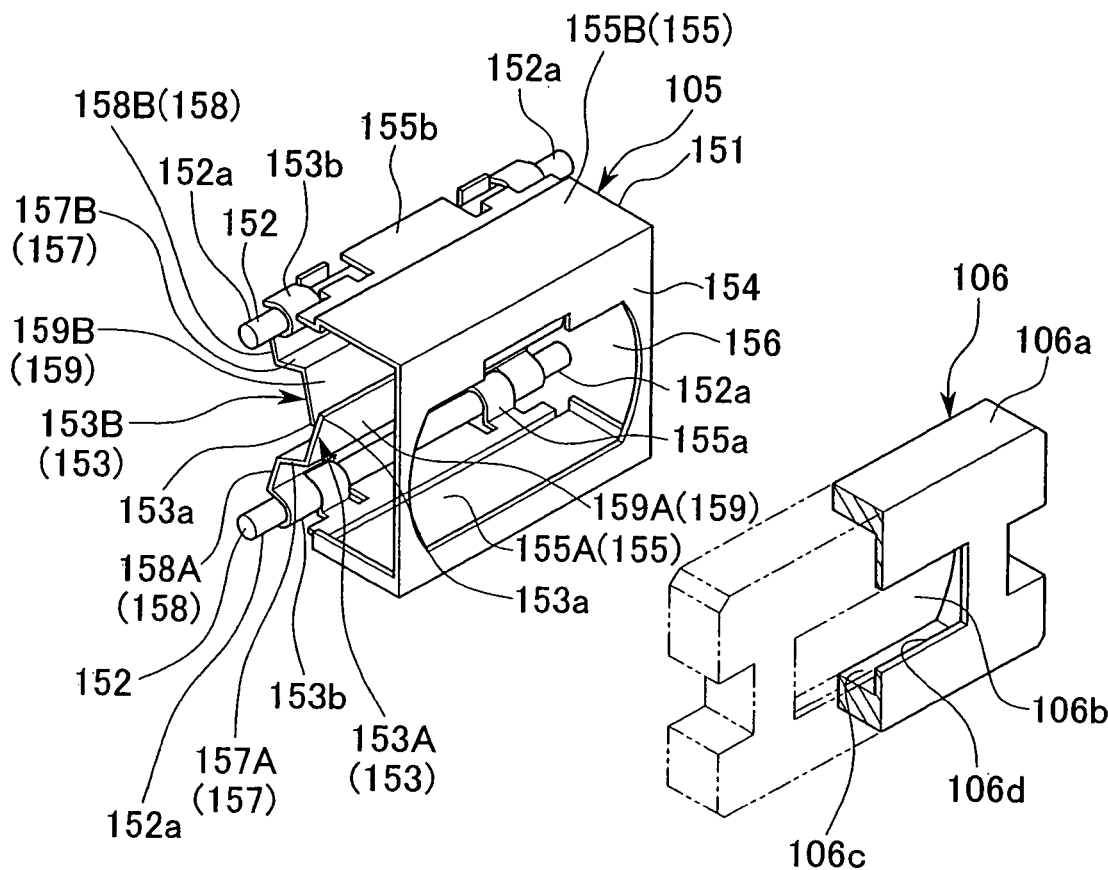
FIG. 43 is a perspective view showing the shutter unit of the optical connector equipped with a shutter of FIG. 40.

As shown in FIG. 43, the shutter unit 105 has a structure which comprises a main section 151 which is formed by processing a single metallic plate by bending or the like, and a pair of shutter leaves 153A and 153B which are attached to this main section 151 by hinge fitting members 152 so as to be freely rotatable with respect thereto. Furthermore, the shutter leaves 153A and 153B are arranged on one side of the main section 151 so as to oppose the main section 151, and the connecting positions between the shutter leaves 153A and 153B and the main section 151 (i.e., the hinge fitting members 152) are positioned at locations which lie on both sides of the central axis of the connector hole 104a of the connector housing 104, so that the shutter leaves 153A and 153B are provided so as to project into the connector hole 104a from their positions where they are linked to the main section 151.

Furthermore, the tip end portions 153a of the two shutter leaves 153A and 153B mutually overlap one another. It should be understood that although, in this preferred embodiment of the present invention, the tip end portions 153a, 153a of the shutter leaves 153A and 153B are shown as elements which mutually overlap one another, nevertheless the present invention should not be considered as being limited by this structure; it would be acceptable for the tip end portions 153a, 153a of the shutter leaves 153A and 153B not to mutually overlap one another. However, if they do thus overlap one another, there is a beneficial aspect from the point of view of maintaining the dust interception characteristic for preventing dust from insinuating itself within the connector hole 104a.

Furthermore, in this preferred embodiment of the present invention, all of the various members which are comprised in the shutter unit 105, in other words the main section 151, the hinge fitting members 152, and the shutter leaves 153A and 153B are made from materials which are endowed with electrical conductivity, and they are mutually connected together in such a manner that electricity can be conducted between them. In this preferred embodiment which is shown by way of example, the main section and the shutter leaves are members which are formed from a stainless steel plate material which is endowed with high electrical conductivity.

The main section 105 comprises a plate shaped fixed plate portion 154, and a pair of tongue leaf shaped extended portions 155A and 155B which are extended from both of the opposite sides of this main plate portion 154 so as to subtend almost right angles with respect to the main plate portion 154. The projections (extensions) of this pair of extended portions 155A and 155B from the main plate portion 154 are in the same direction with respect to the main plate portion 154.

When the shutter unit 105 is to be assembled to the half housing 104A, each of these extended portions 155A and 155B is received in the connector hole 104a1 of the half housing 104A; in concrete terms, they are received in extended portions 104g (refer to FIG. 40), which are portions at which the inner side portions of the connector hole 104a1 are dilated on both opposite sides of the axial line of the connector hole 104a1. Furthermore, as shown in FIG. 42B, one of these extended portions 104g is a portion at which the connector hole 104a1 is dilated on the side of the key groove 104e, while the other one of these extended portions 104g is a portion at which the connector hole 14a1 is dilated along its side which opposes the key groove 14g. A pair of engagement claws 104f which are formed on the housing main section 104b in positions on opposite sides with respect to the axial line of the connector hole 104a1 are positioned between this pair of extended portions 104g.

Both of these extended portions 104g open into the junction end face 104i of the half housing 104A, and the shutter unit 105 can be inserted into and housed within the connector hole 104a, with both of the extended portions 155A and 155B being inserted from the side of the junction end face 104i into the extended portions 104g.

Each of the extended portions 104g is not formed by piercing the half housing 104A along the axial direction of the connector hole 104a1, but rather, in the end portion (the left side in FIG. 40) on the insertion side of the optical connector 16A into the half housing 104A, the wall portion 104j (referring to FIGS. 30B and 35, the division wall) which is provided as extending from the inner surface of the connector hole 104a1 of the half housing 104A functions as a wall portion which blocks off the deepest portion of the extended portions 104g (as seen from the junction end face 104i, the deepest side). This wall portion 104j fulfills the function of supporting the housing 17 of the optical connector 16A which has been inserted into the half housing 104A and of preventing it from shaking about. Furthermore, the key groove 104e of the half housing 104A is formed upon the wall portion 104j.

The wall portion 104j is formed on both the sides which mutually confront one another across the central axis of the connector hole 104a1, and, between this pair of wall portions 104j, a space is maintained of a shape which almost agrees with the cross sectional shape of the housing 17 of the optical connector 16A which is inserted in the half housing 104A (this space is also a portion of the connector holes 104a, 104a1). The key groove 104e into which is inserted the key 17a of the housing 17 of the optical connector 16A is formed upon one of the pair of wall portions 104j (sometimes, in the following, the explanation will be given in terms of affixing the reference symbol 104j2 to this wall portion 104j), while no key groove is formed upon the other one of the wall portions 104j (sometimes, in the following, the explanation will be given in terms of affixing the reference symbol 104J1 to this wall portion 104j). The extended portion 155A which has been stored in the extended portion 104g on the wall portion 104J1 side, the extended portion 155B which has been stored in the extended portion 104g on the wall portion 104J2 side, and the hinge fitting members 152 which are provided to these extended portions 155A and 155B are made so as not to interfere with the housing 17 of the optical connector 16A during insertion of the optical connector 16A into the half housing 14A.

As shown in FIG. 43, both ends in the axial direction of the shafts which are the hinge fitting members 152 (hereinafter these hinge fitting members 152 will sometimes be termed shafts) project on both sides of the extended portions 155A and 155B (as the projecting portions 152a), and both sides of these projecting portions 152a which oppose the extended portions 104g are inserted into shaft insertion grooves 104h which are portions which are cut into the housing main section 104bl in the form of grooves. These shaft insertion grooves 104h are formed so as to be elongated along the axial direction of the connector hole 104a1, and, when the shutter unit 105 is inserted into the connector hole 104a from the side of the junction end face 104i, its insertion is limited by the projection portions 152a of each of the shafts 152 hitting the bottommost portions of the shaft insertion grooves 104h. At this time, the projection portions 152a of the shafts 152 are stably supported by the shaft insertion grooves 104h so as not to be able to shake about. Furthermore, both the extended portions 155A and 155B of the shutter unit 105 come to contact the inner surfaces of the portions upon both the sides of the extended portions 104g which are formed within the connector hole 104a1, and are thus supported within the connector hole 104a1. The extended portions 104g also function as position determining grooves which fix the position of the shutter unit 105 as it is stored within the connector hole 104a1.

With this optical connector equipped with a shutter 100, even though the shutter unit 105 is assembled within the connector housing 104, hardly any increase in size is entailed, as compared with an optical connector adapter to which no such shutter unit 105 is assembled, and accordingly it is possible to ensure that the external size of this optical connector adapter equipped with the shutter unit 105 is almost the same as that of an optical connector adapter to which no such shutter unit 105 has been assembled. In this preferred embodiment of the present invention, a spacer 106 is housed within the connector hole 104a1 of one of the half housings 104A, so as to contact against the fixed plate portion 154 of the shutter unit 106 which has been housed within the connector hole 104a1.

The end portion 104d of the half housing 104B is made so as to contact against this spacer 106 from its side opposite to the fixed plate portion 154, and, due to this, along with the shutter unit 105 and the spacer 106 being pressed in by the half housing 104B so that they cannot come out from the connector hole 104a1, they are also stably received within the connector hole 104a so that they cannot shake about therein. It should be understood that, with respect to the spacer 106, the end portion 104d of the half housing 104B is made so as to contact against the outer peripheral portion of the end surface 106f on the side of the spacer 106 which is opposite to the fixed plate portion 154, and thereby it is ensured that no damage occurs to the mutual connection together of the optical connectors 16.

When the shutter unit 105 has been assembled within the half housing 104A, this fixed plate portion 154 of the main section 151 is disposed so as to cut across the connector hole 104a. Furthermore, the spacer 106, as well, is disposed so as to cut across the connector hole 104a. However, the connector hole 104a is connected together on both sides of the main section 151 (in detail, of the fixed plate portion 154) via a window 156 which is formed in the central portion of this fixed plate portion 154 of the main section 151, and via a window 106b which is formed by piercing through the spacer 106, so that the fixed plate portion of the main section 151 and the spacer 106 do not impede the mutual connection together of the optical connectors 16A and 16B which are inserted into the connector hole 104a from both its opposite ends and are connected together. With this optical connector equipped with a shutter 100, the tip ends of the optical connectors 16A and 16B (in concrete terms, the ferrules 19) which have been inserted into the connector hole 104a from both its opposite ends come to project in the vicinity of the wall 106d of the spacer 106 and come mutually to connect together at exactly that spot.

It should be understood that it is ensured that the window 156 of the main section 151 is of a size which is capable of passing the main section 17 of each of the optical connectors 16A. Furthermore, from the point of view of guaranteeing a good electromagnetic radiation shielding capability, it is desirable that this window 156 should be as small as possible, within the above described constraint.

This spacer 106 is a member which is formed as a single unit from a synthetic resin such as polybutylene terephthalate (PBT) or the like, and, herein, a unitarily formed member is employed which is made from an electrically conductive resin whose entire mass is made with fine particles which have an action to absorb electromagnetic radiation, such as carbon filler or the like, being dispersed therein. This spacer 106 comprises a main section 106a which is inserted and wedged within the connector hole 104a so as to cut sidewise across the connector hole 104a, and a window 106b which is formed by piercing the central portion of this main section 106a. Furthermore, in the central portion of the surface of the main section 106a of this spacer 106, on its side which is opposite to the end surface 106f, there is formed an alcove 106c into which the tip end portion of the housing 17 of the optical connector 16A is inserted. And this window 106b opens in the central portion of a wall portion 106d, which is a portion which is formed as a thin wall corresponding to the position where the alcove 106c is formed. The alcove 106c is thus connected to the window 106b, and, with respect to the window 106b, is positioned on its side which is opposite to the end surface 106f. When the optical connector 16A which has been inserted into the connector housing 104, due to the tip end portion of the housing 17 being inserted into the alcove 106c, the tip end portion of the housing 17 is supported by the spacer 106 so as not to shake about, and moreover the ferrule 19 which projects from the tip end portion of the housing 17 is fixed to a position in which it can be inserted into the window 106b.

According to the above description, here, the hinge fitting members 152 of the shutter unit 105 are shafts which are fitted to the ends of the extended portions 155A and 155B which project from the fixed plate portion 154, and, when the shutter unit 105 has been fitted within the connector hole 104$a$1 of the half housing 104, exactly, they are disposed in a direction which is almost orthogonal to the axial direction of the connector hole 104$a$ of the half housing 104. Accordingly, these shutter leaves 153A and 153B which are pivotally attached by these shafts (the hinge fitting members 152) to the main section 151 so as to be freely rotatable with respect thereto are supported so as to be freely rotatable in the same orientation as these shafts which are the hinge fitting members 152 (in the following, sometimes, these hinge fitting members 152 are also termed the shafts 152); in other words, they are supported so as to be freely rotatable about rotational axes which are almost orthogonal to the connector hole 104$a$ of the connector housing 104. These shafts 152 are held and maintained inside portions of the extended tip end portions 155A and 155B (the shaft holding portions 155$a$) which have been formed in curved tubular shapes.

It should be understood that the extended portions 155A and 155B only differ from one another by the positions in which they are projected from the fixed plate portion 154, so that, in the following, when referring to these extended portions 155A and 155B in terms of their common structure, sometimes the simple reference symbol 155 will be affixed thereto.

Figure 44:
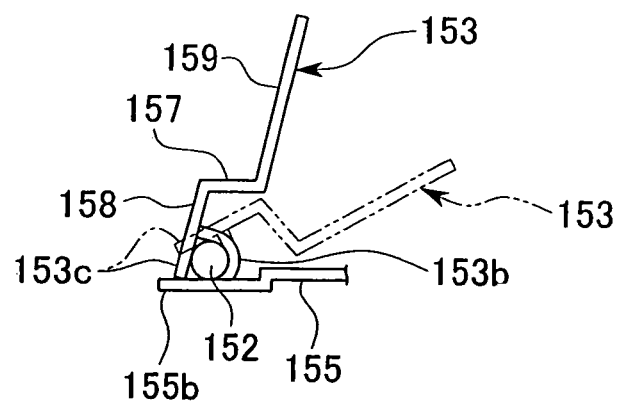
FIG. 44 is an enlarged view showing the relationship between a contacting stopper portion of a shutter leaf of the shutter unit of FIG. 43, and a stopper of an extended tip portion.
Figure 46:
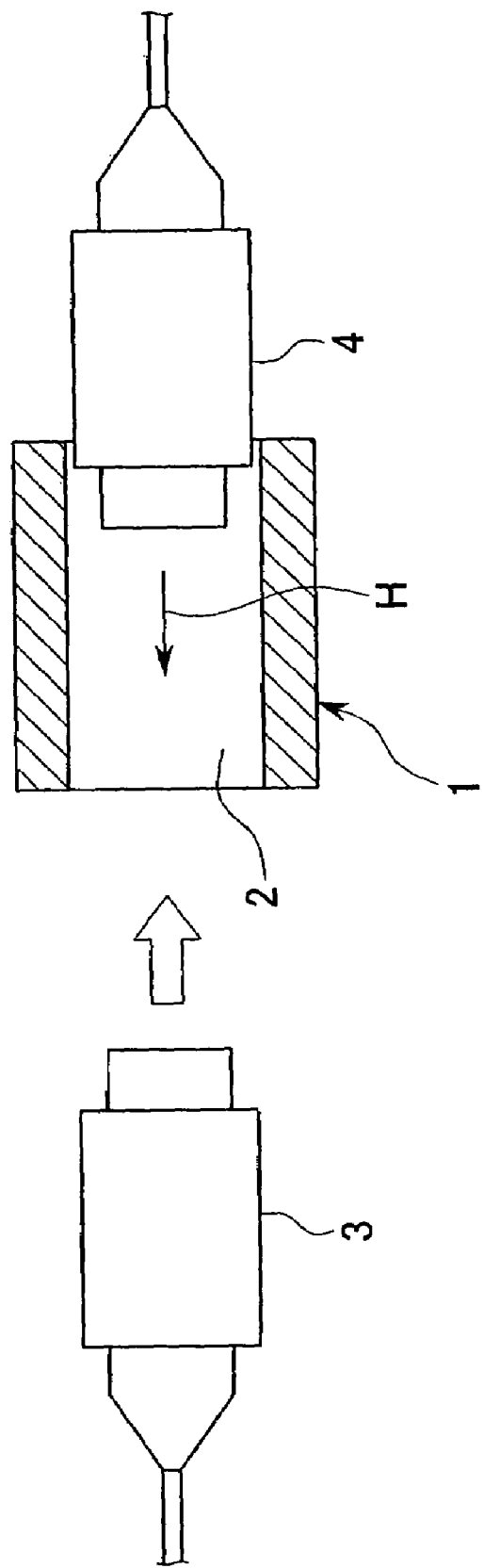
FIG. 46 is a sectional view showing the connection of two optical connector plugs via an optical connector adapter.
Figure 47:
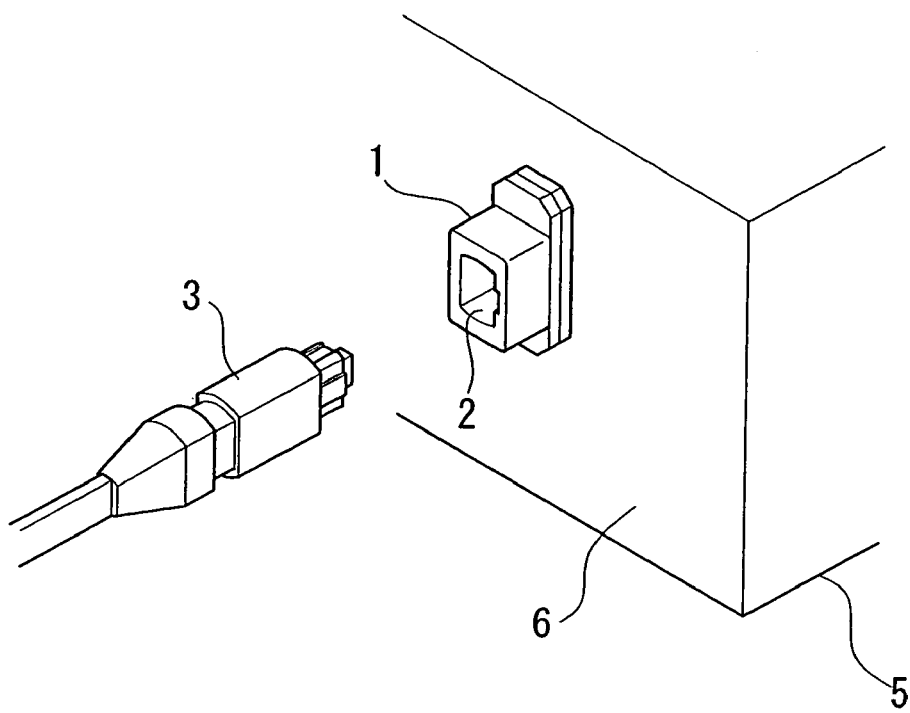
FIG. 47 is a perspective view showing the state in which an optical connector adapter is fitted to a fitting wall (a panel) of a chassis of an item of electrical equipment.
Figure 48:
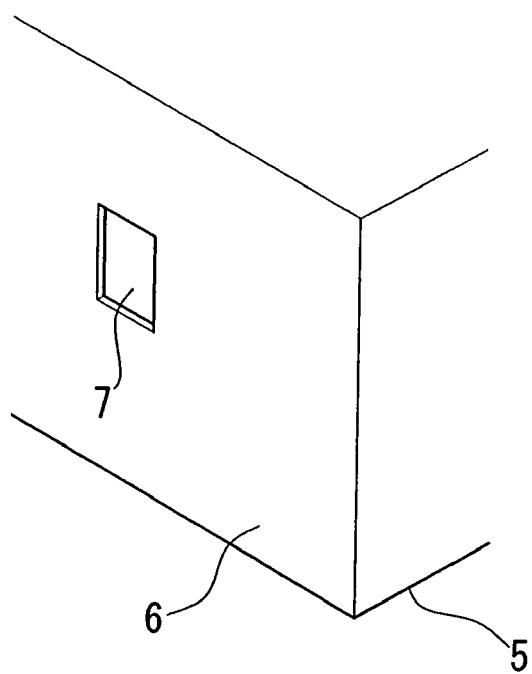
FIG. 48 is a perspective view showing the connector fitting hole which is pierced through the fitting wall of FIG. 47.
Figure 49:
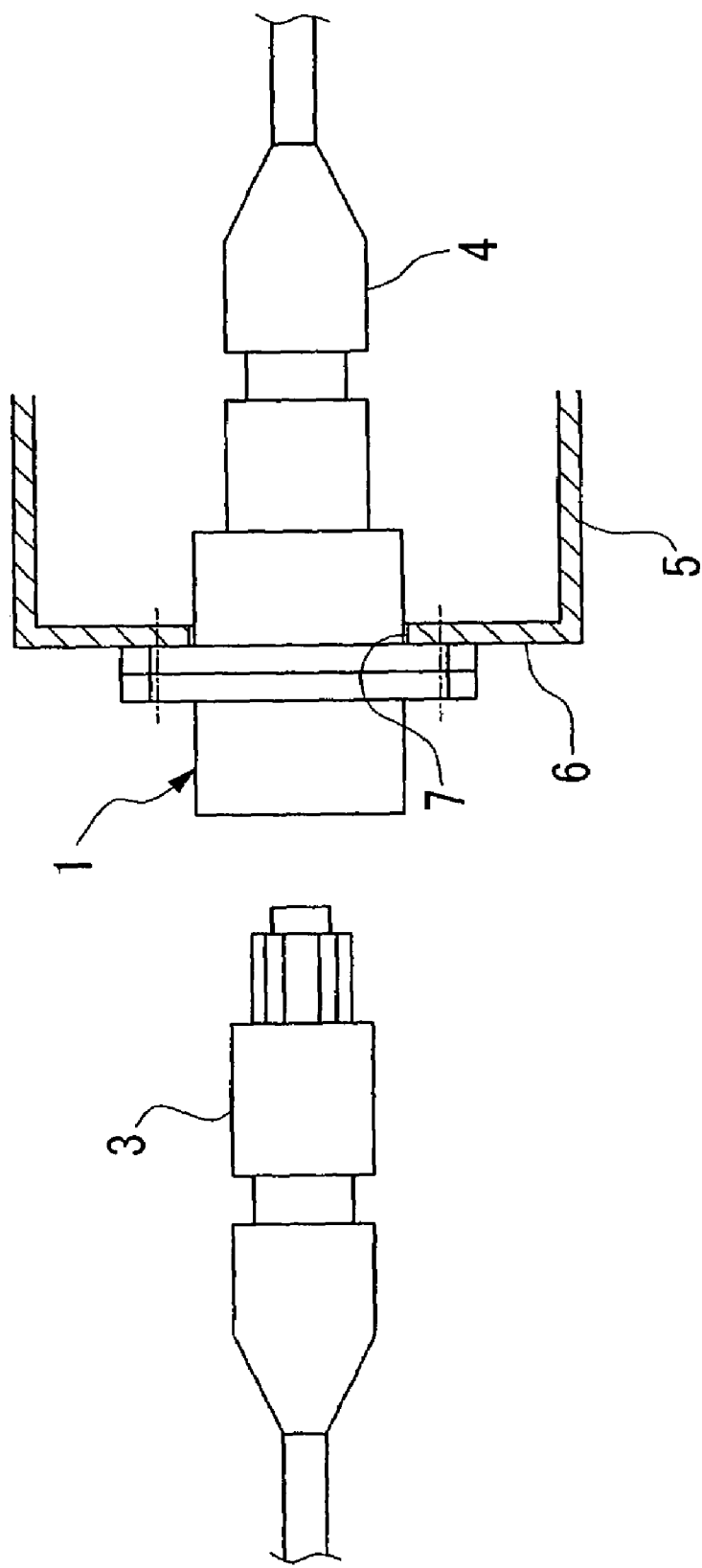
FIG. 49 is a sectional view showing the state in which the optical connector adapter of FIG. 47 is fitted to the fitting wall, and particularly shows the vicinity of the connector fitting hole.

As shown in FIGS. 43 and 44, the shutter leaves 153A and 153B are small plate leaves shaped in the form of tongue leaves which project from the main section 151 of the shutter unit 105 into the connector hole 104$a$. Each of these shutter leaves 153A and 153B is structured by making a slight alteration to the corresponding one of the shutter leaves 53 of the first preferred embodiment of the present invention which was shown by way of example above: the positions and the shapes of their shaft holding portions 153$b$ and of their contacting stopper portions 153$c$ are different from those employed in the first preferred embodiment. Furthermore, the light interception plate portions 159 of the shutter leaf 153A and of the shutter leaf 153B have different dimensions from one another. The reference symbol 159A will be appended to the light interception plate portion of the shutter leaf 153A, while the reference symbol 159B will be appended to the light interception plate portion of the shutter leaf 153B.

In the following, when referring to these shutter leaves 153A and 153B in terms of their common structure, sometimes the simple reference symbol 153 will be employed in the explanation. Furthermore, with regard to the bent portions 157 and the connector contacting portions 158, they have the same structure as in the shutter leaves 53 which were shown and described above with reference to the first preferred embodiment of the present invention, and sometimes, for the convenience of explanation, the reference symbol 157A will be appended to the bent portion of the shutter leaf 153A, the reference symbol 157B will be appended to the bent portion of the shutter leaf 153B, the reference symbol 158A will be appended to the connector contacting portion of the shutter leaf 153A, and the reference symbol 158B will be appended to the connector contacting portion of the shutter leaf 153B.

When both of the two shutter leaves 153A and 153B are in light interception positions thereof (to be described hereinafter), the edge portions 153$a$ of these shutter leaves 153A and 153B mutually overlap one another. When pressing force is applied to these shutter leaves 153A and 153B by the tip end portion 17$b$ of the housing 17 of the optical connector 16 which has been inserted in the connector hole 104$a$, they are pushed down, and when they return to retracted positions thereof (also to be described hereinafter), the mutual overlapping of their edge portions 153$a$ is cancelled at this time. When the optical connector 16 is pulled out from the connector hole 104$a$, the shutter leaves 153A and 153B return to their light interception positions, and, again, their edge portions 153$a$ mutually overlap.

As shown in FIG. 40, the shutter leaves 153 are able to change over between an attitude in which, due to rotation about their shafts 152, they are inclined at somewhat of an angle towards the side of the fixed plate portion 154 from the shafts 152 (the position of the shutter leaves 153A and 153B shown by the solid lines in FIG. 40; this position will sometimes hereinafter be termed their light interception position), and an attitude in which their extended portions 155A and 155B are almost overlapped (the position of the shutter leaves 153A and 153B shown by the double dashed lines in FIG. 40; this position will sometimes hereinafter be termed their retracted position).

However, as shown in FIG. 44, for the shutter leaf 153A, in its light interception position (i.e. its position shown in FIG. 44 by the solid lines), further rotation toward the reverse side (in other words, in the case of the shutter leaf 153A, anti-clockwise rotation in FIG. 40) with respect to the fixed plate portion 154 is prevented by the contacting stopper portion 153$c$ coming into contact against the surface of the projecting edge portion of the extended portion 155. The situation is the same for the other shutter leaf 153B as well (in other words, in the case of the shutter leaf 153B, rotation from its light interception position in the clockwise direction as seen in FIG. 40 is prevented). The projecting edge portions of the extended portions 155 from the fixed plate portion 154 function as stoppers 155$b$ which prevent rotation of the shutter leaves 153 from their light interception positions to the opposite side with respect to the fixed plate portion 154.

It should be understood that, when both of the shutter leaves 153A and 153B are in their light interception positions, since the connector hole 104$a$ is closed up over almost its entire cross sectional extent by the edge portions 153$a$ of these shutter leaves 153A and 153B mutually overlapping one another, in this state, as for example shown in FIG. 40, the light which is emitted from the optical fiber 19$a$ which is exposed at the tip end of the optical connector 16B which has been previously inserted and connected from the opening portion on one side of the connector hole 104$a$ (in detail, the junction end face 19$b$ of the tip end of the optical connector 16; this optical connector 16B will be supposed to be the connection reception side optical connector) can be prevented from escaping from the opening portion on the opposite side of the connector hole 104$a$. Furthermore, since the edge portions 153$a$ of the two shutter leaves 153 are mutually overlapped with one another in this light interception position, from the point of view of electromagnetic radiation shielding capability, an excellent capacity is obtained.

Furthermore, when the shutter leaves 153A and 153B are mutually overlapped in their light interception positions, since these shutter leaves 153A and 153B exhibit a dust interception characteristic for the connector hole 14$a$ of preventing the intrusion of dust or the like into the space which is defined in the connector hole 104$a$ between the shutter leaves 153 and the spacer 106, accordingly it is possible to prevent the inconvenience of the tip end of the connection reception side optical connector 16B (in concrete terms, the junction end face 19b of the ferrule 19) becoming dirty due to adhesion of dust or the like, and so on.

In this shutter unit 105, springs (not shown in the drawings) such as torsion springs or the like are provided as biasing members for the shutter leaves 153, like, for example, those which were shown and discussed above by way of example with respect to the first preferred embodiment of the present invention. Furthermore, it would also be possible to utilize various alternative forms of structure for these biasing members, such as forming a portion of the main section 151 of the shutter unit 105 into a spring shape, or processing portions of the shutter leaves 153 into plate spring shapes, or the like. Such biasing members should fulfill the function of biasing the shutter leaves 153 in the direction away from the fixed plate portion 154. When the shutter leaves 153A and 153B are in their light interception positions, they are pressed against the contacting stopper portions 153 by the biasing force of the springs (or other biasing members), so that they are securely held in a manner which prevents any shaking about.

With the optical connector equipped with a shutter 100 as described above, when connecting together the optical connectors 16A and 16B within the connector hole 104a of the connector housing 104, after having inserted the optical connector 16B into the connector housing 104 from the aperture portion (the right side in FIG. 40) of the half housing 104B in which the shutter unit 105 is not housed, the optical connector 16A is inserted and connected into the connector housing 104 from the aperture portion (the left side in FIG. 40) of the half housing 104A in which the shutter unit 105 is housed. According to this procedure, since light which is emitted from the tip end of the optical connector 16B which is first inserted into the connector housing 104 (in concrete terms, the light which is emitted from the optical fiber 19a which is exposed at the junction end face 19b of the tip end of the optical connector 16) is intercepted by both of the shutter leaves 153A and 153B of the shutter unit 105, and is prevented from escaping from the connector hole 104a, accordingly, during the subsequent task of insertion of the optical connector 16A into the connector hole 104a of the connector housing 104 and connection thereof to the connection reception side optical connector (the optical connector 16B), it is possible to perform this task at high efficiency, without any danger of the inconvenience that light emitted from the connection reception side optical connector might hinder the work.

Furthermore, with this optical connector equipped with a shutter 100 according to the present invention, when inserting the optical connector 16A into the connector hole 104a1 of the half housing 104A, before the junction end face 19b of the tip end of the ferrule 19 of this optical connector 16A comes into contact with the shutter leaves 153A and 153B, the connector contacting portions 158 of both of the shutter leaves 153A and 153B are pressed by the tip end portion 17b of the housing 17, and thereby both of these shutter leaves 153A and 153B are pressed down so that the amounts by which they project into the connector hole 104a1 are reduced, so that it is possible to push in the optical connector 16. The tip end portion of the housing 17 of the optical connector 16A presses down the respective connector contacting portions 158A and 158B of the shutter leaves 153A and 153B, and proceeds into the region between these shutter leaves 153A and 153B and the spacer 106, so that it is possible to proceed with the task of connection to the optical connector 16B. In this preferred embodiment of the optical connector equipped with a shutter 100 according to the present invention, as well, within the connector housing 104, the light interception plate portions 159 of the shutter leaves 153A and 153B are arranged in orientations which are positioned in locations which are shifted more forward of the pressing down direction of the shutter leaves 153 by the optical connector 16, as compared to the connector contacting portions 157, so that, during this task of connection, the junction end face 19b of the tip end of the ferrule 19 does not come into contact with either of the shutter leaves 153, and accordingly it is possible to maintain the optical characteristics of the ferrule 19 and of the optical connector 16A in a stable manner.

Furthermore, when the optical connector is taken out from the connector hole 104a, the shutter leaf 153 is returned by the biasing force of the biasing member to its position in which it can intercept any light which is emitted (i.e., to its light interception position, as described above).

Yet further, with this optical connector equipped with a shutter 100 according to the present invention, as well, since the shift amount S1 of the light interception plate portions 159 (in detail, of the confronting positions between the junction end face 19b of the ferrule 19 of the optical connector 16A with the light interception plate portions 159) with respect to the connector contacting portions 158 (in detail, the contacting positions of the housing tip end portion 17b of the optical connector 16A with the connector contacting portions 158) in the forward direction of the pressing down direction of the shutter leaves 153A and 153B by the optical connector 16 is maintained as being larger than the projection amount of the ferrule 19 from the housing tip end portion 17a of the optical connector 16A, accordingly a structure is possible such that the pressing down of the shutter leaves 153A and 153B by the housing tip end portion 17a of the optical connector 16A pressing upon these shutter leaves 153A and 153B starts at a more deeply inserted point of insertion of the optical connector 16A into the connector housing 104, as compared to a hypothetical case in which the shifting amount S1 was less than the projection amount S2; and, thereby, there is the beneficial aspect that it is possible to enhance the dust interception characteristic of the connector hole 104a. Moreover, when due to the insertion of the optical connector 16A into the half housing 104A the shutter leaves 153A and 153B have been rotationally displaced as far as positions in which they no longer can intercept the light which is emitted from the tip end of the connection reception side optical connector 16B, since at this time point the tip end of the optical connector 16A has arrived at a position which is close to the connection reception side optical connector 16B, in the same manner as with the first preferred embodiment of the present invention described above, there is the beneficial aspect that the light which is emitted from the tip end of the connection reception side optical connector at this time can be reliably intercepted by the optical connector 16A itself, so that it is possible reliably to prevent the escape of emitted light from the connector hole 104a, even part way through the task of inserting and connecting the optical connector 16A to the connector housing 104.

-Regarding the Electromagnetic Shielding of the Connector Fitting Hole-

With the optical connector 10 equipped with a shutter of this preferred embodiment of the present invention, by employing elements which are endowed with electrical conductivity for the connector housing 104 and the spacer 106, when fitting it, for example, to the fitting wall 12 of a chassis 11 as shown by way of example in FIGS. 23 through 25, it is possible to ensure good electromagnetic radiation shielding capacity for the connector fitting hole 13. Although, in this preferred embodiment of the present invention, the use has been suggested of elements which have been made from a synthetic resin material which incorporates minute particles dispersed therein for the connector housing 104 and the spacer 106, in order to endow them with such an electromagnetic radiation shielding function, this is not intended to be limitative of the present invention; for example, it would also be possible to employ, for example, elements which incorporated an electrically conductive paint layer which was formed by painting a paint material which was electrically conductive (for example, a paste or the like into which was mixed magnetic metal particles which had an action of absorbing electromagnetic radiation) upon a substrate which was made from a synthetic resin or the like, or elements upon which were fixed electrically conductive cloth layers which were made from electrically conductive fibers (metallic fibers or the like), etc. Furthermore, such fine particles having an action of absorbing electromagnetic radiation are not limited to being carbon filler; it would also be possible to employ various other types of material.

With the optical connector 100 equipped with a shutter of this preferred embodiment of the present invention, in particular, the spacer 106 effectively and reliably contributes an electromagnetic radiation shielding capability to the connector fitting hole 13. This spacer 106 comes to close the connector hole 104a over almost its entire cross sectional shape, and, when this optical connector 100 equipped with a shutter is inserted into the connector fitting hole 13 of the fitting wall 12, and is assembled to the fitting wall 12, the connector fitting hole 13 is similarly closed over almost its entire cross sectional shape. And, due to the provision of the connector housing 104 which is in contact with the spacer 106 and is capable of conducting electricity thereto and of the connection circuit which is provided to the connector housing 104 and so on, it is ensured that the spacer 106 is effectively grounded, so that it is possible for the spacer 106 to function efficiently as a member for electromagnetic radiation shielding, and thereby it is possible to ensure a good electromagnetic radiation shielding capability for the connector hole 13.

Furthermore, with this optical connector 100 equipped with a shutter, since it is possible to make the connector housing 104 as well function as a member which is endowed with an electromagnetic radiation shielding function, finally, it is possible to close off almost the entire portion of the connector fitting hole 13 with a member which is endowed with an electromagnetic radiation shielding function, except for the portion of the window 106b which is hardly any larger than the outer shape of the ferrule 19, so that an excellent electromagnetic radiation shielding capability is obtained. In other words, when this optical connector 100 equipped with a shutter is fitted to the fitting wall, the connector fitting hole of the fitting wall is put into the state of being closed off by this optical connector 100 equipped with a shutter with hardly any gap being left. Furthermore, with this optical connector 100 equipped with a shutter, it is possible to obtain a better electromagnetic radiation shielding function by utilizing a member which is electrically conductive for the shutter unit 105 as well.

As shown in FIG. 40, on the exterior of the connector half 104B, there is formed a shallow groove 104p for attaching and fixing a shield cover 20A which is formed in the same manner as in the first preferred embodiment of the present invention described above. Accordingly, by fitting the shield cover 20A to the connector half 104B by engaging it into this shallow groove 104p, the fitting of this optical connector equipped with a shutter 100 to the fitting wall 12 can be simply performed by pushing it into the connector fitting hole 13 in the fitting wall 12, and moreover it is also thereby possible easily and reliably to implement grounding of the connector housing 104 and of the spacer 106.

It is possible to make a contribution to reduction of the cost of this optical connector 100 equipped with a shutter, provided that the construction is one which ensures grounding of the spacer 106 via the connector housing 104, since there is no requirement to provide any special connection circuit or the like to this optical connector 100 equipped with a shutter. Furthermore, by providing the shutter unit 105 with the contact for conducting electricity which projects to the outside of the connector housing 104, it is also possible to endow the shutter unit 105 with the function of operating as a connecting circuit for grounding the shutter unit 105.

It should be understood that the present invention is not to be considered as being limited by the above described preferred embodiment thereof; various modifications of the form and the content of any preferred embodiment are possible.

For example, the concrete structure of the shutter unit is not to be considered as being limited by that of the above described preferred embodiment; various modifications in the details thereof are possible, as appropriate.

Furthermore although by way of example the case was shown, for this preferred embodiment of the optical connector equipped with a shutter according to the present invention, in which it was applied to an optical connector adapted which was used for connecting together two optical connector plugs of an MPO type optical connector, the present invention should not be considered as being limited to this application; it can be applied to an optical connector adapted which is used for connecting together two optical connector plugs which are of a type other than the MPO type. Furthermore, the present invention should not be considered as being limited in its application to an optical connector adapter; for example, it could also be applied to various other types of optical connector having a connector hole into which an optical connector plug is inserted and connected, such as, for example, an optical connector receptacle or the like.

It should not be considered that the present invention is limited to the disclosed structure for ensuring the grounding of the shutter unit and the spacer, in which the shutter unit is connected to the fitting wall in an electrically conductive manner so that the fitting wall functions as a grounding member; in fact, various other types of structure might be employed to the same end: for example a separately provided wire might be provided for grounding the shutter unit, or the like.

As the device which offers the fitting wall to which this optical connector equipped with a shutter is fitted, the present invention is not to be considered as being limited to the case of a chassis of an item of electronic equipment; various other types of structure are also possible. For example, this optical connector equipped with a shutter might also be fitted to a panel or the like for fitting an optical connector such as an optical connector adapter or the like, in a rack such as an optical distribution board or the like.

Moreover, various types of structure other that the shafts described above might be employed as hinge fitting members for pivotally attaching the shutter leaves to the main section of the shutter unit. Furthermore, as the means for linking together the main section of the shutter unit and the shutter leaves, the present invention is not to be considered as being limited to the use of shafts. It would also be possible to employ various other types of structure, such as, for example, members which could be resiliently deformed by pressing force from the optical connector, or the like.

Since, as has been explained above, according to the optical connector equipped with a shutter according to the present invention, it is possible to intercept light which is emitted from the connection reception side optical connector with the shutter unit, accordingly it is possible to perform the task of connecting another optical connector to this connection reception side optical connector at high efficiency. Furthermore, since during the task of connecting such an optical connector the tip end portion of the ferrule of the optical connector does not come into contact with the shutter leaves of the shutter unit, thereby it is possible reliably to prevent the inconvenience of damage to this tip end portion of the ferrule, and accordingly it is possible stably to maintain the optical characteristic of the optical connector. Yet further, it is possible stably to maintain the optical characteristic of the connector over a long period of time, even if the optical connector is repeatedly attached and detached, since no negative influence is exerted upon the optical characteristic of the optical connector by such attachment and detachment.

Next, a yet further preferred embodiment of the present invention will be described with reference to the figures.

Figure 52:
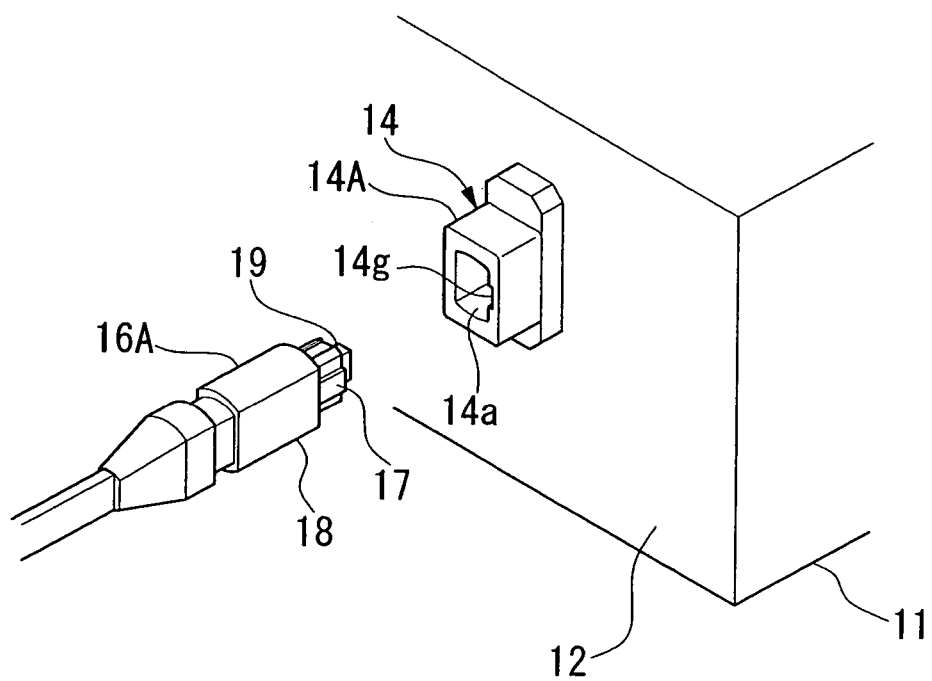
FIG. 52 is a perspective view of the fitting state of FIG. 51 as seen from the exterior of the chassis.
Figure 53:
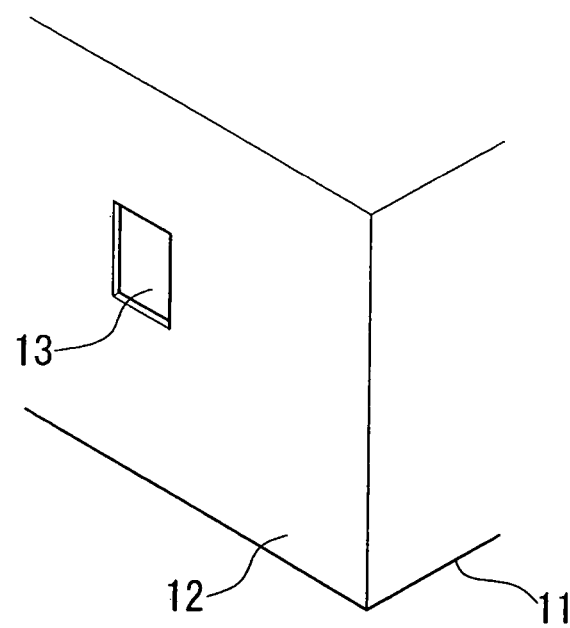
FIG. 53 is a perspective view showing the connector fitting hole which has been pierced through the fitting wall.
Figure 54:
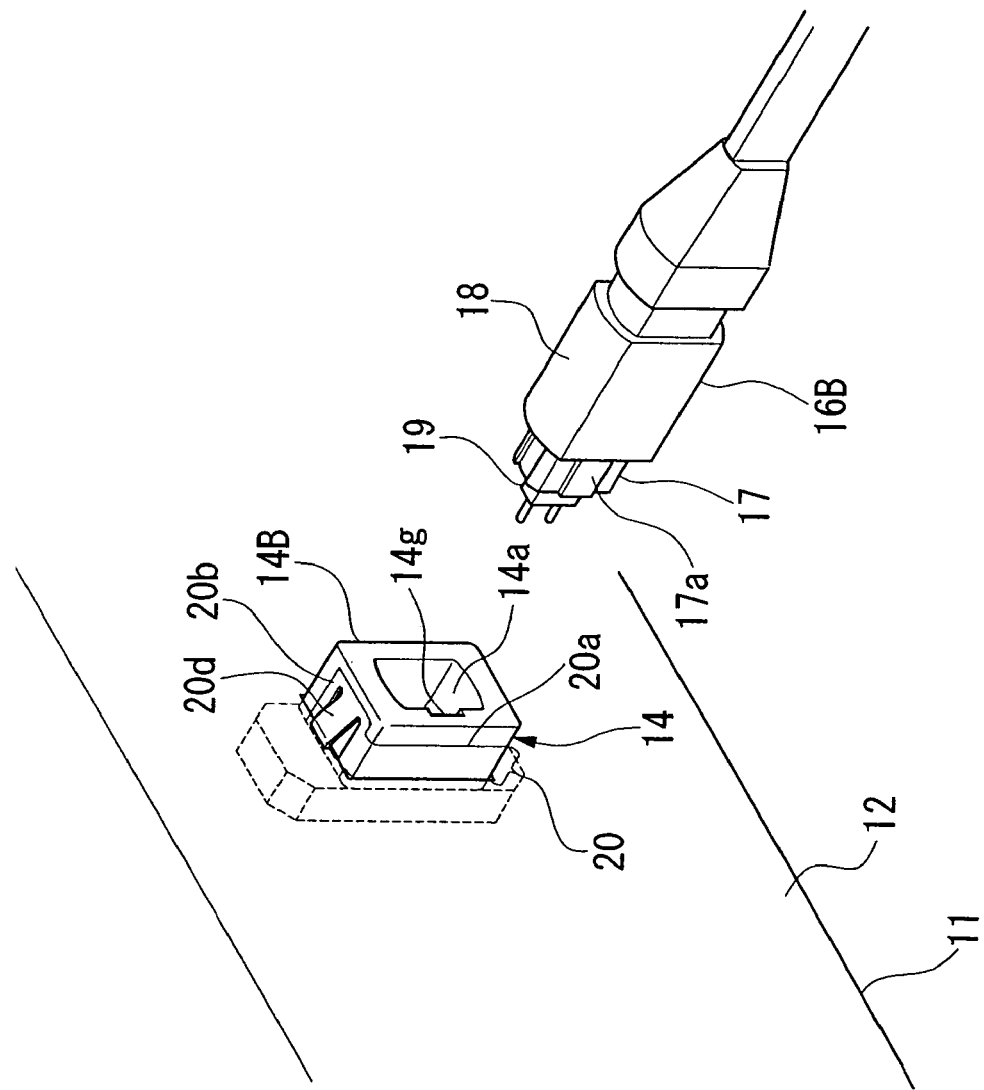
FIG. 54 is a perspective view of the fitting state of FIG. 51 as seen from the interior of the chassis.
Figure 55:
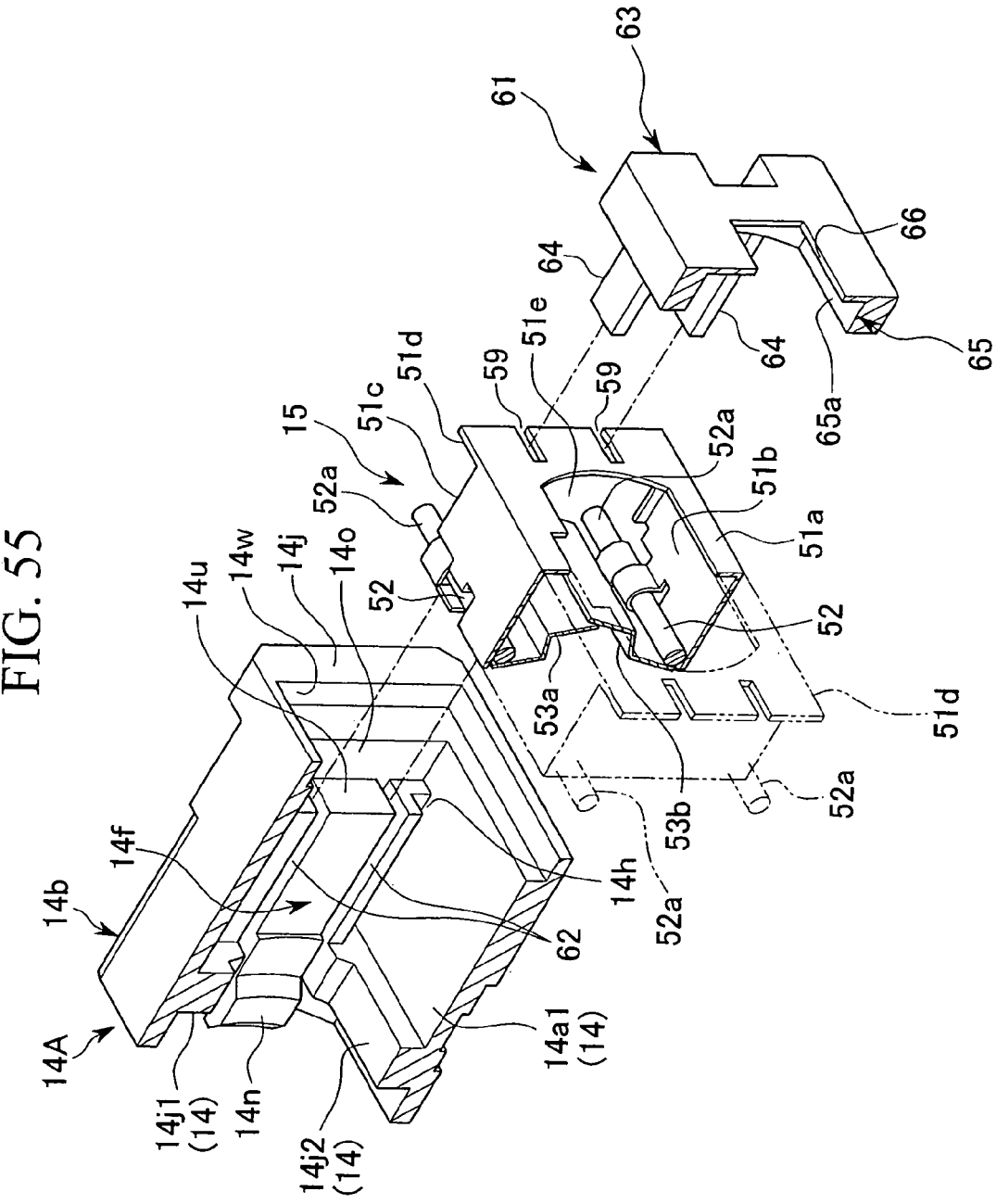
FIG. 55 is a sectional perspective view showing the structure of the optical connector equipped with a shutter of FIG. 50.
Figure 56:
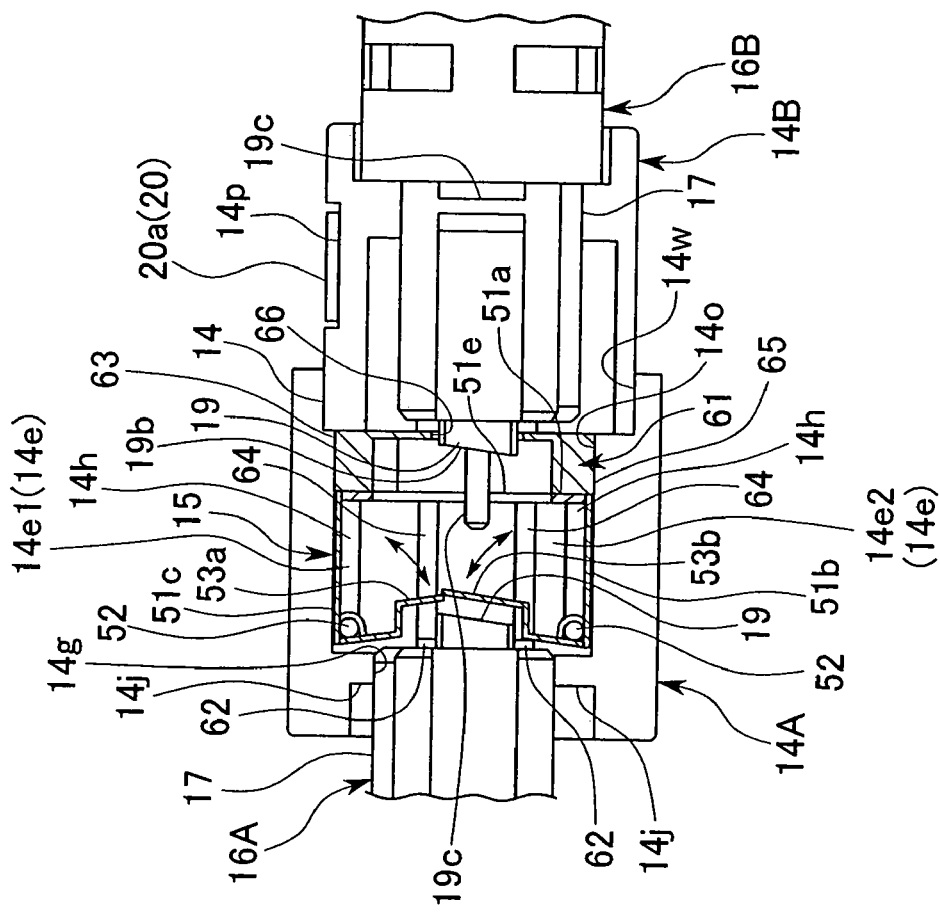
FIG. 56 is an overall sectional view showing the optical connector equipped with a shutter of FIG. 50.
Figure 57:
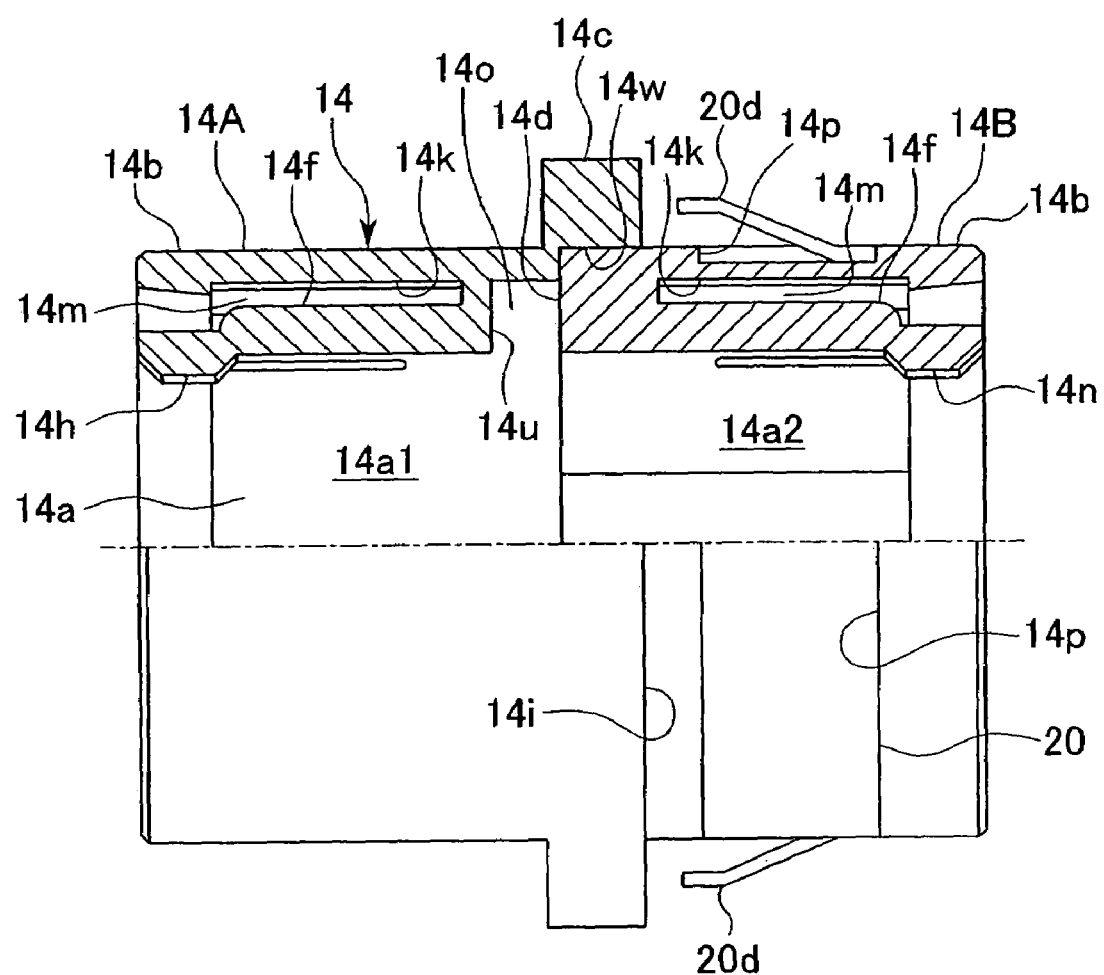
FIG. 57 is a partly cut away sectional view showing the optical connector equipped with a shutter of FIG. 50.
Figure 58A:
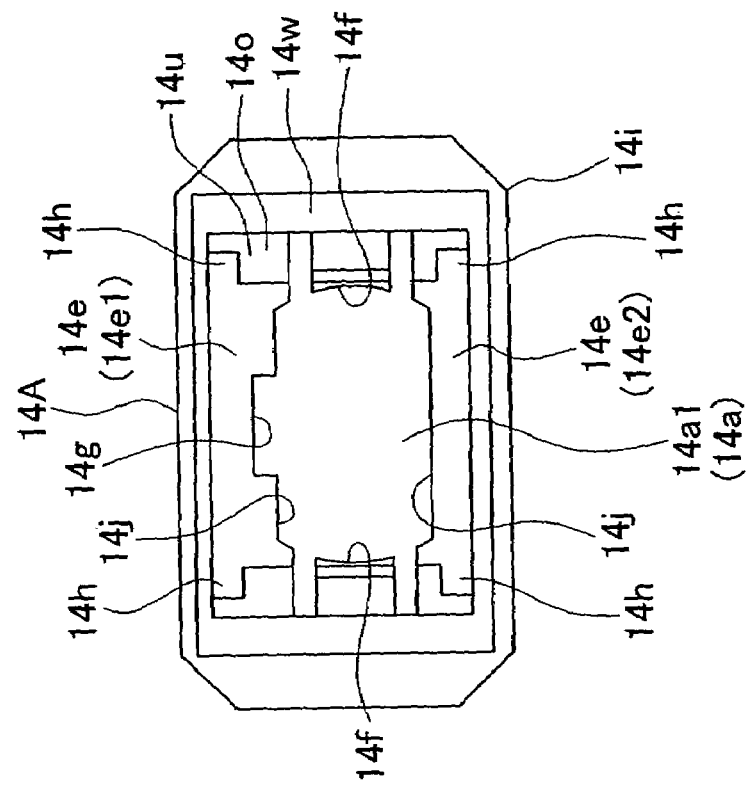
FIGS. 58A and 58B are sectional views showing junction end faces of two halves of the connector of FIG. 50.
Figure 58B:
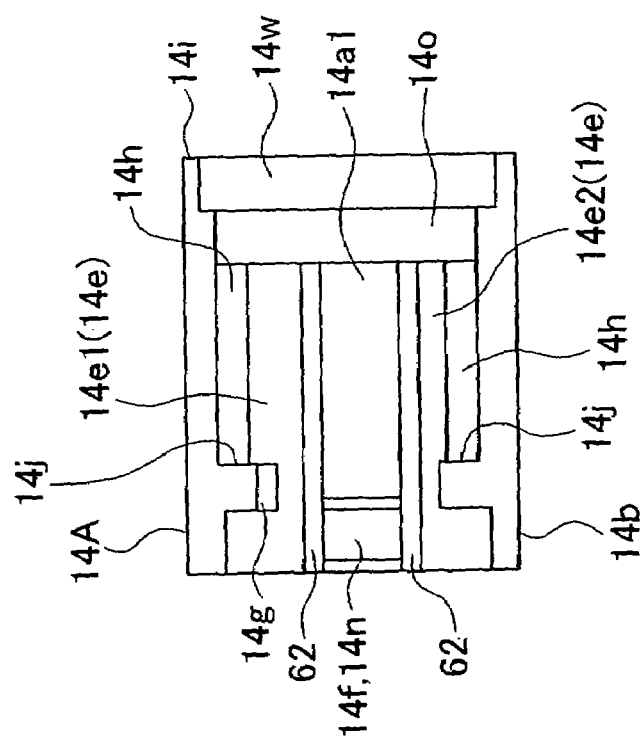
Figure 59:
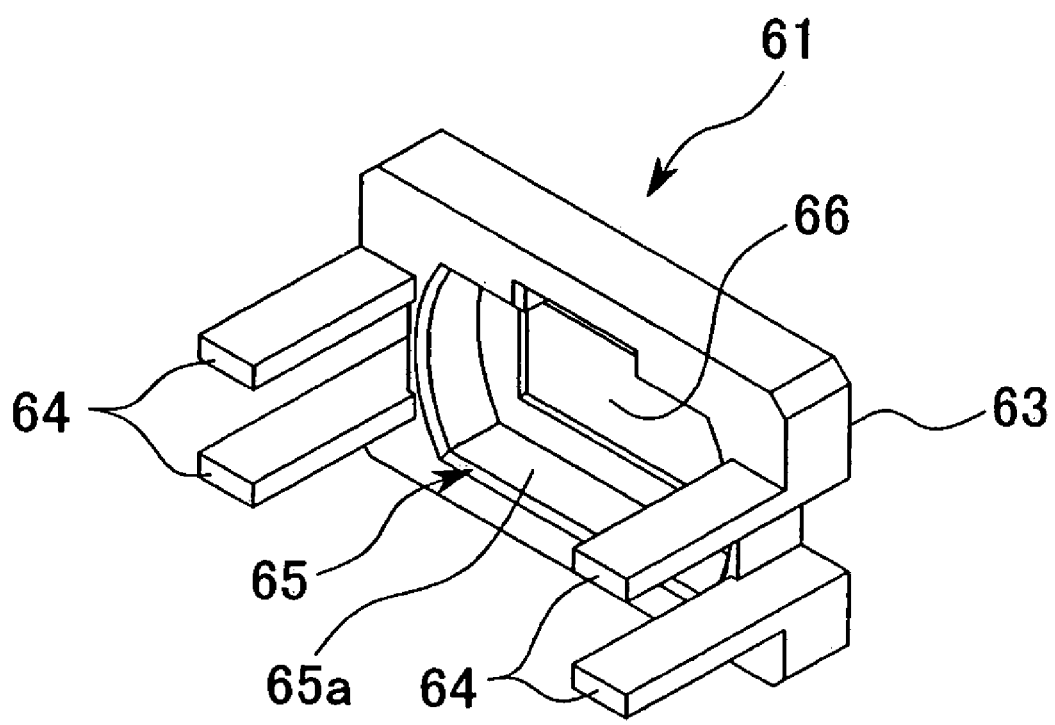
FIG. 59 is an external perspective view showing an inner piece of the optical connector equipped with a shutter of the present invention.
Figure 60A:
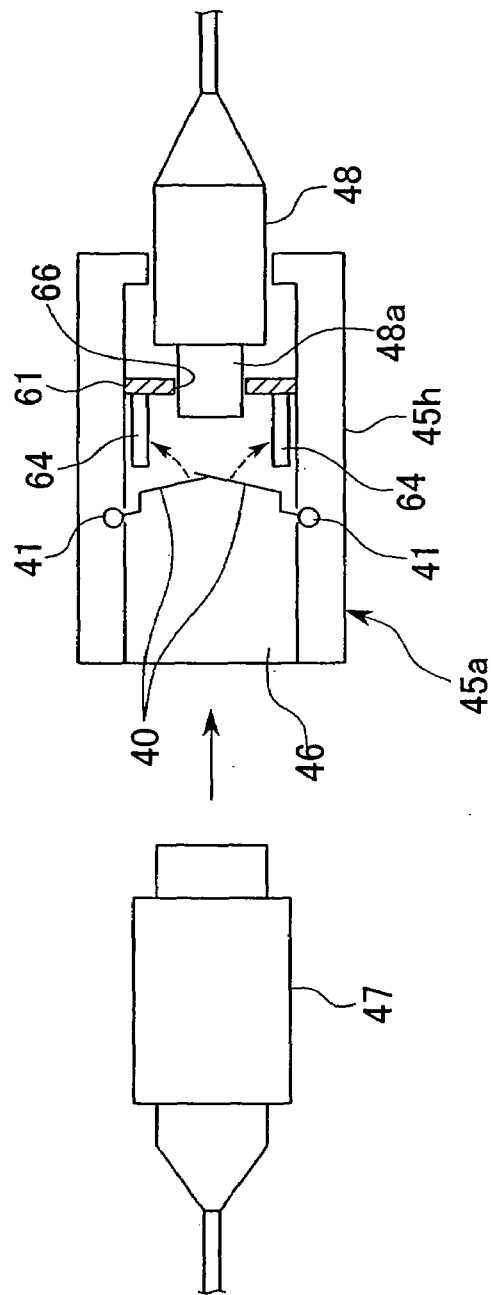
Figure 60B:
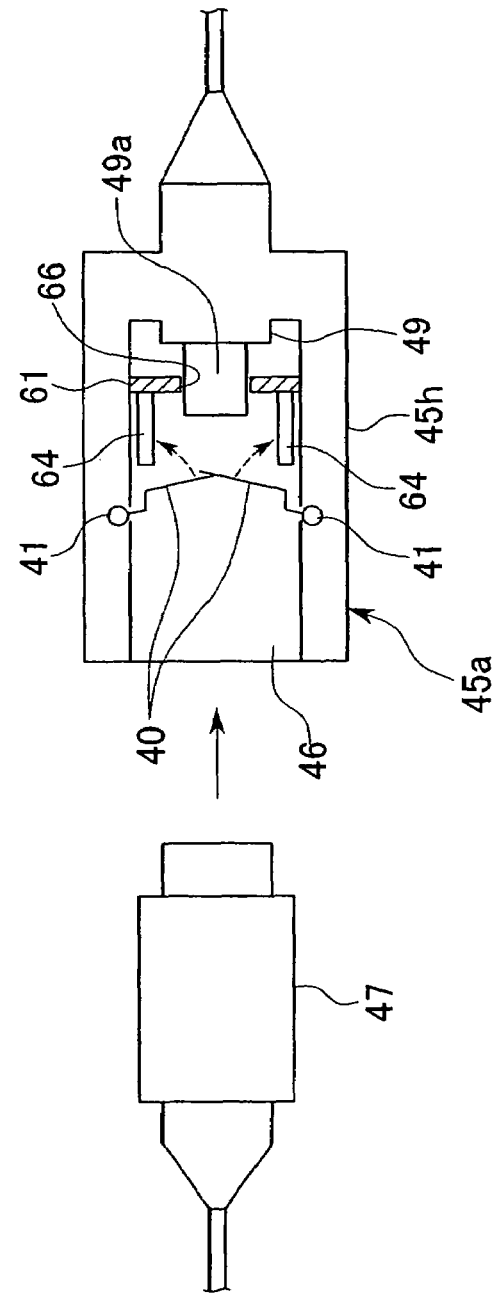
FIG. 60B shows a structure in which the connection reception side optical connector is formed integrally with the connector housing.
Figure 61:
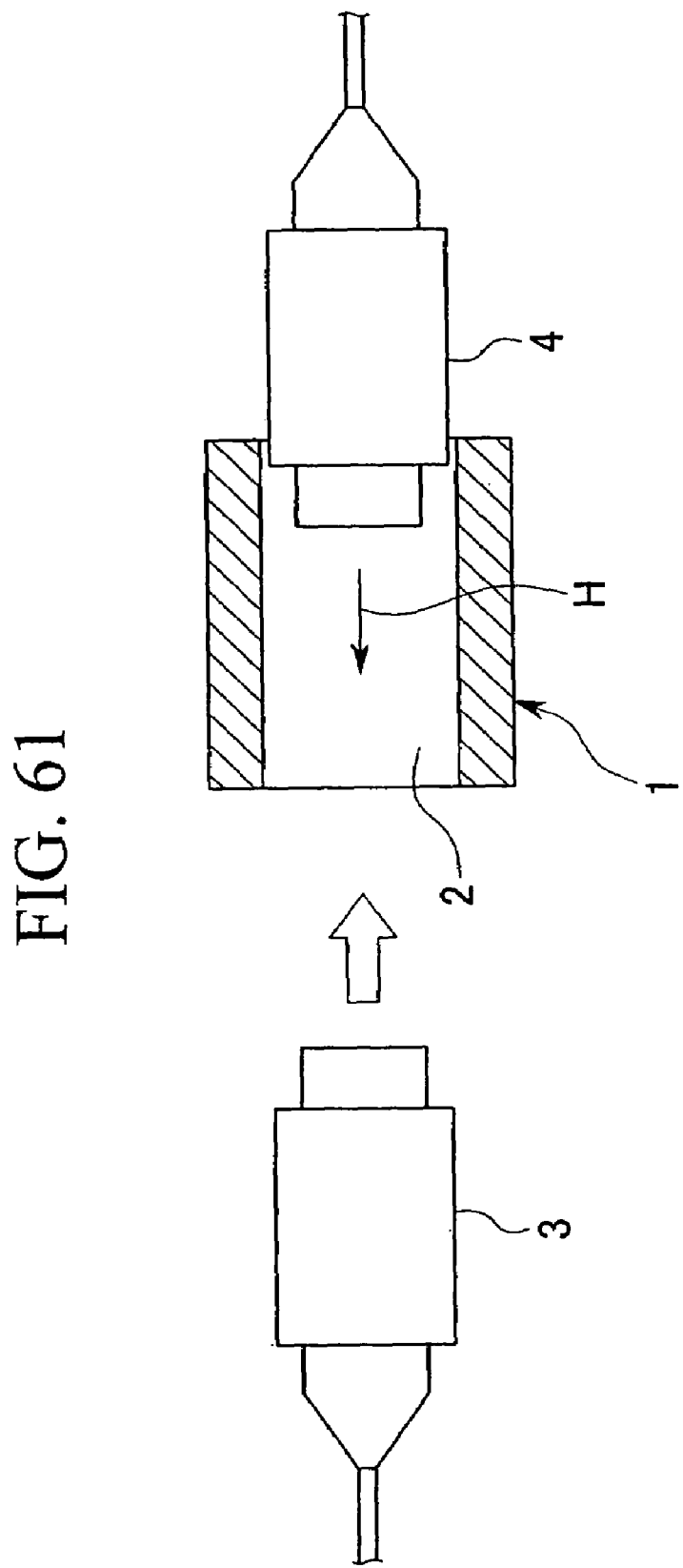
FIG. 61 is a sectional view showing the connection of two optical connector plugs via an optical connector adapter.
Figure 62:
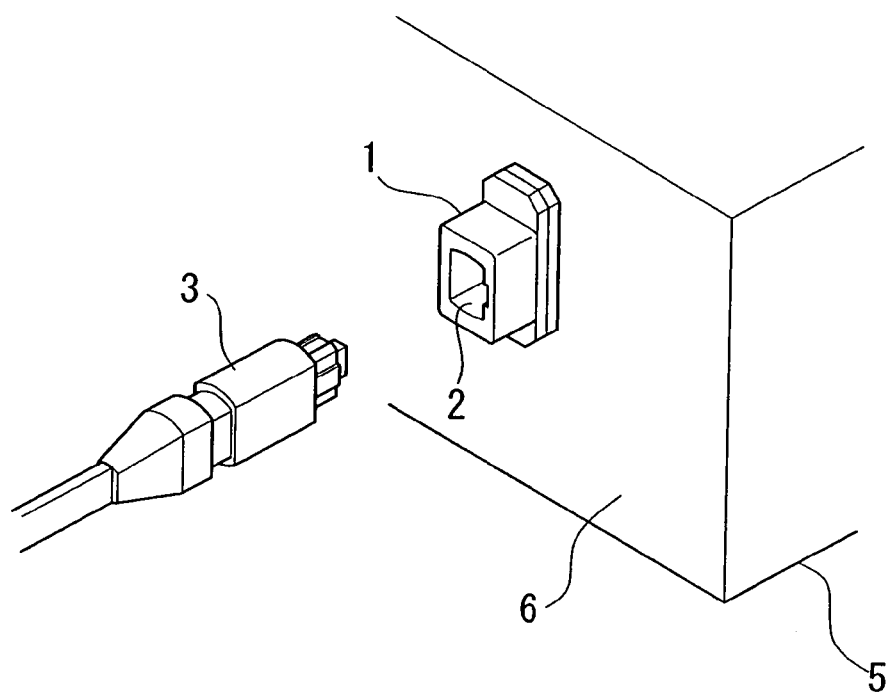
FIG. 62 is a perspective view showing the state in which an optical connector adapter is fitted to a fitting wall (a panel) of a chassis of an item of electrical equipment.
Figure 63:
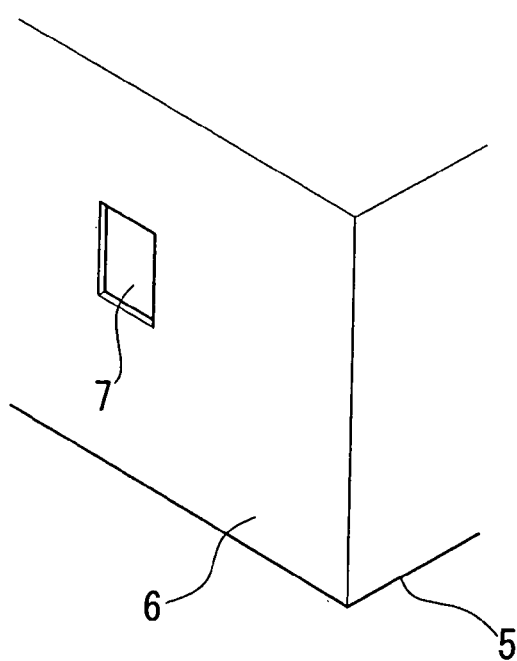
FIG. 63 is a perspective view showing the connector fitting hole which is pierced through the fitting wall of FIG. 62.
Figure 64:
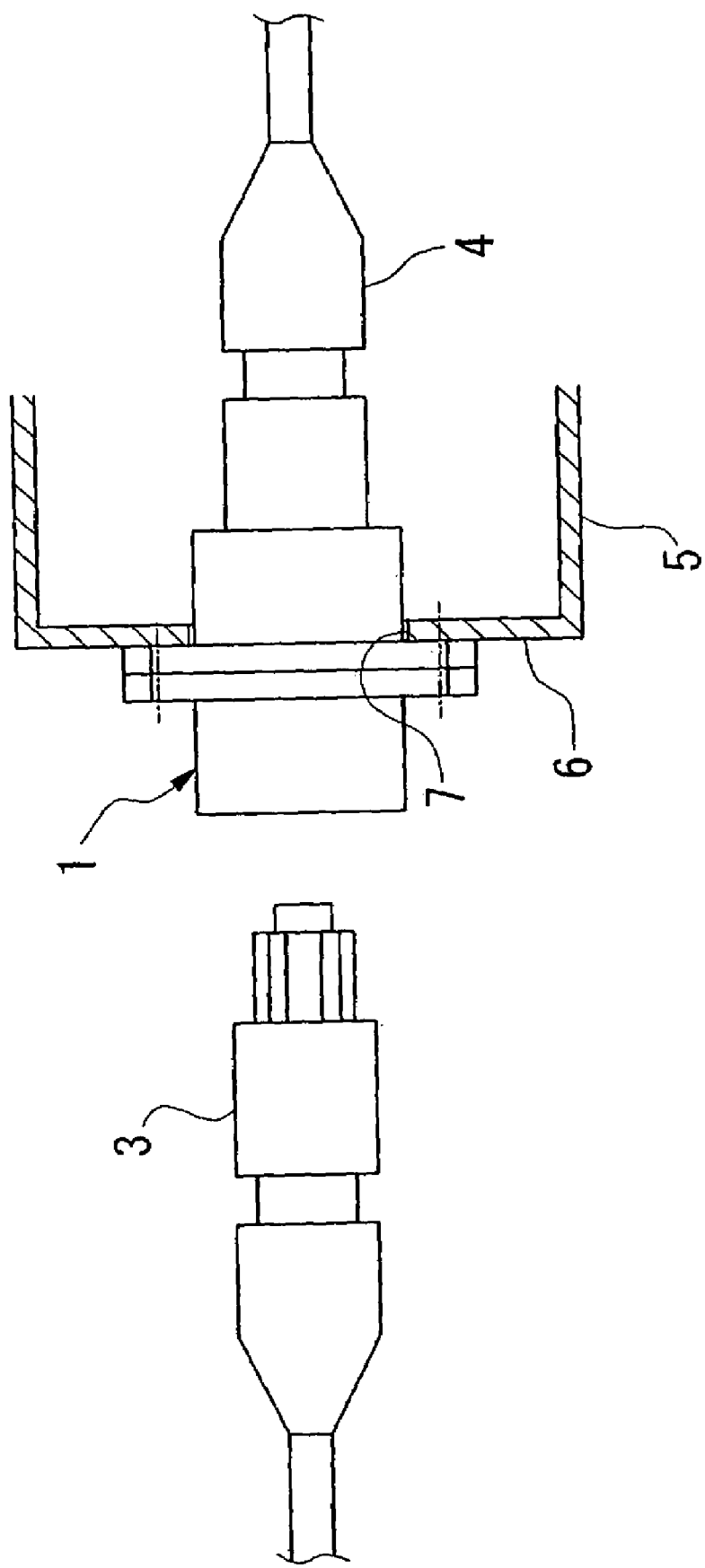
FIG. 64 is a sectional view showing the state in which the optical connector adapter of FIG. 62 is fitted to the fitting wall, and particularly shows the vicinity of the connector fitting hole.

FIGS. 50A through 50D are various views showing the external structure of another preferred embodiment of the optical connector equipped with a shutter according to the present invention; FIG. 51 is a sectional view showing the state in which this optical connector equipped with a shutter 100 of FIG. 50 is fitted to a fitting wall 12 of a chassis 11 of an item of electronic equipment, and particularly shows the vicinity of a connector fitting hole 13 in the fitting wall; FIG. 52 is a perspective view of the optical connector equipped with a shutter 100 in its fitting state of FIG. 51 to the fitting wall 12, as seen from the exterior of the chassis 11; FIG. 53 is a perspective view showing the connector fitting hole 13 which has been pierced through the fitting wall 12; FIG. 54 is a perspective view of the optical connector equipped with a shutter 100 in its fitting state of FIG. 51 to the fitting wall 12, as seen from the interior of the chassis 11; FIG. 55 is a perspective view showing the structure of the shutter unit 15 of the optical connector equipped with a shutter 100; FIG. 56 is an overall sectional view showing the optical connector equipped with a shutter according to the present invention; FIG. 57 is a partly cut away sectional view showing the optical connector equipped with a shutter 100 of FIG. 50; FIGS. 58A and 58B are sectional views showing the junction end faces of two halves of the connector of FIG. 50; and FIG. 59 is an external perspective view showing an inner piece which is fitted to the optical connector equipped with a shutter 100 of the present invention.

As shown in FIG. 55, this optical connector equipped with a shutter 10 has a structure in which a shutter unit 15 and an inner piece 61 are assembled into the interior of a connector housing 14 to constitute an optical connector adapter.

Referring to FIGS. 50A through 50D, this connector housing 14 is an optical connector adapter for an optical connector of the MPO type (MPO: Multi-fiber Push On, for example as specified by JIS C5982, IEC 1754-7). This connector housing 14 is entirely made from a synthetic resin material such as for example plastic or the like, and is formed in a roughly sleeve shaped structure having a connector hole 14a pierced through its interior. And this connector housing 14 is made by joining together a pair of half housings 14A and 14B and assembling them into a unit.

Each of the half housings 14A and 14B is a unitarily formed member which is formed from a synthetic resin compound such as, for example, a plastic or the like, and the connector housing 14 is assembled by joining the pair of sleeve shaped half housings 14A and 14B together in direct series along their axial direction and unifying them into one, so that, by this process, the connector hole 14a1 which pierces through the interior of the half housing 14A and the connector hole 14a2 which pierces through the interior of the half housing 14B are communicated together, thus constituting the connector hole 14a of the connector housing 14.

As shown in FIGS. 55 and 56, an alcove 14w is formed in one half housing 14A among the pair of half housings 14A and 14B, in a shape which is depressed from the end surface 14i of one of the end portions thereof in its axial direction (this axial direction is the axial direction of the connector hole 14a; here, this end portion in the axial direction is the end portion on the side which is joined to the half housing 14B), while an end portion 14d in one axial direction (this axial direction is the axial direction of the connector hole 14a; here, this end portion in the axial direction is the end portion on the side which is joined to the half housing 14A) of the other half housing 14B is engaged with, and is joined to and unified with, this alcove 14w of the half housing 14A. Furthermore, according to requirements, they are fixed together by the use of adhesive material or screws or the like. It should be understood that the structure for joining together the pair of half housings 14A and 14B and connecting them into one unit is not to be considered as being limited to the means which are employed for engagement with the alcove 14w; it would be possible to utilize various types of structure and method for this purpose, such as, for example, screw fixing (the screws themselves may fulfill the function of determining the relative mutual position of the two half housings), or position determination by the use of a jig or the like and then attachment together with heat welding or by gluing using an adhesive material, or the like.

Figure 50A:
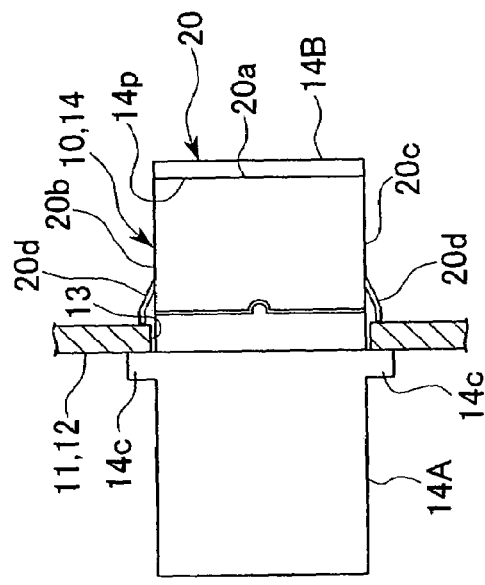
FIG. 50A is a plan view thereof.
Figure 50D:
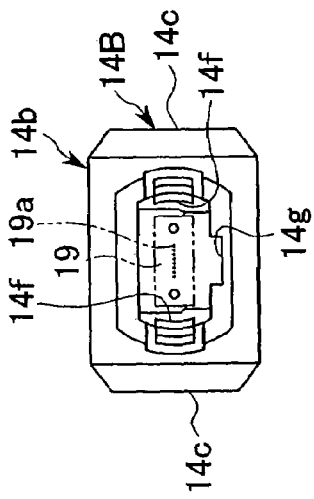
FIG. 50D is a right side view thereof.
Figure 50C:
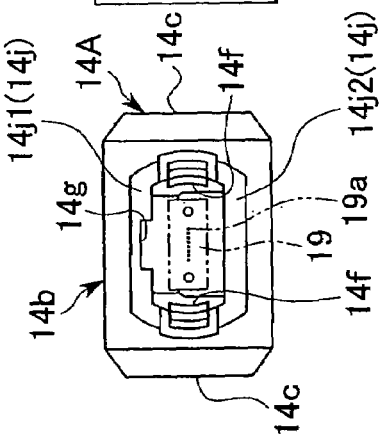
FIG. 50C is a front view thereof.
Figure 50B:
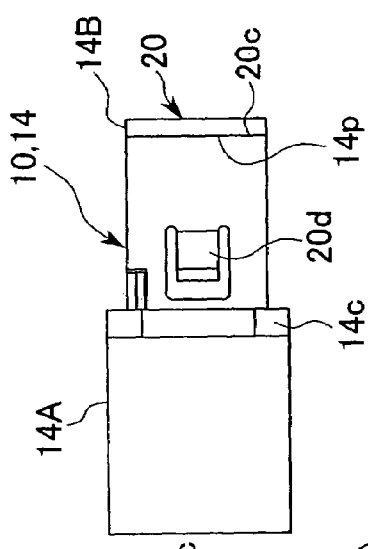
FIG. 50B is a left side view thereof.

Referring to FIGS. 50B and 50D and so on, the reference symbols 14f denote engagement claws (elastic claws) within the connector housing 14, and these (refer to FIGS. 52 and 54; here, an optical connector plug (for example, one as specified by JIS C 5982 or IEC 1754-7) of an optical connector of the MPO type; in the following, this will sometimes be referred to simply by the reference symbol 16, if explaining its structure in common with that of the optical connectors 16A and 16B) are engaged so as to be attachable to and detachable from engagement portions (engagement alcoves or the like, not shown in the drawings) which are formed on the side portions of the sleeve shaped housing 17 of the optical connectors 16A and 16B which are inserted and connected into the connector housing 14. Here, the optical connector denoted by the reference symbol 16B is an optical connector which functions as an optical connector on the connection reception side (hereinafter sometimes also referred to as the connection reception side optical connector 16B), while the optical connector denoted by the reference symbol 16A is an optical connector which functions as an optical connector to be connected to this connection reception side optical connector 16B. It should be understood that the guide pins 19c for determining the mutual position of the optical connector plugs 16A and 16B when connecting them together are assembled to a ferrule 19 of the connection reception side optical connector 16B, and project from a junction end face 19b of this ferrule 19.

Although in this preferred embodiment of the present invention, by way of example, optical connector plugs which are multi-connection type MPO type optical connectors have been shown as the optical connectors, as an MPO type optical connector plug which can be used here, a single connection type would also be acceptable. Moreover, it should also be understood that the optical connector (optical connector plug) according to the present invention is not to be considered as being limited to the above described case of an MPO type optical connector (optical connector plug); it would also be possible to utilize various other types of multi-connection type or single connection type optical connectors.

As shown in FIG. 57, these engagement claws 14f are formed integrally with the housing main sections 14b of the half housings 14A and 14B, and they project to the insides of the connector hole 14a within the sleeve shaped housing main body 14b. The engagement claws 14f of the half housings 14A and 14B face from the sides of the one end portions in the axial direction of the connector halves 14A and 14B towards the aperture portion sides on both ends in the axial direction of the connector hole 14a, and are made so as to extend along the inner surface of the housing main section 14b. Furthermore, an approximate clearance 14m is maintained between the portions of these engagement claws 14f which extend along the inner surface of the housing main section 14b, and the inner surface 14k of the housing main section 14b. It should be understood that FIG. 57 is a sectional view showing the state of the connector housing 14 in which the shutter unit 15 and the inner piece 61 are not fitted therein.

As shown in FIGS. 55 and 58, grooves (long grooves) 62 are formed on both sides of the engagement claws 14f of the half housing 14A, and these grooves 62 allow the engagement claws 14f to be free to flex with respect to the main section 14b of the half housing 14A. These grooves 62 extend from the other portion in the axial direction of the connector half 14A (the side opposite to the one end portion in the axial direction; the insertion aperture side for the optical connector 16A; the left side in FIG. 58A) to an inner housing alcove 14o which is shaped as a depression excavated from the alcove 14w on the side of the end portion which is joined to the connector half 14B, and they are formed so as to be cut in straight lines along the main section 14b of the half housing 14A. This inner housing alcove 14o is formed by dilating the one end portion in the axial direction of the connector hole 14a within the half housing 14A (however, more to the other end portion side in the axial direction than the alcove 14w), and, although the alcove 14w is also formed by dilating the one end portion in the axial direction of the connector hole 14a1 within the half housing 14A, this inner housing alcove 14o is somewhat smaller in cross sectional dimensions (i.e., in its cross sectional dimensions in the direction orthogonal to the axial direction of the connector 14a) as compared with the alcove 14w (the inner housing alcove 14o is a portion of the connector holes 14a, 14a1). Furthermore, as shown in FIGS. 55 and 58B, the grooves 62 on both sides (the upper and lower sides in FIGS. 55 and 58B) of the engagement claws 14f which are each formed on both sides of the connector hole 14a1, in other words the end portions of the total of four of these grooves 62 which open to the inner housing alcove 14o, are in positions which are exposed when the connector half 14A is seen in its axial direction from the side of the end surface 14i of its one end portion. These four grooves 62 are connected with the connector hole 14a1 over their entire lengths. It should be understood that, although the engagement claws 14f include base end portions which project from the main section 14b, overall they are formed so as not to project into the inner housing alcove 14o.

The optical connector 16, which is an optical connector plug of the MPO optical connector type, and the two half housings 14A and 14B, are built with a slide lock of a construction such that, when the optical connector 16 is inserted into the connector housing 14 (in more concrete terms, the half housing), along with the engagement projections 14n of the projecting tip ends from the housing main section 14b of the engagement claws 14f of the half housing being engaged into the engagement portions on the side portions of the housing 17 of the optical connector 16 (the engagement portions of the connection reception side optical connector 16B, referred to by the reference symbol 17c), a lock is engaged which prevents this engagement being released and the optical connector 16 from being pulled out from the half housing; while, when a sliding shroud (a coupling 18) which is attached to the optical connector 16 is pulled, while releasing this lock, it is possible to pull off the optical connector 16 from the connector housing 14 (the half housing).

It should be understood that the configuration of the engagement claws 14f may be varied as appropriate, according to the type of the optical connector 16, the size of the housing 17, the shape of the engagement portions which are formed upon the side portions of the housing 17, or the like. The engagement claws 14f are not shown in FIGS. 51, 52, and 54, etc., in the interests of simplicity. Furthermore, the reference symbol 14g denotes a key groove into which a key 17a which is formed as projecting from the side portion of the housing 17 is inserted. It should be noted that, for the connector housing, the structure is not limited to one such as has been described above in which the engagement claws which engage with the optical connector (the optical connector plug) are formed integrally with the housing main sections of the half housings; for example, it would also be possible to employ a structure in which an internal housing of a sleeve shape which was formed as a separate member from the sleeve shaped housing main section of the half housing was received within it, and in which the engagement claws were formed upon this internal housing, or the like.

As shown in FIGS. 55 and 56, the shutter unit 15 is built to comprise a main section 51, roughly shaped in the form of a letter "C", which is formed by bending a single metallic plate or the like, desirably made of stainless steel or copper, and a pair of shutter leaves 53a and 53b which are mounted by hinge fitting members 52 to the upper and lower edges of this main section 51 so as to be freely rotatable with respect thereto. Furthermore, in this preferred embodiment of the present invention, it is desirable for all of the members which are incorporated in the shutter unit 15, in other words, the main section 51, the hinge fitting members 52, and the shutter leaves 53a and 53b to be made from materials which are endowed with electrical conductivity. Here, in this preferred embodiment of the present invention, it is shown by way of example that the main section and the shutter leaves are members which are made from stainless steel plate, which has a high electrical conductivity.

As shown in FIGS. 55 and 58B, the main section 51 of the shutter unit 15 comprises a main plate portion 51a of a flat plate shape, and a pair of extended portions 51b and 51c which project on the side of one of the surfaces from both opposite sides of this main plate portion 51a, and, as for the hinge fitting members 52 on the "upper and lower edges of the main section 51" by which the pair of shutter leaves 53a and 53b are mounted, they are the hinge fitting members 52 which are respectively provided at the projecting edges of these extended portions 51b and 51c from the main plate portion 51a. In concrete terms, these hinge fitting members 52 are shafts (and in the following explanation, sometimes the hinge fitting members 52 will plainly be called shafts 52), and they extend mutually parallel to one another; and, moreover, when the shutter unit 15 has been assembled into the connector housing 14, they are arranged as extending in orientations which are orthogonal to the axial direction of the connector hole 14a1 on both sides with respect to the connector hole 14a1, so that the engagement claws 14f which are positioned on both sides with respect to the connector hole 14a1 come to be positioned between the pair of shafts 52.

The shutter unit 15 is inserted from the side of the junction end face 14i towards the half housing 14A, and thus comes to be fitted within the half housing 14A. The main plate portion 51a of the shutter unit 15 is stored in the inner housing alcove 14o. Furthermore, the extended portions 51b and 51c of the shutter unit 15 are stored in the extended portions 14e on both opposite sides of the connector hole 14a1. As shown in FIGS. 58A and 58B, on the other end portion of the half housing 14A in the axial direction (the left side in FIG. 58A; the front side of the drawing paper in FIG. 58B), division walls 14j which project from the main section 14b into the connector hole 14a1 are formed on both opposite sides of the central axis of the connector hole 14a1, and the extended portions 14e are formed to extend along the axial direction of the connector hole 14a1 from these division walls, and to open into the inner housing alcove 14o in groove form. Each of these extended portions 14e is formed by dilating the connector hole 14a1 on both sides of its central axis.

As shown in FIG. 55, the shutter unit 15 is stored in the half housing 14A by the projecting portions of the shafts 52 on both sides of each of the extended portions 51b and 51c (the projecting portions 52a) being inserted into shaft insertion grooves 14h (these shaft insertion grooves 14h are the one portions of the extended portions 14e) which have been formed to extend along the axial direction of the connector hole 14a1 so as to dilate both opposite sides of each of these extended portions 14e, and by being pressed into the half housing 14A from the side of the one end portion in the axial direction of the half housing 14A. These extended portions 51b and 51c proceed to be inserted into the extended portions 14e according to the progress of the insertion of the projecting portions 52a of each of the shafts 52 into the shaft insertion grooves 14h. Once the extended portions 51b and 51c, or the projecting portions 52a of the shafts 52, come into contact with the division wall 14j, the further pressing in of the shutter unit 15 into the half housing 14A is prevented.

It should be understood that a space is maintained between the pair of division walls 14j (this space is also part of the connector holes 14a, 14a1) of cross sectional shape which almost agrees with the cross sectional shape of the housing 17 of the optical connector 16 which is to be inserted into the half housing 14A, and a key groove 14g is formed upon one from among the pair of division walls 14j (in the following explanation, sometimes the reference symbol 14j1 will be appended to this one of the division walls 14j), into which the key 17a of the housing 17 of the optical connector 16A is inserted. No key groove is formed upon the other one of the division walls 14j (in the following explanation, sometimes the reference symbol 14J2 will be appended to this one of the division walls 14j). The extended portions 51b and 51c and the hinge fitting members 52 which are received in the extended portion 14e on the side of the division wall 14J1 (that one of the extended portions 14e to which the reference symbol 14e1 is appended in FIGS. 56, 58A, and 58B) and the extended portion 14e on the side of the division wall 14J2 (that one of the extended portions 14e to which the reference symbol 14e2 is appended in FIGS. 56, 58A, and 58B) are arranged not to interfere with the housing 17 of the optical connector 16A, when the optical connector 16A is inserted into the half housing 14A.

As shown in FIGS. 55 and 59, the inner piece 61 is made from a plate shaped inner main section (an inner main section) 63 and four projections 64 which project from this main section 63, and these four projections 64 are each inserted into one of the grooves 62 from the side of the one end portion in the axial direction of the half housing 14A, and are stored within the half housing 14A by being pushed into the half housing 14A. The inner main section 63 is stored in the inner housing alcove 14o. However, in this preferred embodiment of the present invention, the shutter unit 15 comes to be housed within the half housing 14A by arranging that the main plate portion 51a of the main section 51 overlaps with the portions of the extended portions 51b and 51c which project on both sides thereof (the projecting plates 51d; the innermost portions of the inner housing alcove 14o—the bottommost portion of the inner housing alcove 14o as seen from the side of the one end portion of the half housing 14a in the axial direction) on the inner surfaces (the bearing surfaces 14u) which are positioned on both the opposite sides of the connector hole 14a1; and, moreover, when the shutter unit 15 has been housed in the housing main body 14A, cutouts 59, which are formed in each of the projecting plates 51d in two places each, come to be connected to the four grooves 62 of the half housing 14A, so that the four projections 64 of the inner piece 64 come to be inserted into the corresponding ones of the grooves 62, via the cutouts 59 in the projecting plates 51d. As shown in FIG. 56, the projecting tip end from the inner main section 63 of each of the projections 64 is made to project more to the side of the other end portion of the half housing 14A in the axial direction than the light interception positions of the shutter leaves 53a and 53b. It should be understood that, in concrete terms, the structure of this inner piece 61 will be described in detail hereinafter.

When inserting and fixing the half housing 14b into the alcove 14w of the one end portion in the axial direction of the half housing 14A in which the shutter unit 15 and the inner piece 61 are housed (the situation in FIG. 56), the inner piece 61 is pressed in by the one end portion 14d of the half housing 14B in the axial direction so as not to come out from the half housing 14A, and the shutter unit 15 is sandwiched between the projections 14j1 and 14j2 of the half housing 14A and the inner main section 63, so as to be stably held so that it cannot shake about. In other words, the shutter unit 15 and the inner main section 63 are sandwiched between the projections 14j1 and 14j2 of the half housing 14A and the half housing 14B, and are thereby stably held.

It should be understood that it is not absolutely necessary for the shutter unit to be built so as to comprise this projecting plate 15d, but, if it is thus built to include the projecting plate 15d, then it is possible to provide efficient functionality, from the point of view of ensuring a good electromagnetic radiation shielding capacity for the connector fitting hole of the fitting wall to which this optical connector equipped with a shutter 10 is fitted.

Furthermore, the mechanism for maintaining the stability by which the shutter unit 15 is held in place within the connector housing 14 (the half housing 14A) is not absolutely necessarily limited to being the above disclosed structure in which the projecting portions 52a of the shafts 52 are inserted into the shaft insertion grooves 14h within the half housing 14A; various other types of structure could be applied. For example, if such stable holding were to be implemented by simply sandwiching the shutter unit 15 and the inner main section 63 between the projections 14j1 and 14j2 of the half housing 14A, and the half housing 14B, then it would be possible to omit the projecting portions 52a of the shafts 52, and to omit forming the shaft insertion grooves 14h within the half housing 14A.

As shown in FIG. 56, the shutter leaves 53a and 53b of the shutter unit 15 which has been assembled to the connector housing 14 are positioned to their light interception positions by the action of biasing members not shown in the drawings and of stoppers and so on, and, due to the insertion of the optical connector 16A, are impelled by the biasing force of the biasing members and are pressed down to the side of the non-connected optical connector 16B. If the optical connector 16A is pulled out, they return to their light interception positions due to the biasing force of the biasing members.

As shown in the figures, the vicinities of the central areas of the shutter leaves 53a and 53b, which are pivotally attached to the main section 51 by the hinge fitting members 52, are curved so as to be further from the junction end face 14i of the half housing 14A. This curving of the shutter leaves 53a and 53b fulfills the function, when the optical connector 16A has been inserted into the half housing 14A, of preventing damage to the end surface of the ferrule 19 due to scraping or the like which might occur if one of the shutter leaves 53a and 53b should come into contact with the tip end of the optical connector 16A, in other words with the ferrule 19, so that thereby the reliability of the optical connection characteristics of the optical connector 16A is maintained over a long time period. When the optical connector 16A is inserted into the half housing 14A, the shutter leaves 53a and 53b are pressed open by the housing 18 of the optical connector 16A.

The shutter leaves 53a and 53b which are comprised in the shutter unit 15 can be rotated between their closed light interception position in which they are projected into the connector hole 14a and close it off, and their opened position in which they are housed in the upwards and downwards directions, so as to open up the connector hole 14a. These shutter leaves 53a and 53b are biased towards their light interception positions in which they close off the connector hole 14a by, for example, plate shaped springs or the like. When these shutter leaves 53a and 53b are in their light interception positions, the connector hole 14a is almost completely closed off by these shutter leaves 53a and 53b. In this light interception state of the shutter leaves 53a and 53b, light which is emitted from the optical fiber (denoted by the reference symbol 19a in FIGS. 50B and 50D) which is exposed at the tip end of the optical connector 16 (here, the tip end of the ferrule 19 of the optical connector 16B) which has first been inserted and connected from the aperture portion at one end of the connector hole 14a can be prevented from escaping to the aperture portion at the opposite end of the connector hole 14a.

Furthermore, when the shutter leaves 53a and 53b are in their light interception positions, it is possible to obtain an excellent performance from the point of view of electromagnetic radiation shielding capability, since the connector hole 14a is closed off by the shutter leaves 53a and 53b which are made from metallic plates which have a high electrical conductivity. Furthermore, since the shutter leaves 53a and 53b which are in their light interception positions exhibit a good dust interception characteristic for preventing the intrusion of dust or the like into the space which is defined in the connector hole 14a between the shutter leaves 53a and 53b and the connection reception side optical connector 16B, accordingly it is possible to prevent the inconvenience of dust or the like causing contamination to the tip end of the connection reception side optical connector 16B, or the like.

As shown in FIGS. 55 and 59, the inner piece 61 comprises a main section (an inner main section) 63 and four projections 64 which project from this main section 63. The inner piece 61 is entirely made as a single unitary member from a resin material which has a good electrical conductivity, such as a synthetic resin in which are dispersed minute particles of a material such as a metal which has a high electrical conductivity, such as for example particles of steel or the like. In the main section 63 there is formed a support portion 65 which faces towards the side of the optical connector 16A and receives and stops the tip end portion of the housing 17 of the optical connector 16A. A concave portion 65a into which the tip end of the housing of the optical connector 16A is inserted is formed on this support portion 65. When the optical connector 16A is inserted into the half housing 14A, the housing 17 of this optical connector 16A is inserted into the window 15e which opens through the central portion of the main plate portion 15a of the shutter unit 15, and, since its tip end is inserted into the concave portion 65a, accordingly the optical connector 16A is supported within the half housing 14A by the support portion 65 so that it cannot shake about therein.

Furthermore, in the vicinity of the central portion of the main section 63 of the inner piece 61, an aperture 66 is formed whose size is approximately the same as that of the ferrule 19. When the optical connector 16B has been inserted into the half housing 14B, this aperture 66 is pierced by the ferrule 19 (refer to FIG. 54) of the optical connector 16B. Furthermore, the ferrule 19 of the tip end of the optical connector 16A which has been inserted into the half housing 14A can also be inserted into this aperture 66. Provided that the aperture 66 in the inner piece 61 is provided to be of a size which can just be pierced by the ferrules 19 of the optical connectors 16A and 16B, and that it is made so that its periphery is closed by the inner main section 63, it is possible to obtain an excellent performance from the point of view of electromagnetic radiation shielding capacity.

-Regarding the Electromagnetic Radiation Shielding of the Connector Fitting Hole- With the optical connector 10 equipped with a shutter of this preferred embodiment of the present invention, by employing elements which are endowed with electrical conductivity for the connector housing 14 and the inner piece 61 (in particular, for its main section 63), when it is fitted, for example, to the fitting wall 12 of a chassis 11 as shown by way of example in FIGS. 51 through 53, it is possible to ensure good electromagnetic radiation shielding capacity for the connector fitting hole 13. Although, in this preferred embodiment of the present invention, the use has been suggested of elements which have been made from a synthetic resin material which incorporates carbon filler dispersed as particles within the resin for the connector housing 14 and the inner piece 61, in order to endow them with such an electromagnetic radiation shielding function, this is not intended to be limitative of the present invention; for example, it would also be possible to employ elements which incorporated an electrically conductive paint layer which was formed by painting a paint material which was electrically conductive (for example, a paste or the like into which was mixed magnetic metal particles which had an action of absorbing electromagnetic radiation) upon a substrate which was made from a synthetic resin or the like, or elements upon which were fixed electrically conductive cloth layers which were made from electrically conductive fibers (metallic fibers or the like), etc. Furthermore, such fine particles having an action of absorbing electromagnetic radiation are not limited to being carbon filler; it would also be possible to employ various other types of material.

With the optical connector 10 equipped with a shutter of this preferred embodiment of the present invention, in particular, the inner piece 61 (along with its central main section 63) effectively and reliably contributes an electromagnetic radiation shielding capability to the connector fitting hole 13. This inner main section 53 (the shield portion) is arranged so as to cut across the connector hole 14a, and closes off the connector hole 14a over almost its entire cross sectional shape, and, when this optical connector 10 equipped with a shutter is inserted into the connector fitting hole 13 of the fitting wall 12, and is assembled to the fitting wall 12, the connector fitting hole 13 is similarly closed over almost its entire cross sectional shape, so that, when this optical connector equipped with a shutter 10 is inserted into a connector fitting hole 13 of a fitting wall 12 (i.e., the connector half 14B in FIG. 51 etc. is inserted into the connector fitting hole 13) and is fitted to the fitting wall 12, it is positioned so as almost entirely to close off the connector fitting hole 13. And, due to the provision of the connector housing 14 which is in contact with the inner piece 61 and is capable of conducting electricity and/or of the connection circuit which is provided to the connector housing 14 and so on, it is ensured that the inner piece 61 is effectively grounded, so that it is possible for the inner piece 61 to function efficiently as a member of electromagnetic radiation shielding, and thereby it is possible to ensure a good electromagnetic radiation shielding capability for the connector hole 13.

It should be understood that, by making the inner main section 63 as a flat plate, hardly any (or no) increase in size of the connector housing 14 to which the inner piece 61 is fitted is required to be made, as compared to the case of the connector housing of an optical connector to which no such inner piece 61 is assembled. Furthermore, with the shutter unit 15 as well, a contribution is made to making the connector housing more compact, since it is made to be assembled within the connector housing 14 by taking advantage of the extended portion which has been made by dilating the connector hole 14a1 within the connector half 14A, and the like.

Furthermore, with this optical connector 10 equipped with a shutter, since it is possible to make the connector housing 14 as well function as a member which is endowed with an electromagnetic radiation shielding function, finally, it is possible to close off almost the entire portion of the connector fitting hole 13 with a member which is endowed with an electromagnetic radiation shielding function, except for the portion of the aperture 66 which is only slightly larger than the outer shape of the ferrule 19, so that an excellent electromagnetic radiation shielding capability is obtained. In other words, when this optical connector 10 equipped with a shutter is fitted to the fitting wall, the connector fitting hole of the fitting wall is put into the state of being closed off by this optical connector 10 equipped with a shutter with hardly any gap being left. Furthermore, with this optical connector 10 equipped with a shutter, it is possible to obtain a better electromagnetic radiation shielding function by utilizing a member which is electrically conductive for the shutter unit 15 as well.

In FIGS. 50 and 51, the shield cover to which the reference symbol 20 is appended comprises three side plate members 20a, 20b, and 20c which are separately attached to three surfaces of the four side surfaces (surrounding surfaces) housing main section 14b (refer to FIG. 50C) of the rectangular cross sectional shaped half housing 14B, thus being a member of cover shape which surrounds the half housing 14B from three sides, and is entirely made from a metallic plate such as a stainless steel plate which is electrically conductive. The three side plate members 20a, 20b, and 20c of this shield cover 20 are attached to the outer sides of the housing main section 14b by receiving them in shallow grooves 14p (these are also shown in FIGS. 56 and 57) which are formed on the three surfaces of the housing main section 14b, so that no positional deviation between them can occur. This shield cover 20 is connected so that electrical current can flow between itself and the chassis 11 due to their mutual contact, and thereby, along with exhibiting an electromagnetic radiation shielding capability, it also contributes more effectively to the electrical conduction between the connector housing 14 which is endowed with an electromagnetic radiation shielding capability and the fitting wall 12.

In fitting this optical connector 10 equipped with a shutter to the fitting wall 12, it will be sufficient to press this optical connector 10 equipped with a shutter from the outer side of the chassis 11 (in FIG. 51, from the left side of the fitting wall 12) into the connector fitting hole 13 of the fitting wall 12, with the side on which the shield cover 20 is attached (here, the side of the half housing 14B) being its front side in the pressing in direction (in FIG. 51, it is pressed in towards the right side of the fitting wall 12), so that engagement claws 20d of plate spring shape which are projected towards the outside from the side plate members 20b and 20c which are positioned on both opposite sides of this shield cover 20 pass through the fitting wall 12 while being resiliently deformed. The engagement claws 20d are passed through the fitting wall 12 and resiliently spring back, thus to be engaged with the fitting wall 12. By doing this, the fitting wall 12 is pinched between the engagement claw 20d and the projecting flange 14c, and, at the same time as stably attaching this optical connector 10 equipped with a shutter to the fitting wall 12, conduction of electricity between it and the fitting wall 12 is assured.

It should be understood that it is possible to anticipate a contribution to the reduction in the cost of this optical connector 10 equipped with a shutter, provided that the construction is one which ensures grounding of the inner piece 61 via the connector housing 14, since there is no requirement to provide any special connection circuit or the like to this optical connector 10 equipped with a shutter. Furthermore, according to this optical connector equipped with a shutter 10 according to the present invention, by providing the shutter unit 15 with the contact for conducting electricity which projects to the outside of the connector housing 14, it is also possible to endow the shutter unit 15 with the function of operating as a connecting circuit for grounding.

Moreover, the structure for inserting the optical connector equipped with a shutter into the connector fitting hole of the fitting wall and fitting it thereto is not to be considered as being limited to the shield cover; it goes without saying that it would also be possible to utilize various alternative forms of structure for this purpose.

The four projections 64 which project from the inner piece 61 are arranged in positions which oppose corresponding ones of the four grooves 62 which are exposed at one end in the junction end face 14*i* of the half housing 14A. And, in the state in which it is sandwiched between the half housing 14A and the half housing 14B, the four projections 64 are each inserted into its corresponding one of the four grooves 62 from this junction end face 14*i* of the half housing 14A, and thereby they close these four grooves 62.

By closing the grooves 62 which are inevitably formed during the formation of the engagement claws 14*f* with the four projections 64 which are formed upon the inner piece 61 in this manner, it becomes possible to prevent the inconvenience of the tip end of the connection reception side optical connector 16B becoming contaminated and so on by the adhesion of dust or the like, since the resulting structure exhibits a dust interception characteristic for preventing the intrusion of dust or the like via the grooves 62 into the interior of the connector hole 14*a*.

It should be understood that the present invention should not be considered as being limited by any of the perhaps purely fortuitous details of the embodiments disclosed above; various alterations to the form and the content of any particular embodiment are possible, within the scope of the claims. For example, the concrete shape and structure of the shutter unit are not intended to be limitative of the present invention: it would be possible to make various alterations to them, as appropriate. Furthermore, although in the preferred embodiments described above the application of the present invention to the case of an optical connector adapter which was used for connecting together optical connector plugs of optical connectors of the MPO type was disclosed by way of example, this is not to be considered as being limitative of the present invention; it would be possible to apply the present invention to an optical connector adapter which was used for connecting together optical connector plugs of a type other than the MPO type, without departing from the scope of the present invention.

Yet further, the present invention is not to be considered as being limited to an optical connector adapter; for example, it could also be applied to various other types of optical connector having a connector hole into which an optical connector plug was inserted and connected—for example, an optical connector receptacle or the like. Although, in the preferred embodiments of the present invention which were disclosed above, the example was shown in which the shutter unit was made to incorporate shutter leaves at only one side of the main section, it would also be possible, as an alternative, to utilize a structure which incorporated shutter leaves on both opposite sides thereof.

As has been described above, according to the optical connector equipped with a shutter of the present invention, by the grooves which are inevitably formed by the formation of the engagement claws being closed by the projections which are formed upon the inner piece, the grooves which are opened on both sides of the shutter unit are completely closed off. Due to this, it becomes possible to prevent the inconvenience of the tip end of the connection reception side optical connector becoming contaminated or the like due to the adhesion of dust or the like, since the intrusion of dust or the like via these grooves is prevented, thus providing a dust interception characteristic.

Yet furthermore, since light which is emitted from the connection reception side optical connector is intercepted by the shutter unit, it is possible to perform the task of connecting another optical connector to this connection reception side optical connector at high efficiency. Moreover, with this optical connector fitted with a shutter, when it is set into position in a connector fitting hole of a fitting wall and is fitted to the fitting wall, it is possible simply and easily to assure the electromagnetic radiation shielding capacity of the connector fitting hole, since the shutter unit of the optical connector fitted with a shutter is located so as to close off the connector fitting hole and thereby an electromagnetic radiation shielding capacity is provided. Due to this, it is easy to assure an excellent electromagnetic radiation shielding capability to a connector fitting hole which is formed in a fitting wall for fitting of an optical connector such as an optical connector adapter or the like.

What is claimed is:

1. An optical connector equipped with a shutter, comprising:
    a connector housing formed with a connector hole into which an optical connector is inserted and connected and within which said optical connector and a connection reception side optical connector are connected together, and a separate shutter unit assembly provided in a shutter unit receiving portion formed within said connector housing, wherein:
    said shutter unit assembly comprises a main section which is fitted within said shutter unit receiving portion of said connector housing and a plurality of tongue leaf shaped shutter leaves which are linked to said main section in the vicinity of the interior surface of said connector hole, and which, by being arranged so as to project from said main section into said connector hole, intercept light which is emitted from an optical fiber which is exposed at the tip end of said connection reception side optical connector;
    said shutter leaves are provided in said connector housing as linked to said main section so as to be changeable over by rotational displacement with respect to said main section about linking sections as axes between light interception positions in which they project from said linking sections into said connector hole, and retracted positions in which, by said optical connector being inserted into said connector hole, they are pressed down so as to reduce the amounts by which they project into said connector hole, so as to allow connection of said optical connector to said connection reception side optical connector; and
    when said shutter leaves are in said light interception position, said shutter leaves are mutually overlapped over one another so as to close said connector hole.

2. An optical connector equipped with a shutter as described in claim 1, wherein, in said connector hole of said connector housing, in the vicinity of the position of connection between said optical connector and said connection reception side optical connector, there is provided a shielding member which is endowed with electrical conductivity, and a window is formed in said shielding member, through which a ferrule of said optical connector tip end and/or a ferrule of said connection reception side optical connector tip end can be inserted.

3. An optical connector according to claim 2, wherein said window formed in said shielding member has a smaller area than the area of the opening of said connector hole.

4. An optical connector according to claim 1, wherein said shutter unit assembly is endowed with electrical conductivity.

5. A shutter unit, comprising:
    a main section which is fitted within a shutter unit receiving portion formed within a connector housing, which housing is formed with a connector hole into which an optical connector is inserted and connected and within which said optical connector and a connection reception side optical connector are connected together, and a plurality of tongue leaf shaped shutter leaves which are arranged so as to project from said main section into said connector hole of said connector housing; wherein:

said main section comprises a main plate portion which is formed with a window into which said optical connector and/or said connection reception side optical connector can be inserted and which is provided within said connector housing and orientated to cut across said connector hole with said window communicating said connector hole, and a pair of extended portions which are extended so as to rise up towards one side of said main plate portion from both opposite edges of said main plate portion; and said shutter leaves are linked to said extended portions so as to be changeable over by rotational displacement with respect to said extended portions about linking sections as axes between light interception positions in which they project from said linking sections into a space between said pair of extended portions, and retracted positions in which, by being pressed down, they are positioned so as to extend from said linking sections towards the side of said main plate portion;

and moreover resilient members which are provided by said linking sections themselves, or alternatively which are provided separately from said linking sections, are arranged to function, when said shutter leaves have been rotationally displaced from their said light interception positions, as pressing and returning biasing members for pressing and returning said shutter leaves back to their said light interception positions, and, when both said shutter leaves are in their said light interception positions, said shutter leaves are mutually overlapped over one another so as to close said connector hole.

6. An optical connector according to claim 5, wherein said shutter unit is endowed with electrical conductivity.

7. An optical connector equipped with a shutter, comprising:

a connector housing which is formed with a connector hole into which an optical connector is inserted and connected and within which said optical connector and a connection reception side optical connector are connected together, and-a separate shutter unit assembly provided in a shutter unit receiving portion formed within said connector housing, wherein:

said shutter unit assembly comprises a main section which is fitted within said shutter unit receiving portion of said connector housing and a plurality of tongue leaf shaped shutter leaves which are arranged so as to project from said main section into said connector hole of said connector housing, wherein:

said main section comprises a main plate portion which is formed with a window into which said optical connector and/or said connection reception side optical connector can be inserted and which is provided within said connector housing and orientated to cut across said connector hole with said window communicating said connector hole, and a pair of extended portions which are extended so as to rise up towards one side of said main plate portion from both opposite edges of said main plate portion; and said shutter leaves are linked to said extended portions so as to be changeable over by rotational displacement with respect to said extended portions about linking sections as axes between light interception positions in which they project from said linking sections into a space between said pair of extended portions, and retracted positions in which, by being pressed down, they are positioned so as to extend from said linking sections towards the side of said main plate portion;

and moreover resilient members which are provided by said linking sections themselves, or alternatively which are provided separately from said linking sections, are arranged to function, when said shutter leaves have been rotationally displaced from their said light interception positions, as pressing and returning biasing members for pressing and returning said shutter leaves back to their said light interception positions, and, when both said shutter leaves are in their said light interception positions, said shutter leaves are mutually overlapped over one another so as to close said connector hole.

8. An optical connector equipped with a shutter as described in claim 7, wherein, in said connector hole of said connector housing, in the vicinity of the position of connection between said optical connector and said connection reception side optical connector, there is provided a shielding member which is endowed with electrical conductivity, and a window is formed in said shielding member, through which a ferrule of said optical connector tip end and/or a ferrule of said connection reception side optical connector tip end can be inserted.

9. An optical connector according to claim 8, wherein said window formed in said shielding member has a smaller area than the area of the opening of said connector hole.

10. An optical connector according to claim 7, wherein said shutter unit assembly is endowed with electrical conductivity.

11. An optical connector equipped with a shutter, comprising:

a connector housing which is formed with a connector hole into which an optical connector is inserted and connected and within which said optical connector and a connection reception side optical connector are connected together, and a separate shutter unit assembly positioned within a shutter unit receiving portion formed within said connector housing to intercepts light emitted from said connection reception side optical connector; wherein:

said shutter unit assembly comprises a main section which is fitted within said shutter unit receiving portion of said connector housing and a plurality of tongue leaf shaped shutter leaves which, by projecting from said main section into said connector hole, are arranged to be capable of intercepting light which is emitted from an optical fiber which is exposed at the tip end of said connection reception side optical connector; and said shutter leaves comprise light interception plate portions which are assembled to said connector housing and are arranged in positions to oppose a junction end face of said connection reception side optical connector tip end, and connector contacting portions which are pressed by a portion of said optical connector, when it is inserted in said connector hole, other than said junction end face thereof, so that:

by said connector contacting portions being pressed by said optical connector, they are pressed down so that the amounts by which they project within said connector hole are reduced, so as to enable the connection of said optical connector to said connection reception side optical connector; and moreover, when said optical connector is contacted against said connector contacting portions, a non contacting state of said light interception plate portions with respect to said junction end face of said optical connector is maintained.

12. An optical connector equipped with a shutter as described in claim 11, wherein, in said connector housing, a pair of said shutter leaves are provided, and the positions where said shutter leaves are linked to said main section are positions on both sides of the central axis of the connector hole of the connector housing, with said shutter leaves being provided so as to project from their said positions where they are linked with said main section into said connector hole, and so as to mutually overlap with one another so as to close up said connector hole.

13. An optical connector equipped with a shutter as described in claim 12, wherein, as said connector contacting portions, projecting portions are formed upon said shutter leaves which project in the opposite direction to the direction in which said shutter leaves are pressed down by said optical connector; and said light interception plate portions are positioned at locations which are shifted forward in the pressing down direction of said shutter leaves by said optical connector, as compared to said connector contacting portions.

14. An optical connector equipped with a shutter as described in claim 11, wherein, as said connector contacting portions, projecting portions are formed upon said shutter leaves which project in the opposite direction to the direction in which said shutter leaves are pressed down by said optical connector; and said light interception plate portions are positioned at locations which are shifted forward in the pressing down direction of said shutter leaves by said optical connector, as compared to said connector contacting portions.

15. An optical connector according to claim 11, wherein said shutter unit assembly is endowed with electrical conductivity.

16. An optical connector equipped with a shutter, comprising:

a connector housing formed with a connector hole into which an optical connector is inserted and connected and within which said optical connector and a connection reception side optical connector are connected together, a separate shutter unit assembly positioned within a shutter unit receiving portion formed within said connector housing to intercepts light which is emitted from said connection reception side optical connector, and an inner piece; wherein:

in the interior of said connector housing, there are formed an engagement claw which engages with said optical connector which has been inserted into said connector hole of said connector housing, and long grooves which extend along the axial direction of said connector hole on both sides of said engagement claw;

said inner piece is provided in the vicinity of the connection position between said optical connector and said connection reception side optical connector, and comprises an inner main section which is formed with an aperture into which a ferrule which projects at a tip end of said optical connector and/or a ferrule which projects at a tip end of said connection reception side optical connector can be inserted, and a plurality of projections which project from said inner main section towards the side of said optical connector insertion aperture of said connector housing; and said projections of said inner piece are inserted in said long grooves of said connector housing.

17. An optical connector equipped with a shutter as described in claim 16, wherein said inner piece is formed from a material which has an electromagnetic radiation shielding capability, and said inner main section of said inner piece functions as an electromagnetic radiation shielding member due to the action of said electromagnetic radiation shielding material which is provided to said inner main section.

18. An optical connector according to claim 16, wherein said aperture formed in said inner main section has a smaller area than the area of the opening of said connector hole.

* * * * *